(12) United States Patent
Kottomtharayil et al.

(10) Patent No.: US 10,942,894 B2
(45) Date of Patent: *Mar. 9, 2021

(54) OPERATION READINESS CHECKING AND REPORTING

(71) Applicant: Commvault Systems, Inc., Tinton Falls, NJ (US)

(72) Inventors: Rajiv Kottomtharayil, Marlboro, NJ (US); Manoj Kumar Vijayan, Marlboro, NJ (US); Vimal Kumar Nallathambi, Ocean Township, NJ (US); Unmil Vinay Tambe, Somerset, NJ (US)

(73) Assignee: Commvault Systems, Inc, Tinton Falls, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/733,134

(22) Filed: Jan. 2, 2020

(65) Prior Publication Data

US 2020/0257655 A1 Aug. 13, 2020

Related U.S. Application Data

(63) Continuation of application No. 16/233,851, filed on Dec. 27, 2018, now Pat. No. 10,572,444, which is a
(Continued)

(51) Int. Cl.
*G06F 12/00* (2006.01)
*G06F 16/11* (2019.01)
(Continued)

(52) U.S. Cl.
CPC ............ *G06F 16/128* (2019.01); *G06F 11/00* (2013.01); *G06F 11/1448* (2013.01);
(Continued)

(58) Field of Classification Search
None
See application file for complete search history.

(56) References Cited

U.S. PATENT DOCUMENTS 4,296,465 A 10/1981 Lemak
4,686,620 A 8/1987 Ng
(Continued)

FOREIGN PATENT DOCUMENTS

AU 2006331932 12/2006
CA 2632935 12/2006
(Continued)

OTHER PUBLICATIONS

Armstead et al., "Implementation of a Campus-Wide Distributed Mass Storage Service: The Dream vs. Reality," IEEE, 1995, pp. 190-199.
(Continued)

*Primary Examiner* — Jason W Blust
(74) *Attorney, Agent, or Firm* — Knobbe Martens Olson & Bear LLP

(57) ABSTRACT

An information management system according to certain aspects may determine whether storage operations will work prior to executing them. The system may check various factors or parameters relating to a storage policy to verify whether the storage policy will work at runtime without actually executing the policy. Some examples of factors can include: availability of primary storage devices, availability of secondary storage devices, license availability for performing that operation, user credentials for connecting to primary and/or second storage devices, available storage capacity, connectivity to storage devices, etc. The system may also check whether a particular system configuration is supported in connection with storage operations. The result of the determination can be provided in the form of a report summarizing any problems found with the storage policy.

(Continued)

The report can include recommended courses of action or solutions for resolving any identified issues.

21 Claims, 18 Drawing Sheets

Related U.S. Application Data continuation of application No. 15/860,520, filed on Jan. 2, 2018, now Pat. No. 10,223,365, which is a continuation of application No. 15/280,902, filed on Sep. 29, 2016, now Pat. No. 9,892,123, which is a continuation of application No. 14/163,876, filed on Jan. 24, 2014, now Pat. No. 9,495,251.

(51) Int. Cl.
  *G06F 11/14* (2006.01)
  *G06F 11/00* (2006.01)
  *G06F 11/20* (2006.01)
(52) U.S. Cl.
  CPC ...... *G06F 11/1458* (2013.01); *G06F 11/1464* (2013.01); *G06F 11/2064* (2013.01); *G06F 11/1451* (2013.01); *G06F 11/1453* (2013.01); *G06F 11/1474* (2013.01); *G06F 11/203* (2013.01); *G06F 2201/805* (2013.01); *G06F 2201/815* (2013.01); *G06F 2201/84* (2013.01)

(56) References Cited

U.S. PATENT DOCUMENTS

| | | |
|---|---|---|
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,263,154 A | 11/1993 | Eastridge et al. |
| 5,265,159 A | 11/1993 | Kung |
| 5,276,860 A | 1/1994 | Fortier et al. |
| 5,276,867 A | 1/1994 | Kenley et al. |
| 5,287,500 A | 2/1994 | Stoppani, Jr. |
| 5,301,351 A | 4/1994 | Jippo |
| 5,311,509 A | 5/1994 | Heddes et al. |
| 5,317,731 A | 5/1994 | Dias et al. |
| 5,321,816 A | 6/1994 | Rogan et al. |
| 5,333,315 A | 7/1994 | Saether et al. |
| 5,347,653 A | 9/1994 | Flynn et al. |
| 5,369,757 A | 11/1994 | Spiro et al. |
| 5,403,639 A | 4/1995 | Belsan et al. |
| 5,410,700 A | 4/1995 | Fecteau et al. |
| 5,448,718 A | 9/1995 | Cohn et al. |
| 5,448,724 A | 9/1995 | Hayashi et al. |
| 5,455,926 A | 10/1995 | Keele et al. |
| 5,487,072 A | 1/1996 | Kant |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,546,536 A | 8/1996 | Davis et al. |
| 5,555,404 A | 9/1996 | Torbjornsen et al. |
| 5,559,957 A | 9/1996 | Balk |
| 5,559,991 A | 9/1996 | Kanfi |
| 5,604,862 A | 2/1997 | Midgely et al. |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,677,900 A | 10/1997 | Nishida et al. |
| 5,682,513 A | 10/1997 | Candelaria et al. |
| 5,687,343 A | 11/1997 | Fecteau et al. |
| 5,689,706 A | 11/1997 | Rao et al. |
| 5,699,361 A | 12/1997 | Ding et al. |
| 5,719,786 A | 2/1998 | Nelson et al. |
| 5,720,026 A | 2/1998 | Uemura et al. |
| 5,729,743 A | 3/1998 | Squibb |
| 5,737,747 A | 4/1998 | Vishlitsky et al. |
| 5,742,792 A | 4/1998 | Yanai et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,765,173 A | 6/1998 | Cane et al. |
| 5,778,395 A | 7/1998 | Whiting et al. |
| 5,790,114 A | 8/1998 | Geaghan et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,819,292 A | 10/1998 | Hitz et al. |
| 5,829,046 A | 10/1998 | Tzelnic et al. |
| 5,835,953 A | 11/1998 | Ohran |
| 5,875,478 A | 2/1999 | Blumenau |
| 5,875,481 A | 2/1999 | Ashton et al. |
| 5,878,408 A | 3/1999 | Van Huben et al. |
| 5,887,134 A | 3/1999 | Ebrahim |
| 5,901,327 A | 5/1999 | Ofek |
| 5,907,621 A | 5/1999 | Bachman et al. |
| 5,907,672 A | 5/1999 | Matze et al. |
| 5,924,102 A | 7/1999 | Perks |
| 5,926,836 A | 7/1999 | Blumenau |
| 5,933,104 A | 8/1999 | Kimura |
| 5,933,601 A | 8/1999 | Fanshier et al. |
| 5,938,135 A | 8/1999 | Sasaki et al. |
| 5,950,205 A | 9/1999 | Aviani, Jr. |
| 5,956,519 A | 9/1999 | Wise et al. |
| 5,958,005 A | 9/1999 | Thorne et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,991,779 A | 11/1999 | Bejar |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,021,475 A | 2/2000 | Nguyen et al. |
| 6,023,710 A | 2/2000 | Steiner et al. |
| 6,026,414 A | 2/2000 | Anglin |
| 6,049,889 A | 4/2000 | Steely, Jr. et al. |
| 6,052,735 A | 4/2000 | Ulrich et al. |
| 6,061,692 A | 5/2000 | Thomas et al. |
| 6,072,490 A | 6/2000 | Bates et al. |
| 6,076,148 A | 6/2000 | Kedem et al. |
| 6,094,416 A | 7/2000 | Ying |
| 6,105,129 A | 8/2000 | Meier et al. |
| 6,112,239 A | 8/2000 | Kenner et al. |
| 6,122,668 A | 9/2000 | Teng et al. |
| 6,131,095 A | 10/2000 | Low et al. |
| 6,131,148 A | 10/2000 | West et al. |
| 6,131,190 A | 10/2000 | Sidwell |
| 6,137,864 A | 10/2000 | Yaker |
| 6,148,377 A | 11/2000 | Carter et al. |
| 6,148,412 A | 11/2000 | Cannon et al. |
| 6,154,787 A | 11/2000 | Urevig et al. |
| 6,154,852 A | 11/2000 | Amundson et al. |
| 6,158,044 A | 12/2000 | Tibbetts |
| 6,161,111 A | 12/2000 | Mutalik et al. |
| 6,163,856 A | 12/2000 | Dion et al. |
| 6,167,402 A | 12/2000 | Yeager |
| 6,175,829 B1 | 1/2001 | Li et al. |
| 6,195,695 B1 | 2/2001 | Cheston et al. |
| 6,205,450 B1 | 3/2001 | Kanome et al. |

(56) References Cited

U.S. PATENT DOCUMENTS

| | | |
|---|---|---|
| 6,212,512 B1 | 4/2001 | Barney et al. |
| 6,212,521 B1 | 4/2001 | Minami et al. |
| 6,230,164 B1 | 5/2001 | Rikieta et al. |
| 6,260,069 B1 | 7/2001 | Anglin |
| 6,269,431 B1 | 7/2001 | Dunham |
| 6,275,953 B1 | 8/2001 | Vahalia et al. |
| 6,279,078 B1 | 8/2001 | Sicola et al. |
| 6,292,783 B1 | 9/2001 | Rohler |
| 6,301,592 B1 | 10/2001 | Aoyama et al. |
| 6,304,880 B1 | 10/2001 | Kishi |
| 6,311,193 B1 | 10/2001 | Sekido et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| 6,350,199 B1 | 2/2002 | Williams et al. |
| RE37,601 E | 3/2002 | Eastridge et al. |
| 6,353,878 B1 | 3/2002 | Dunham |
| 6,356,801 B1 | 3/2002 | Goodman et al. |
| 6,363,464 B1 | 3/2002 | Mangione |
| 6,366,986 B1 | 4/2002 | St. Pierre et al. |
| 6,366,988 B1 | 4/2002 | Skiba et al. |
| 6,374,336 B1 | 4/2002 | Peters et al. |
| 6,374,363 B1 | 4/2002 | Wu et al. |
| 6,389,432 B1 | 5/2002 | Pothapragada et al. |
| 6,397,308 B1 | 5/2002 | Ofek et al. |
| 6,418,478 B1 | 7/2002 | Ignatius et al. |
| 6,421,711 B1 | 7/2002 | Blumenau et al. |
| 6,434,681 B1 | 8/2002 | Amangau |
| 6,473,775 B1 | 10/2002 | Kusters et al. |
| 6,487,561 B1 | 11/2002 | Ofek et al. |
| 6,487,644 B1 | 11/2002 | Huebsch et al. |
| 6,487,645 B1 | 11/2002 | Clark et al. |
| 6,502,205 B1 | 12/2002 | Yanai et al. |
| 6,519,679 B2 | 2/2003 | Devireddy et al. |
| 6,538,669 B1 | 3/2003 | Lagueux, Jr. et al. |
| 6,539,462 B1 | 3/2003 | Mikkelsen et al. |
| 6,542,909 B1 | 4/2003 | Tamer et al. |
| 6,542,972 B2 | 4/2003 | Ignatius et al. |
| 6,557,089 B1 | 4/2003 | Reed et al. |
| 6,564,228 B1 | 5/2003 | O'Connor |
| 6,581,143 B2 | 6/2003 | Gagne et al. |
| 6,594,744 B1 | 7/2003 | Humlicek et al. |
| 6,604,118 B2 | 8/2003 | Kleinman et al. |
| 6,604,149 B1 | 8/2003 | Deo et al. |
| 6,606,690 B2 | 8/2003 | Padovano |
| 6,615,223 B1 | 9/2003 | Shih et al. |
| 6,631,477 B1 | 10/2003 | LeCrone et al. |
| 6,631,493 B2 | 10/2003 | Ottesen et al. |
| 6,643,671 B2 | 11/2003 | Milillo et al. |
| 6,647,396 B2 | 11/2003 | Parnell et al. |
| 6,647,473 B1 | 11/2003 | Golds et al. |
| 6,651,075 B1 | 11/2003 | Kusters et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan et al. |
| 6,665,815 B1 | 12/2003 | Goldstein et al. |
| 6,681,230 B1 | 1/2004 | Blott et al. |
| 6,721,767 B2 | 4/2004 | De Meno et al. |
| 6,728,733 B2 | 4/2004 | Tokui |
| 6,728,736 B2 | 4/2004 | Hostetter et al. |
| 6,732,124 B1 | 5/2004 | Koseki et al. |
| 6,732,125 B1 | 5/2004 | Autrey et al. |
| 6,742,092 B1 | 5/2004 | Huebsch et al. |
| 6,748,504 B2 | 6/2004 | Sawdon et al. |
| 6,751,635 B1 | 6/2004 | Chen et al. |
| 6,757,794 B2 | 6/2004 | Cabrera et al. |
| 6,760,723 B2 | 7/2004 | Oshinsky et al. |
| 6,763,351 B1 | 7/2004 | Subramaniam et al. |
| 6,789,161 B1 | 9/2004 | Blendermann et al. |
| 6,792,518 B2 | 9/2004 | Armangau et al. |
| 6,799,258 B1 | 9/2004 | Linde |
| 6,836,779 B2 | 12/2004 | Poulin |
| 6,871,163 B2 | 3/2005 | Hiller et al. |
| 6,871,271 B2 | 3/2005 | Ohran et al. |
| 6,877,016 B1 | 4/2005 | Hart et al. |
| 6,880,051 B2 | 4/2005 | Timpanaro-Perrotta |
| 6,886,020 B1 | 4/2005 | Zahavi et al. |
| 6,892,211 B2 | 5/2005 | Hitz et al. |
| 6,898,688 B2 | 5/2005 | Martin et al. |
| 6,912,482 B2 | 6/2005 | Kaiser |
| 6,925,512 B2 | 8/2005 | Louzoun et al. |
| 6,938,135 B1 | 8/2005 | Kekre et al. |
| 6,938,180 B1 | 8/2005 | Dysert et al. |
| 6,941,393 B2 | 9/2005 | Secatch |
| 6,944,796 B2 | 9/2005 | Joshi et al. |
| 6,948,038 B2 | 9/2005 | Berkowitz et al. |
| 6,948,089 B2 | 9/2005 | Fujibayashi |
| 6,952,705 B2 | 10/2005 | Knoblock et al. |
| 6,952,758 B2 | 10/2005 | Chron et al. |
| 6,954,834 B2 | 10/2005 | Slater et al. |
| 6,957,362 B2 | 10/2005 | Armangau |
| 6,968,351 B2 | 11/2005 | Butterworth |
| 6,973,553 B1 | 12/2005 | Archibald, Jr. et al. |
| 6,978,265 B2 | 12/2005 | Schumacher |
| 6,981,177 B2 | 12/2005 | Beattie |
| 6,983,351 B2 | 1/2006 | Gibble et al. |
| 6,993,539 B2 | 1/2006 | Federwisch et al. |
| 7,003,519 B1 | 2/2006 | Biettron et al. |
| 7,003,641 B2 | 2/2006 | Prahlad et al. |
| 7,032,131 B2 | 4/2006 | Lubbers et al. |
| 7,035,880 B1 | 4/2006 | Crescenti et al. |
| 7,051,050 B2 | 5/2006 | Chen et al. |
| 7,062,761 B2 | 6/2006 | Slavin et al. |
| 7,065,538 B2 | 6/2006 | Aronoff et al. |
| 7,072,915 B2 | 7/2006 | Kaczmarski et al. |
| 7,082,441 B1 | 7/2006 | Zahavi et al. |
| 7,085,787 B2 | 8/2006 | Beier et al. |
| 7,085,904 B2 | 8/2006 | Mizuno et al. |
| 7,096,315 B2 | 8/2006 | Takeda et al. |
| 7,100,089 B1 | 8/2006 | Phelps |
| 7,103,731 B2 | 9/2006 | Gibble et al. |
| 7,103,740 B1 | 9/2006 | Colgrove et al. |
| 7,107,298 B2 | 9/2006 | Prahlad et al. |
| 7,107,395 B1 | 9/2006 | Ofek et al. |
| 7,111,026 B2 | 9/2006 | Sato |
| 7,120,757 B2 | 10/2006 | Tsuge |
| 7,130,860 B2 | 10/2006 | Pachet |
| 7,130,970 B2 | 10/2006 | Devassy et al. |
| 7,139,887 B2 | 11/2006 | Colgrove et al. |
| 7,139,932 B2 | 11/2006 | Watanabe |
| 7,155,465 B2 | 12/2006 | Lee et al. |
| 7,155,633 B2 | 12/2006 | Tuma et al. |
| 7,165,079 B1 | 1/2007 | Chen et al. |
| 7,174,352 B2 | 2/2007 | Kleinman et al. |
| 7,181,477 B2 | 2/2007 | Saika et al. |
| 7,188,292 B2 | 3/2007 | Cordina et al. |
| 7,191,198 B2 | 3/2007 | Asano et al. |
| 7,194,454 B2 | 3/2007 | Hansen et al. |
| 7,197,665 B2 | 3/2007 | Goldstein et al. |
| 7,203,807 B2 | 4/2007 | Urabe et al. |
| 7,209,972 B1 | 4/2007 | Ignatius et al. |
| 7,225,204 B2 | 5/2007 | Manley et al. |
| 7,225,208 B2 | 5/2007 | Midgley et al. |
| 7,225,210 B2 | 5/2007 | Guthrie, II |
| 7,228,456 B2 | 6/2007 | Lecrone et al. |
| 7,231,544 B2 | 6/2007 | Tan et al. |
| 7,234,115 B1 | 6/2007 | Sprauve et al. |
| 7,237,075 B2 | 6/2007 | Welsh et al. |
| 7,246,140 B2 | 7/2007 | Therrien et al. |
| 7,246,207 B2 | 7/2007 | Kottomtharayil et al. |
| 7,251,713 B1 | 7/2007 | Zhang |
| 7,257,689 B1 | 8/2007 | Baird |
| 7,269,612 B2 | 9/2007 | Devarakonda et al. |
| 7,269,641 B2 | 9/2007 | Powers et al. |
| 7,272,606 B2 | 9/2007 | Borthakur et al. |
| 7,275,138 B2 | 9/2007 | Saika |
| 7,275,177 B2 | 9/2007 | Amangau et al. |
| 7,275,277 B2 | 10/2007 | Moskovich et al. |
| 7,278,142 B2 | 10/2007 | Bandhole et al. |
| 7,287,047 B2 | 10/2007 | Kavuri |
| 7,293,133 B1 | 11/2007 | Colgrove et al. |
| 7,296,125 B2 | 11/2007 | Ohran |

(56) References Cited

U.S. PATENT DOCUMENTS

| | | |
|---|---|---|
| 7,315,923 B2 | 1/2008 | Retnamma et al. |
| 7,343,356 B2 | 3/2008 | Prahlad et al. |
| 7,343,365 B2 | 3/2008 | Farnham et al. |
| 7,343,453 B2 | 3/2008 | Prahlad et al. |
| 7,343,459 B2 | 3/2008 | Prahlad et al. |
| 7,346,623 B2 | 3/2008 | Prahlad et al. |
| 7,346,751 B2 | 3/2008 | Prahlad et al. |
| 7,356,657 B2 | 4/2008 | Mikami |
| 7,359,917 B2 | 4/2008 | Winter et al. |
| 7,370,232 B2 | 5/2008 | Safford |
| 7,373,364 B1 | 5/2008 | Chapman |
| 7,380,072 B2 | 5/2008 | Kottomtharayil et al. |
| 7,383,538 B2 | 6/2008 | Bates et al. |
| 7,389,311 B1 | 6/2008 | Crescenti et al. |
| 7,392,360 B1 | 6/2008 | Aharoni et al. |
| 7,395,282 B1 | 7/2008 | Crescenti et al. |
| 7,395,387 B2 | 7/2008 | Berkowitz et al. |
| 7,409,509 B2 | 8/2008 | Devassy et al. |
| 7,412,583 B2 | 8/2008 | Burton et al. |
| 7,415,488 B1 | 8/2008 | Muth et al. |
| 7,421,554 B2 | 9/2008 | Colgrove et al. |
| 7,430,587 B2 | 9/2008 | Malone et al. |
| 7,433,301 B2 | 10/2008 | Akahane et al. |
| 7,440,982 B2 | 10/2008 | Lu et al. |
| 7,454,569 B2 | 11/2008 | Kavuri et al. |
| 7,467,167 B2 | 12/2008 | Patterson |
| 7,467,267 B1 | 12/2008 | Mayock |
| 7,472,238 B1 | 12/2008 | Gokhale |
| 7,484,054 B2 | 1/2009 | Kottomtharayil et al. |
| 7,490,207 B2 | 2/2009 | Amarendran |
| 7,496,589 B1 | 2/2009 | Jain et al. |
| 7,496,690 B2 | 2/2009 | Beverly et al. |
| 7,500,053 B1 | 3/2009 | Kavuri et al. |
| 7,500,150 B2 | 3/2009 | Sharma et al. |
| 7,509,316 B2 | 3/2009 | Greenblatt et al. |
| 7,512,601 B2 | 3/2009 | Cucerzan et al. |
| 7,516,088 B2 | 4/2009 | Johnson et al. |
| 7,519,726 B2 | 4/2009 | Palliyll et al. |
| 7,523,276 B1 | 4/2009 | Shankar |
| 7,523,483 B2 | 4/2009 | Dogan |
| 7,529,748 B2 | 5/2009 | Wen et al. |
| 7,529,782 B2 | 5/2009 | Prahlad et al. |
| 7,529,898 B2 | 5/2009 | Nguyen et al. |
| 7,532,340 B2 | 5/2009 | Koppich et al. |
| 7,536,291 B1 | 5/2009 | Vijayan Retnamma et al. |
| 7,539,707 B2 | 5/2009 | Prahlad et al. |
| 7,543,125 B2 | 6/2009 | Gokhale |
| 7,546,324 B2 | 6/2009 | Prahlad et al. |
| 7,565,572 B2 | 7/2009 | Yamasaki |
| 7,567,991 B2 | 7/2009 | Armangau et al. |
| 7,568,080 B2 | 7/2009 | Prahlad et al. |
| 7,577,806 B2 | 8/2009 | Rowan |
| 7,581,077 B2 | 8/2009 | Ignatius et al. |
| 7,587,563 B1 | 9/2009 | Teterin et al. |
| 7,596,586 B2 | 9/2009 | Gokhale et al. |
| 7,606,841 B1 | 10/2009 | Ranade |
| 7,606,844 B2 | 10/2009 | Kottomtharayil |
| 7,606,868 B1 | 10/2009 | Le et al. |
| 7,610,387 B1 | 10/2009 | Liskov et al. |
| 7,613,748 B2 | 11/2009 | Brockway et al. |
| 7,613,750 B2 | 11/2009 | Valiyaparambil et al. |
| 7,617,253 B2 | 11/2009 | Prahlad et al. |
| 7,617,262 B2 | 11/2009 | Prahlad et al. |
| 7,617,541 B2 | 11/2009 | Plotkin et al. |
| 7,620,666 B1 | 11/2009 | Root et al. |
| 7,627,598 B1 | 12/2009 | Burke |
| 7,627,617 B2 | 12/2009 | Kavuri et al. |
| 7,636,743 B2 | 12/2009 | Erofeev |
| 7,651,593 B2 | 1/2010 | Prahlad et al. |
| 7,661,028 B2 | 2/2010 | Erofeev |
| 7,664,771 B2 | 2/2010 | Kusters et al. |
| 7,668,798 B2 | 2/2010 | Scanlon et al. |
| 7,669,029 B1 | 2/2010 | Mishra et al. |
| 7,672,979 B1 | 3/2010 | Appellof et al. |
| 7,685,126 B2 | 3/2010 | Patel et al. |
| 7,689,467 B1 | 3/2010 | Belanger et al. |
| 7,702,533 B2 | 4/2010 | Barnard et al. |
| 7,707,184 B1 | 4/2010 | Zhang et al. |
| 7,716,171 B2 | 5/2010 | Kryger |
| 7,734,578 B2 | 6/2010 | Prahlad et al. |
| 7,734,669 B2 | 6/2010 | Kottomtharayil et al. |
| 7,734,715 B2 | 6/2010 | Hyakutake et al. |
| 7,739,235 B2 | 6/2010 | Rousseau et al. |
| 7,747,579 B2 | 6/2010 | Prahlad et al. |
| 7,810,067 B2 | 10/2010 | Kaelicke et al. |
| 7,831,553 B2 | 11/2010 | Prahlad et al. |
| 7,831,622 B2 | 11/2010 | Prahlad et al. |
| 7,840,533 B2 | 11/2010 | Prahlad et al. |
| 7,840,537 B2 | 11/2010 | Gokhale et al. |
| 7,844,577 B2 | 11/2010 | Becker et al. |
| 7,870,355 B2 | 1/2011 | Erofeev |
| 7,930,274 B2 | 4/2011 | Hwang et al. |
| 7,930,476 B1 | 4/2011 | Castelli et al. |
| 7,962,455 B2 | 6/2011 | Erofeev |
| 7,962,709 B2 | 6/2011 | Agrawal |
| 8,024,292 B2 | 9/2011 | Thompson et al. |
| 8,024,294 B2 | 9/2011 | Kottomtharayil |
| 8,046,334 B2 | 10/2011 | Hwang et al. |
| 8,060,695 B1 | 11/2011 | Lee et al. |
| 8,121,983 B2 | 2/2012 | Prahlad et al. |
| 8,156,086 B2 | 4/2012 | Lu et al. |
| 8,166,263 B2 | 4/2012 | Prahlad |
| 8,170,995 B2 | 5/2012 | Prahlad et al. |
| 8,190,565 B2 | 5/2012 | Prahlad et al. |
| 8,204,859 B2 | 6/2012 | Ngo |
| 8,205,049 B1 | 6/2012 | Armangau et al. |
| 8,219,524 B2 | 7/2012 | Gokhale |
| 8,229,954 B2 | 7/2012 | Kottomtharayil et al. |
| 8,230,195 B2 | 7/2012 | Amarendran et al. |
| 8,245,128 B1 | 8/2012 | Ahad et al. |
| 8,271,830 B2 | 9/2012 | Erofeev |
| 8,285,681 B2 | 10/2012 | Prahlad et al. |
| 8,307,177 B2 | 11/2012 | Prahlad et al. |
| 8,326,803 B1 | 12/2012 | Stringham |
| 8,346,727 B1 | 1/2013 | Chester et al. |
| 8,352,422 B2 | 1/2013 | Prahlad et al. |
| 8,356,013 B2 | 1/2013 | Fachan et al. |
| 8,364,652 B2 | 1/2013 | Vijayan et al. |
| 8,463,751 B2 | 6/2013 | Kottomtharayil |
| 8,489,656 B2 | 7/2013 | Erofeev |
| 8,510,271 B1 | 8/2013 | Tsaur et al. |
| 8,521,694 B1 | 8/2013 | Natanzon |
| 8,578,120 B2 | 11/2013 | Attarde et al. |
| 8,645,320 B2 | 2/2014 | Prahlad et al. |
| 8,656,123 B2 | 2/2014 | Lee |
| 8,719,226 B1 | 5/2014 | Jiang et al. |
| 8,725,694 B2 | 5/2014 | Kottomtharayil |
| 8,789,208 B1 | 7/2014 | Sundaram et al. |
| 8,856,079 B1 | 10/2014 | Subramanian et al. |
| 8,868,494 B2 | 10/2014 | Agrawal |
| 8,886,595 B2 | 11/2014 | Prahlad et al. |
| 8,930,497 B1 | 1/2015 | Holmes et al. |
| 8,954,446 B2 | 2/2015 | Vijayan Retnamma et al. |
| 9,002,785 B2 | 4/2015 | Prahlad et al. |
| 9,015,121 B1 | 4/2015 | Salamon et al. |
| 9,020,900 B2 | 4/2015 | Vijayan Retnamma et al. |
| 9,098,495 B2 | 8/2015 | Gokhale |
| 9,128,901 B1 | 9/2015 | Nickurak et al. |
| 9,208,160 B2 | 12/2015 | Prahlad et al. |
| 9,218,252 B1 | 12/2015 | Revur et al. |
| 9,239,687 B2 | 1/2016 | Vijayan et al. |
| 9,239,840 B1 | 1/2016 | Acharya |
| 9,251,198 B2 | 2/2016 | Mutalik et al. |
| 9,298,715 B2 | 3/2016 | Kumarasamy et al. |
| 9,342,537 B2 | 5/2016 | Kumarasamy et al. |
| 9,405,631 B2 | 8/2016 | Prahlad et al. |
| 9,448,731 B2 | 9/2016 | Nallathambi et al. |
| 9,471,578 B2 | 10/2016 | Nallathambi et al. |
| 9,495,251 B2 | 11/2016 | Kottomtharayil et al. |
| 9,535,907 B1 | 1/2017 | Stringham |
| 9,619,172 B1 | 4/2017 | Natanzon et al. |
| 9,619,341 B2 | 4/2017 | Prahlad et al. |
| 9,632,874 B2 | 4/2017 | Pawar et al. |
| 9,639,426 B2 | 5/2017 | Pawar et al. |

(56) References Cited

U.S. PATENT DOCUMENTS

| | | |
|---|---|---|
| 9,648,105 B2 | 5/2017 | Nallathambi et al. |
| 9,753,812 B2 | 9/2017 | Pawar et al. |
| 9,774,672 B2 | 9/2017 | Nallathambi et al. |
| 9,852,026 B2 | 12/2017 | Mitkar et al. |
| 9,886,346 B2 | 2/2018 | Kumarasamy et al. |
| 9,892,123 B2 | 2/2018 | Kottomtharayil et al. |
| 9,898,371 B2 | 2/2018 | Kumarasamy et al. |
| 9,921,920 B2 | 3/2018 | Nallathambi et al. |
| 9,928,002 B2 | 3/2018 | Kumarasamy et al. |
| 9,928,146 B2 | 3/2018 | Nallathambi et al. |
| 9,965,306 B1 | 5/2018 | Natanzon et al. |
| 9,996,428 B2 | 6/2018 | Nallathambi et al. |
| 10,042,716 B2 | 8/2018 | Nallathambi et al. |
| 10,044,803 B2 | 8/2018 | Nallathambi et al. |
| 10,223,365 B2 | 3/2019 | Kottomtharayil et al. |
| 10,228,962 B2 | 3/2019 | Dornemann et al. |
| 10,250,679 B1 | 4/2019 | Natanzon et al. |
| 10,419,536 B2 | 9/2019 | Nallathambi et al. |
| 10,503,753 B2 | 12/2019 | Mitkar et al. |
| 10,521,308 B2 | 12/2019 | Nallathambi et al. |
| 10,572,444 B2 | 2/2020 | Kottomtharayil et al. |
| 10,628,266 B2 | 4/2020 | Nallathambi et al. |
| 10,671,484 B2 | 6/2020 | Pawar et al. |
| 10,698,632 B2 | 6/2020 | Kumarasamy et al. |
| 10,740,022 B2 | 8/2020 | Gutta et al. |
| 2001/0027457 A1 | 10/2001 | Yee |
| 2001/0029512 A1 | 10/2001 | Oshinsky et al. |
| 2001/0029517 A1 | 10/2001 | De Meno et al. |
| 2001/0032172 A1 | 10/2001 | Moulinet et al. |
| 2001/0042222 A1 | 11/2001 | Kedem et al. |
| 2001/0044807 A1 | 11/2001 | Kleiman et al. |
| 2001/0044834 A1 | 11/2001 | Bradshaw et al. |
| 2002/0002557 A1 | 1/2002 | Straube et al. |
| 2002/0004883 A1 | 1/2002 | Nguyen et al. |
| 2002/0023051 A1 | 2/2002 | Kunzle et al. |
| 2002/0040376 A1 | 4/2002 | Yamanaka et al. |
| 2002/0042869 A1 | 4/2002 | Tate et al. |
| 2002/0049626 A1 | 4/2002 | Mathias et al. |
| 2002/0049718 A1 | 4/2002 | Kleiman et al. |
| 2002/0049738 A1 | 4/2002 | Epstein |
| 2002/0049778 A1 | 4/2002 | Bell et al. |
| 2002/0069324 A1 | 6/2002 | Gerasimov et al. |
| 2002/0073070 A1 | 6/2002 | Morita et al. |
| 2002/0083055 A1 | 6/2002 | Pachet et al. |
| 2002/0103848 A1 | 8/2002 | Giacomini et al. |
| 2002/0107877 A1 | 8/2002 | Whiting et al. |
| 2002/0112134 A1 | 8/2002 | Ohran et al. |
| 2002/0133511 A1 | 9/2002 | Hostetter et al. |
| 2002/0133512 A1 | 9/2002 | Milillo et al. |
| 2002/0143903 A1 | 10/2002 | Uratani et al. |
| 2002/0152381 A1 | 10/2002 | Kuriya et al. |
| 2002/0161753 A1 | 10/2002 | Inaba et al. |
| 2002/0174107 A1 | 11/2002 | Poulin |
| 2002/0174416 A1 | 11/2002 | Bates et al. |
| 2003/0009431 A1 | 1/2003 | Souder et al. |
| 2003/0018657 A1 | 1/2003 | Monday |
| 2003/0028736 A1 | 2/2003 | Berkowitz et al. |
| 2003/0061491 A1 | 3/2003 | Jaskiewicz et al. |
| 2003/0097296 A1 | 5/2003 | Putt |
| 2003/0131278 A1 | 7/2003 | Fujibayashi |
| 2003/0135783 A1 | 7/2003 | Martin et al. |
| 2003/0140070 A1 | 7/2003 | Kaczmarski et al. |
| 2003/0158834 A1 | 8/2003 | Sawdon et al. |
| 2003/0167380 A1 | 9/2003 | Green et al. |
| 2003/0177149 A1 | 9/2003 | Coombs |
| 2003/0177321 A1 | 9/2003 | Watanabe |
| 2003/0187847 A1 | 10/2003 | Lubbers et al. |
| 2003/0225800 A1 | 12/2003 | Kavuri |
| 2004/0002934 A1 | 1/2004 | Taulbee et al. |
| 2004/0010487 A1 | 1/2004 | Prahlad et al. |
| 2004/0015468 A1 | 1/2004 | Beier et al. |
| 2004/0039679 A1 | 2/2004 | Norton et al. |
| 2004/0098425 A1 | 5/2004 | Wiss et al. |
| 2004/0107199 A1 | 6/2004 | Dalrymple, III et al. |
| 2004/0117572 A1 | 6/2004 | Welsh et al. |
| 2004/0139128 A1 | 7/2004 | Becker et al. |
| 2004/0143642 A1 | 7/2004 | Beckmann et al. |
| 2004/0148376 A1 | 7/2004 | Rangan et al. |
| 2004/0167972 A1 | 8/2004 | Demmon |
| 2004/0193953 A1 | 9/2004 | Callahan et al. |
| 2004/0205206 A1 | 10/2004 | Naik et al. |
| 2004/0230829 A1 | 11/2004 | Dogan et al. |
| 2004/0236958 A1 | 11/2004 | Teicher et al. |
| 2004/0249883 A1 | 12/2004 | Srinivasan et al. |
| 2004/0250033 A1 | 12/2004 | Prahlad et al. |
| 2004/0254919 A1 | 12/2004 | Giuseppini |
| 2004/0260678 A1 | 12/2004 | Verbowski et al. |
| 2004/0267835 A1 | 12/2004 | Zwilling et al. |
| 2004/0267836 A1 | 12/2004 | Amangau et al. |
| 2005/0005070 A1 | 1/2005 | Lam |
| 2005/0027748 A1 | 2/2005 | Kisley |
| 2005/0027892 A1 | 2/2005 | McCabe et al. |
| 2005/0033800 A1 | 2/2005 | Kavuri et al. |
| 2005/0033878 A1 | 2/2005 | Pangal et al. |
| 2005/0060598 A1 | 3/2005 | Klotz et al. |
| 2005/0066118 A1 | 3/2005 | Perry et al. |
| 2005/0066222 A1 | 3/2005 | Rowan et al. |
| 2005/0066225 A1 | 3/2005 | Rowan et al. |
| 2005/0080928 A1 | 4/2005 | Beverly et al. |
| 2005/0086241 A1 | 4/2005 | Ram et al. |
| 2005/0108292 A1 | 5/2005 | Burton et al. |
| 2005/0138306 A1 | 6/2005 | Panchbudhe et al. |
| 2005/0144202 A1 | 6/2005 | Chen |
| 2005/0187982 A1 | 8/2005 | Sato |
| 2005/0187992 A1 | 8/2005 | Prahlad et al. |
| 2005/0188254 A1 | 8/2005 | Urabe et al. |
| 2005/0193026 A1 | 9/2005 | Prahlad et al. |
| 2005/0198083 A1 | 9/2005 | Saika et al. |
| 2005/0246376 A1 | 11/2005 | Lu et al. |
| 2005/0246510 A1 | 11/2005 | Retnamma et al. |
| 2006/0005048 A1 | 1/2006 | Osaki et al. |
| 2006/0010154 A1 | 1/2006 | Prahlad et al. |
| 2006/0010227 A1 | 1/2006 | Atluri |
| 2006/0020616 A1 | 1/2006 | Hardy et al. |
| 2006/0034454 A1 | 2/2006 | Damgaard et al. |
| 2006/0047805 A1 | 3/2006 | Byrd et al. |
| 2006/0120401 A1 | 6/2006 | Harada et al. |
| 2006/0129537 A1 | 6/2006 | Torii et al. |
| 2006/0136685 A1 | 6/2006 | Griv et al. |
| 2006/0136771 A1 | 6/2006 | Watanabe |
| 2006/0224846 A1 | 10/2006 | Amarendran et al. |
| 2006/0242371 A1 | 10/2006 | Shono et al. |
| 2006/0242489 A1 | 10/2006 | Brockway et al. |
| 2007/0005915 A1 | 1/2007 | Thompson et al. |
| 2007/0006018 A1 | 1/2007 | Thompson et al. |
| 2007/0043956 A1 | 2/2007 | El Far et al. |
| 2007/0067263 A1 | 3/2007 | Husain et al. |
| 2007/0094467 A1 | 4/2007 | Yamasaki |
| 2007/0100867 A1 | 5/2007 | Celik et al. |
| 2007/0112897 A1 | 5/2007 | Asano et al. |
| 2007/0113006 A1 | 5/2007 | Elliott et al. |
| 2007/0115738 A1 | 5/2007 | Emaru |
| 2007/0124347 A1 | 5/2007 | Vivian et al. |
| 2007/0124348 A1 | 5/2007 | Claborn et al. |
| 2007/0143371 A1 | 6/2007 | Kottomtharayil |
| 2007/0143756 A1 | 6/2007 | Gokhale |
| 2007/0174569 A1 | 7/2007 | Schnapp et al. |
| 2007/0179990 A1 | 8/2007 | Zimran et al. |
| 2007/0183224 A1 | 8/2007 | Erofeev |
| 2007/0185937 A1 | 8/2007 | Prahlad et al. |
| 2007/0185938 A1 | 8/2007 | Prahlad et al. |
| 2007/0185939 A1 | 8/2007 | Prahlad et al. |
| 2007/0185940 A1 | 8/2007 | Prahlad et al. |
| 2007/0186068 A1 | 8/2007 | Agrawal |
| 2007/0198602 A1 | 8/2007 | Ngo et al. |
| 2007/0226438 A1 | 9/2007 | Erofeev |
| 2007/0244571 A1 | 10/2007 | Wilson et al. |
| 2007/0283111 A1 | 12/2007 | Berkowitz et al. |
| 2007/0288536 A1 | 12/2007 | Sen et al. |
| 2007/0288711 A1 | 12/2007 | Chen et al. |
| 2008/0016293 A1 | 1/2008 | Saika |
| 2008/0028009 A1 | 1/2008 | Ngo |
| 2008/0059515 A1 | 3/2008 | Fulton |
| 2008/0103916 A1 | 5/2008 | Camarador et al. |

(56) References Cited

U.S. PATENT DOCUMENTS

| | | |
|---|---|---|
| 2008/0183775 A1 | 7/2008 | Prahlad et al. |
| 2008/0209146 A1 | 8/2008 | Imazu et al. |
| 2008/0229037 A1 | 9/2008 | Bunte et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244177 A1 | 10/2008 | Crescenti et al. |
| 2008/0244205 A1 | 10/2008 | Amano et al. |
| 2008/0306954 A1 | 12/2008 | Hornqvist |
| 2009/0044046 A1 | 2/2009 | Yamasaki |
| 2009/0070330 A1 | 3/2009 | Hwang et al. |
| 2009/0150462 A1 | 6/2009 | McClanahan et al. |
| 2009/0182963 A1 | 7/2009 | Prahlad et al. |
| 2009/0187944 A1 | 7/2009 | White et al. |
| 2009/0216816 A1 | 8/2009 | Basler et al. |
| 2009/0319534 A1 | 12/2009 | Gokhale |
| 2009/0319582 A1 | 12/2009 | Simek et al. |
| 2009/0319585 A1 | 12/2009 | Gokhale |
| 2010/0005259 A1 | 1/2010 | Prahlad |
| 2010/0011178 A1 | 1/2010 | Feathergill et al. |
| 2010/0036931 A1 | 2/2010 | Certain et al. |
| 2010/0049753 A1 | 2/2010 | Prahlad et al. |
| 2010/0070726 A1 | 3/2010 | Ngo et al. |
| 2010/0094808 A1 | 4/2010 | Erofeev |
| 2010/0100529 A1 | 4/2010 | Erofeev |
| 2010/0122053 A1 | 5/2010 | Prahlad et al. |
| 2010/0131461 A1 | 5/2010 | Prahlad et al. |
| 2010/0145909 A1 | 6/2010 | Ngo |
| 2010/0153338 A1 | 6/2010 | Ngo et al. |
| 2010/0179941 A1 | 7/2010 | Agrawal et al. |
| 2010/0205150 A1 | 8/2010 | Prahlad et al. |
| 2010/0228919 A1 | 9/2010 | Stabrawa et al. |
| 2010/0250735 A1 | 9/2010 | Andersen |
| 2010/0257142 A1 | 10/2010 | Murphy et al. |
| 2010/0287141 A1 | 11/2010 | Prahlad et al. |
| 2010/0332990 A1 | 12/2010 | Prahlad et al. |
| 2011/0047195 A1 | 2/2011 | Le et al. |
| 2011/0047340 A1 | 2/2011 | Olson et al. |
| 2011/0066599 A1 | 3/2011 | Prahlad et al. |
| 2011/0161299 A1 | 6/2011 | Prahlad et al. |
| 2011/0161300 A1 | 6/2011 | Hwang et al. |
| 2011/0196957 A1 | 8/2011 | Ayachitula et al. |
| 2011/0246416 A1 | 10/2011 | Prahlad et al. |
| 2011/0246429 A1 | 10/2011 | Prahlad et al. |
| 2011/0276594 A1 | 11/2011 | Chong et al. |
| 2011/0282842 A1 | 11/2011 | Popovski et al. |
| 2011/0295804 A1 | 12/2011 | Erofeev |
| 2011/0295806 A1 | 12/2011 | Erofeev |
| 2012/0079221 A1 | 3/2012 | Sivasubramanian et al. |
| 2012/0084523 A1 | 4/2012 | Littlefield et al. |
| 2012/0124012 A1 | 5/2012 | Provenzano et al. |
| 2012/0131684 A1 | 5/2012 | Lynch |
| 2012/0150818 A1 | 6/2012 | Vijayan Retnamma et al. |
| 2012/0150826 A1 | 6/2012 | Vijayan Retnamma et al. |
| 2012/0179886 A1 | 7/2012 | Prahlad et al. |
| 2012/0317074 A1 | 12/2012 | Ngo |
| 2013/0006926 A1 | 1/2013 | Erofeev |
| 2013/0006938 A1 | 1/2013 | Prahlad et al. |
| 2013/0007183 A1 | 1/2013 | Sorenson et al. |
| 2013/0054910 A1 | 2/2013 | Vaghani et al. |
| 2013/0103650 A1 | 4/2013 | Natanzon et al. |
| 2013/0144881 A1 | 6/2013 | Sitsky et al. |
| 2013/0198311 A1 | 8/2013 | Tamir et al. |
| 2013/0218840 A1 | 8/2013 | Smith et al. |
| 2013/0262800 A1 | 10/2013 | Goodman et al. |
| 2013/0282953 A1 | 10/2013 | Orme et al. |
| 2014/0201170 A1 | 7/2014 | Vijayan et al. |
| 2014/0281317 A1 | 9/2014 | Garman et al. |
| 2015/0193312 A1 | 7/2015 | Nanivadekar et al. |
| 2015/0212894 A1 | 7/2015 | Pawar et al. |
| 2016/0062846 A1 | 3/2016 | Nallathambi et al. |
| 2016/0162369 A1 | 6/2016 | Ahn et al. |
| 2016/0306712 A1 | 10/2016 | Nallathambi et al. |
| 2016/0350391 A1 | 12/2016 | Vijayan et al. |
| 2017/0168903 A1 | 6/2017 | Dornemann et al. |
| 2017/0185488 A1 | 6/2017 | Kumarasamy et al. |
| 2017/0192860 A1 | 7/2017 | Vijayan et al. |
| 2017/0192861 A1 | 7/2017 | Vijayan et al. |
| 2017/0192866 A1 | 7/2017 | Vijayan et al. |
| 2017/0192867 A1 | 7/2017 | Vijayan et al. |
| 2017/0192868 A1 | 7/2017 | Vijayan et al. |
| 2017/0193003 A1 | 7/2017 | Vijayan et al. |
| 2017/0206142 A1 | 7/2017 | Pawar et al. |
| 2017/0235647 A1 | 8/2017 | Kilaru et al. |
| 2017/0242871 A1 | 8/2017 | Kilaru et al. |
| 2018/0063243 A1 | 3/2018 | Nallathambi et al. |
| 2018/0157559 A1 | 6/2018 | Nallathambi et al. |
| 2018/0232278 A1 | 8/2018 | Kumarasamy et al. |
| 2018/0373602 A1 | 12/2018 | Nallathambi et al. |
| 2020/0021651 A1 | 1/2020 | Nallathambi et al. |
| 2020/0192912 A1 | 6/2020 | Mitkar et al. |
| 2020/0272543 A1 | 8/2020 | Nallathambi et al. |

FOREIGN PATENT DOCUMENTS

| | | |
|---|---|---|
| EP | 0259912 | 3/1988 |
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| EP | 1349089 | 1/2003 |
| EP | 1349088 | 10/2003 |
| EP | 1579331 | 9/2005 |
| GB | 2256952 | 12/1992 |
| GB | 2411030 | 8/2005 |
| JP | 05189281 | 7/1993 |
| JP | 06274605 | 9/1994 |
| JP | 09016463 | 1/1997 |
| JP | 11259348 | 9/1999 |
| JP | 2000-347811 | 12/2000 |
| WO | WO 1993/003549 | 2/1993 |
| WO | WO 1995/013580 | 5/1995 |
| WO | WO 1998/39707 | 9/1998 |
| WO | WO 1999/012098 | 3/1999 |
| WO | WO 1999/014692 | 3/1999 |
| WO | WO 2002/095632 | 11/2002 |
| WO | WO 2003/028183 | 4/2003 |
| WO | WO 2004/034197 | 4/2004 |
| WO | WO 2005/055093 | 6/2005 |
| WO | WO 2005/086032 | 9/2005 |
| WO | WO 2007/053314 | 5/2007 |
| WO | WO 2007/075587 | 7/2007 |

OTHER PUBLICATIONS

Arneson, "Development of Omniserver; Mass Storage Systems," Control Data Corporation, 1990, pp. 88-93.
Arneson, "Mass Storage Archiving in Network Environments" IEEE, 1998, pp. 45-50.
Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, 9 pages, San Francisco, CA.
"Easy snapshot backup and recovery is here." Copyright date listed 2014. 6 pages.
Eitel, "Backup and Storage Management in Distributed Heterogeneous Environments," IEEE, 1994, pp. 124-126.
Gait, "The Optical File Cabinet: A Random-Access File system for Write-Once Optical Disks," IEEE Computer, vol. 21, No. 6, pp. 11-22 (1988).
Gray (#1 of 2, pp. 646-655), Jim; Reuter, Andreas, Transaction Processing: Concepts and Techniques, Morgan Kaufmann Publisher, USA 1994, 1994,11 pages.

(56) References Cited

OTHER PUBLICATIONS

Gray (#2 of 2, pp. 604-609), Jim; Reuter Andreas, Transaction Processing Concepts and Techniques, Morgan Kaufmann Publisher, USA 1994, pp. 604-609.
Harrington, Lisa H., "The RFP Process: How to Hire a Third Party", Transportation & Distribution, Sep. 1988, vol. 39, Issue 9, in 5 pages.
http://en.wikipedia.org/wiki/Naive_Bayes_classifier, printed on Jun. 1, 2010, in 7 pages.
IntelliSnap—Advanced Snapshots—NAS iDataAgent. <http://documentation.commvault.com/commvault/v10/article?p=products/nas ndmp/snap . . . > Retrieved Oct. 24, 2014. 14 pages.
Jander, "Launching Storage-Area Net," Data Communications, US, McGraw Hill, NY, vol. 27, No. 4(Mar. 21, 1998), pp. 64-72.
Kashyap, et al., "Professional Services Automation: A knowledge Management approach using LSI and Domain specific Ontologies", FLAIRS-01 Proceedings, 2001, pp. 300-302.
Lyon J., Design considerations in replicated database systems for disaster protection, COMPCON 1988, Feb. 29, 1988, pp. 428-430.
Microsoft Corporation, "Microsoft Exchange Server: Best Practices for Exchange Database Management," 1998, 26 pages.
Microsoft, "How Volume Shadow Copy Service Works", date listed Mar. 28, 2003.
Oltean, "VSS writers and inconsistent shadow copies", date listed Sep. 1, 2005, http://blogs.msdn.com/b/adioltean/archive/2005/ 08/31/458907.aspx., 2 pages.
Rosenblum et al., "The Design and Implementation of a Log-Structure File System," Operating Systems Review SIGOPS, vol. 25, No. 5, New York, US, pp. 1-14 (May 1991).
Simpana Intellisnap Snapshot Management Technology: Exponentially Accelerate Data Protection and Recovery. Copyright date listed 1999-2013. 2 pages.
Simpana Intellisnap Technology—Making Snaps Work. Copyright date listed 2014. 2 pages.
The Oracle8 Replication Manual, Part No. A58245-01; Chapters 1-2; Dec. 1, 1997; obtained from website: http://download-west.oracle.com/docs/cd/A64702_01/doc/server.805/a58245/toc.htm on May 20, 2009, 58 pages.
Veritas Software Corporation, "Veritas Volume Manager 3.2, Administrator's Guide," Aug. 2001, 360 pages.
Waldspurger, Carl, et al., I/O Virtualization, Communications of the ACM, vol. 55, No. 1, Jan. 2012, pp. 66-72.
Wiesmann M, Database replication techniques: a three parameter classification, Oct. 16, 2000, pp. 206-215.
Examiner's Report for Australian Application No. 2003279847, dated Dec. 9, 2008, 4 pages.
European Examination Report; Application No. 06848901.2 dated Apr. 1, 2009, pp. 7.
Examiner's First Report; Application No. 2006331932 dated May 11, 2011 in 2 pages.
Canadian Office Action dated Dec. 10, 2009, Application No. CA2544063, 3 pages.
Canadian Office Action dated Dec. 29, 2010, Application No. CA2546304, 4 pages.
First Office Action in Indian Application No. 3359/DELNP/2006 dated Feb. 11, 2013, 2 pages.
Final Office Action for Japanese Application No. 2003531581, dated Mar. 24, 2009, 6 pages.
First Office Action for Japanese Application No. 2003531581, dated Jul. 8, 2008, 8 pages.
Second Examination Report in EU Appl. No. 06 848 901.2-2201 dated Dec. 3, 2010.
International Preliminary Report on Patentability, PCT Application No. PCT/US2009/066880, dated Jun. 23, 2011, in 8 pages.
International Search Report and Written Opinion dated Jan. 11, 2006, PCT/US2004/038455.
International Search Report and Written Opinion dated Nov. 13, 2009, PCT/US2007/081681, 8 pages.
International Search Report and Written Opinion issued in PCT Application No. PCT/US2011/030396, dated Jul. 18, 2011, in 14 pages.
International Search Report and Written Opinion issued in PCT Application No. PCT/US2011/38436, dated Sep. 21, 2011, in 12 pages.
International Search Report and Written Opinion dated Dec. 28, 2009, PCT/US2004/038324, 7 pages.
International Search Report from International Application No. PCT/US2006/048273, dated May 15, 2007, 13 pages.
Li et al., "iROW: An Efficient Live Snapshot System for Virtual Machine Disk", ICPADS 2012, Singapore, Dec. 17-19, 2012, pp. 376-383.
U.S. Appl. No. 15/981,712, filed May 16, 2018, Gutta et al.

OPERATION READINESS CHECKING AND REPORTING

RELATED APPLICATIONS

This disclosure is a continuation of U.S. patent application Ser. No. 16/233,851, filed on Dec. 27, 2018 and titled "OPERATION READINESS CHECKING AND REPORTING," which is a continuation of U.S. patent application Ser. No. 15/860,520, filed on Jan. 2, 2018 and titled "SNAPSHOT READINESS CHECKING AND REPORTING," which is a continuation of U.S. patent application Ser. No. 15/280,902, filed on Sep. 29, 2016 and titled "SNAPSHOT READINESS CHECKING AND REPORTING," which is a continuation of U.S. patent application Ser. No. 14/163,876, filed on Jan. 24, 2014 and titled "SNAPSHOT READINESS CHECKING AND REPORTING." Any and all applications for which a foreign or domestic priority claim is identified in the Application Data Sheet of the present application are hereby incorporated by reference under 37 CFR 1.57.

BACKGROUND

Businesses worldwide recognize the commercial value of their data and seek reliable, cost-effective ways to protect the information stored on their computer networks while minimizing impact on productivity. Protecting information is often part of a routine process that is performed within an organization.

A company might back up critical computing systems such as databases, file servers, web servers, and so on as part of a daily, weekly, or monthly maintenance schedule. The company may similarly protect computing systems used by each of its employees, such as those used by an accounting department, marketing department, engineering department, and so forth.

Given the rapidly expanding volume of data under management, companies also continue to seek innovative techniques for managing data growth, in addition to protecting data. For instance, companies often implement migration techniques for moving data to lower cost storage over time and data reduction techniques for reducing redundant data, pruning lower priority data, etc.

Enterprises also increasingly view their stored data as a valuable asset. Along these lines, customers are looking for solutions that not only protect and manage, but also leverage their data. For instance, solutions providing data analysis capabilities, information management, improved data presentation and access features, and the like, are in increasing demand.

Snapshots can provide point-in-time copies of production data that can be restored for reference at a future time. In certain systems, a single logical volume of data (e.g., logical unit number (LUN)) may have data stored therein associated with a plurality of different applications and/or agents. Snapshots are often taken of an entire logical volume even when only one of the associated applications is requesting the snapshot.

SUMMARY

Data associated with multiple applications may be stored on the same logical volume (e.g., LUN). In general, when an application requests a snapshot of data associated with the application, the snapshot of the entire volume is taken, although the data of interest may only be the data associated with the requesting application. If a snapshot is taken of the entire volume in order to accommodate a request of one application, or a subset of applications associated with the volume, the snapshot data not associated with the requesting application may be unused, thereby creating system inefficiency.

In order to address these and other challenges, an information management system is provided to implement a combined single snapshot of data associated with multiple applications, according to certain aspects of the disclosure. For example, the information management system can coordinate snapshot operations such that a single snapshot can be taken for multiple applications, wherein the data associated with the multiple applications is residing on the same volume. For instance, the information management system can take a single snapshot of data associated with applications that have a similar snapshot frequency. The applications associated with the data stored on a particular volume can each be quiesced or placed in a consistent state, and the information management system can take a single snapshot of the volume, instead of taking different snapshots of the volume for each of the applications. The information management can create metadata (e.g., index) relating to which portion of the snapshot is associated with which application. The single snapshot can be stored in one or more secondary storage devices. When data associated with an application is to be restored from the stored single snapshot, the information management system can refer to the metadata to locate the data associated with the application.

In this manner, the information management system can reduce the number of snapshots obtained for various applications. By utilizing a combined single snapshot for multiple applications, the information management system reduces the number of snapshots taken since a snapshot of a volume can be taken less frequently. This can reduce the amount of resources used for generating and storing snapshots. In some cases, the organization associated with the information management system licenses the snapshot technology and may be allowed a limited number of snapshots. For example, a license for a snapshot software may be priced based on the number of allowed snapshots. Accordingly, taking fewer snapshots to back up data in the primary storage can be economical.

An information management system according to certain aspects may check or determine whether snapshot operations will work prior to executing them. The information management system may check various factors or parameters relating to a snapshot storage policy to verify whether the storage policy will work at runtime. The information management system may also check whether a particular system configuration is supported in connection with snapshot operations. The result of the determination can be provided in the form of a "snapshot readiness report," which may summarize any problems found with the snapshot storage policy. The snapshot readiness report may provide recommended course of action or solutions for resolving any identified issues. The snapshot readiness report may be used in connection with any system capable of performing snapshot operations, including systems that implement single snapshot for multiple applications.

According to certain embodiments, an information management system configured to generate a snapshot of data associated with a plurality of applications is provided. The system can include a plurality of data agents executing at least in part on a client computing device. Each data agent may be associated with at least one of a plurality of applications executing on the client computing device. Data generated by the plurality of applications may be stored in a logical volume in primary storage. The system may also include computer hardware. The system can also include a snapshot manager executing on the computer hardware. The snapshot manager may be configured to detect the plurality of applications executing on the client computing device. The snapshot manager may also be configured to check with the plurality of data agents whether the associated applications are in consistent states. The snapshot manager can be further configured to, in response to receiving notifications from the plurality of data agents that the associated applications are in consistent states, obtain a snapshot of the logical volume. The snapshot manager may additionally be configured to generate mapping information between a particular one of the plurality of applications and a portion of the snapshot relating to the particular one of the plurality of applications. The snapshot manager can also be configured to store the snapshot in secondary storage.

According to some embodiments, a method of generating a snapshot of data relating to a plurality of applications is provided. The method can include detecting, using computer hardware, a plurality of applications executing on a client computing device, a plurality of data agents executing at least in part on the client computing device, each data agent being associated with at least one of the plurality of applications executing on the client computing device, data generated by the plurality of applications being stored in a logical volume in primary storage. The method may also include sending requests to the plurality of data agents to check whether the associated applications are in consistent states. The method can further include, in response to receiving notifications from the plurality of data agents that the associated applications are in consistent states, obtaining a snapshot of the logical volume. The method may further include generating, using the computer hardware, mapping information between a particular one of the plurality of applications and a portion of the snapshot relating to the particular one of the plurality of applications. The method can additionally include storing the snapshot in secondary storage.

According to other embodiments, an information management system configured to generate a snapshot of data relating to a plurality of applications is provided. The system can include a first data agent executing at least in part on a client computing device, the first data agent being associated with a first application executing on the client computing device. The system can also include a second data agent executing at least in part on the client computing device, the second data agent being associated with a second application executing on the client computing device, data generated by the first application and data generated by the second application being stored in a logical volume in primary storage. The system may also include a snapshot manager executing on computer hardware. The snapshot manager may be configured to communicate with the first data agent to check whether the first application is in a consistent state and communicate with the second data agent to check whether the second application is in a consistent state. The snapshot manager may also be configured to, in response to receiving a first notification from the first data agent that the first application is in a consistent state and a second notification from the second data agent that the second application is in a consistent state: obtain a snapshot of the logical volume; copy the snapshot of the logical volume to secondary storage using one or more media agents; generate first mapping information between the first application and a portion of the snapshot relating to the first application based at least in part on metadata relating to a first location of the data generated by the first application in the logical volume, the metadata relating to the first location obtained by the first data agent; and generate second mapping information between the second application and a portion of the snapshot relating to the second application based at least in part on metadata relating to a second location of the data generated by the second application in the logical volume, the metadata relating to the second location obtained by the second data agent.

According to certain embodiments, a method of generating a snapshot of data relating to a plurality of applications is provided. The method may include communicating with a first data agent to check whether a first application is in a consistent state, the first data agent executing at least in part on a client computing device, the first application executing on the client computing device, the first data agent being associated with the first application. The method may also include communicating with a second data agent to check whether a second application is in a consistent state, the second data agent executing at least in part on the client computing device, the second application executing on the client computing device, the second data agent being associated with the second application, data generated by the first application and data generated by the second application being stored in a logical volume in primary storage. The method can also include, in response to receiving a first notification from the first data agent that the first application is in a consistent state and a second notification from the second data agent that the second application is in a consistent state, obtaining a snapshot of the logical volume using computer hardware. The method can further include copying the snapshot of the logical volume to secondary storage using one or more media agents. The method may further include generating first mapping information between the first application and a portion of the snapshot relating to the first application based at least in part on metadata relating to a first location of the data generated by the first application in the logical volume, the metadata relating to the first location obtained by the first data agent. The method may additionally include generating second mapping information between the second application and a portion of the snapshot relating to the second application based at least in part on metadata relating to a second location of the data generated by the second application in the logical volume, the metadata relating to the second location obtained by the second data agent.

According to some embodiments, an information management system configured to generate a snapshot of data relating to a plurality of applications is provided. The system can include a plurality of data agents executing at least in part on a client computing device, each data agent being associated with at least one of a plurality of applications executing on the client computing device, wherein: data generated by the plurality of applications is stored in a logical volume in primary storage; and the plurality of data agents comprises at least a database data agent associated with a database application, the database data agent configured to back up one or more log files of a database log of the database application separately from data of the database application. The system may also include a snapshot manager executing on computer hardware. The snapshot manager may be configured to detect the plurality of applications executing on the client computing device. The snapshot manager may also be configured to, in response to receiving notifications from the plurality of data agents that the associated applications are in consistent states, obtain a snapshot of the logical volume that comprises the data generated by the plurality of applications. The snapshot manager can also be configured to generate mapping information between a particular one of the plurality of applications and a portion of the snapshot relating to the particular one of the plurality of applications, the mapping information comprising database application mapping information between the database application and a portion of the snapshot relating to the database application. The snapshot manager can further be configured to copy the snapshot to the secondary storage using one or more media agents. The snapshot manager can additionally be configured to truncate the database log of the database application.

According to other embodiments, a method of generating a snapshot of data relating to a plurality of applications is provided. The method can include detecting a plurality of applications executing on a client computing device, a plurality of data agents executing at least in part on the client computing device, each data agent being associated with at least one of the plurality of applications executing on the client computing device, wherein: data generated by the plurality of applications is stored in a logical volume in primary storage; and the plurality of data agents comprises at least a database data agent associated with a database application, the database data agent configured to back up one or more log files of a database log of the database application to secondary storage separately from data of the database application. The method may also include sending requests to the plurality of data agents to check whether the associated applications are in consistent states. The method may further include, in response to receiving notifications from the plurality of data agents that the associated applications are in consistent states, obtaining a snapshot of the logical volume that comprises the data generated by the plurality of applications. The method can further include generating mapping information between a particular one of the plurality of applications and a portion of the snapshot relating to the particular one of the plurality of applications, the mapping information comprising database application mapping information between the database application and a portion of the snapshot relating to the database application. The method can additionally include copying the snapshot to the secondary storage using one or more media agents. The method may also include truncating the database log of the database application using computer hardware.

According to certain embodiments, an information management system configured to restore data of an application from a snapshot comprising data of a plurality of applications is provided. The system can include computer hardware and a snapshot manager executing on the computer hardware. The snapshot manager may be configured to receive instructions to restore data of a first application from a snapshot in secondary storage, the snapshot comprising data of a plurality of applications stored in a logical volume in primary storage at a first time, the plurality of applications comprising the first application and executing on a client computing device at the first time, the plurality of applications being in consistent states at the first time. The snapshot manager may also be configured to access mapping information that maps data of the first application in the snapshot to the first application. The snapshot manager may be further configured to locate a portion of the snapshot corresponding to the data of the first application to be restored. The snapshot manager may additionally be configured to copy the portion of the snapshot from the secondary storage to a primary storage device using one or more media agents.

According to some embodiments, a method of restoring data of an application from a snapshot comprising data of a plurality of applications is provided. The method can include receiving instructions to restore data of a first application from a snapshot in secondary storage, the snapshot comprising data of a plurality of applications stored in a logical volume in primary storage at a first time, the plurality of applications comprising the first application and executing on a client computing device at the first time, the plurality of applications being in consistent states at the first time. The method may also include accessing mapping information that maps data of the first application in the snapshot to the first application. The method may further include locating, using computer hardware, a portion of the snapshot corresponding to the data of the first application to be restored. The method can also include copying the portion of the snapshot from the secondary storage to a primary storage device using one or more media agents.

According to other embodiments, an information management system configured to generate snapshots is provided. The system may include a storage manager, executing on computer hardware, configured to initiate generation of a snapshot of data in primary storage. The system may also include one or more media agents, executing on computer hardware, configured to obtain a snapshot of data in the primary storage and in communication with secondary storage for storing the snapshot. The system can also include a snapshot readiness manager executing on computer hardware. The snapshot readiness manager may be configured to access at a first time a storage policy defining criteria associated with a snapshot operation to obtain a snapshot of data in the primary storage, the storage policy configured to instruct the storage manager to initiate the snapshot operation, and the storage manager configured to instruct the one or more media agents to obtain the snapshot for the snapshot operation. The snapshot readiness manager may also be configured to determine without executing the storage policy whether execution of the storage policy will succeed at a second time that is later than the first time. The snapshot readiness manager may be further configured to provide a result from the determination as to whether the execution of the storage policy will succeed.

According to certain embodiments, a method of verifying snapshot storage operations for an information management system is provided. The method may include accessing at a first time, using computer hardware, a storage policy defining criteria associated with a snapshot operation for obtaining a snapshot of data in primary storage of an information management system. The information management system may include a storage manager executing on computer hardware and configured to initiate generation of a snapshot of data stored in the primary storage. The information management system may also include one or more media agents executing on computer hardware and configured to obtain a snapshot of data stored in the primary storage. The storage policy may be configured to instruct the storage manager to initiate the snapshot operation. The storage manager may be configured to instruct the one or more media agents to obtain the snapshot for the snapshot operation. The method can also include determining whether execution of the snapshot storage policy will succeed at a second time that is later than the first time, said determining being performed without executing the snapshot storage policy. The method may further include providing a result from said determining whether execution of the snapshot storage policy will succeed.

For purposes of summarizing the disclosure, certain aspects, advantages and novel features of the inventions have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

DETAILED DESCRIPTION

Figure 1A:
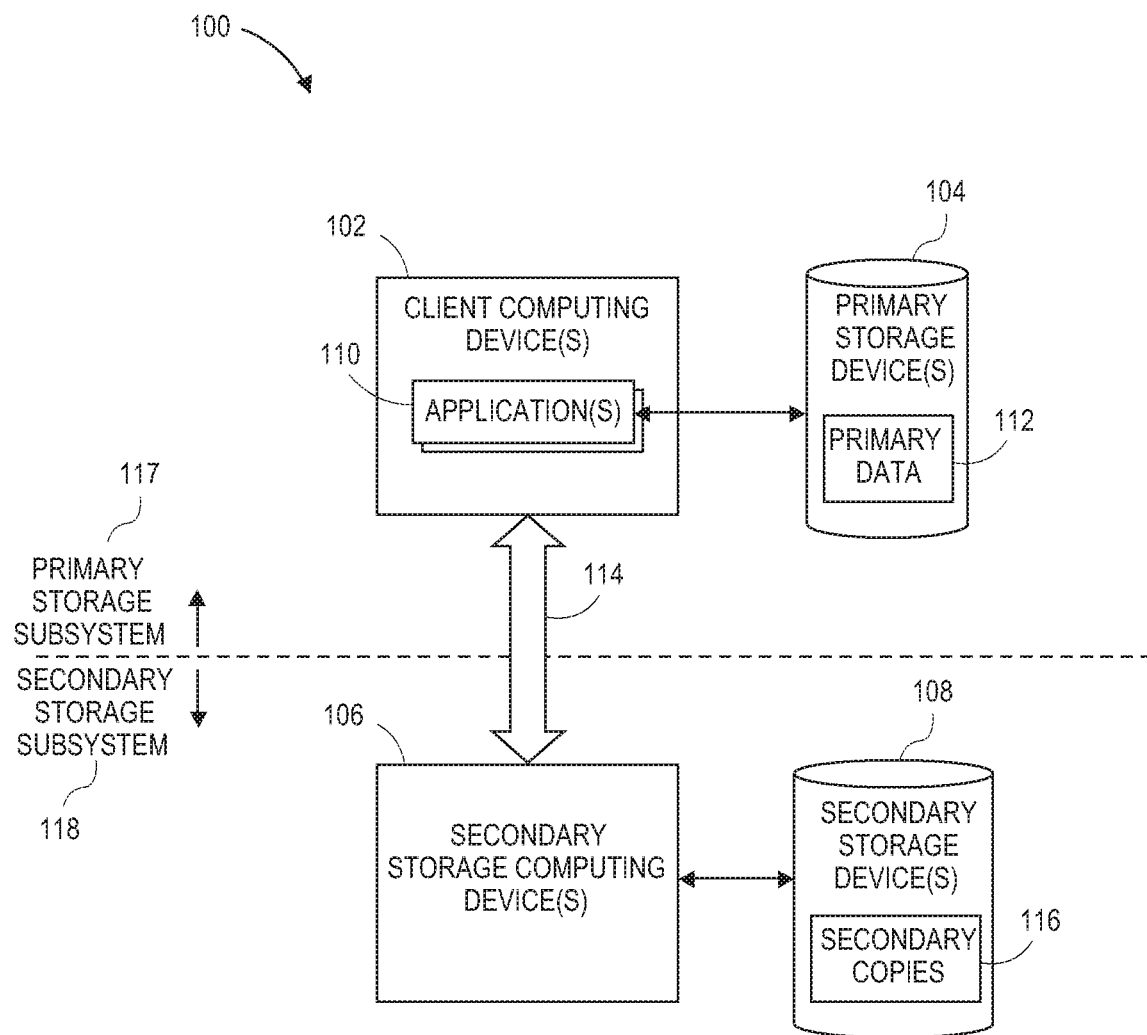
FIG. 1A is a block diagram illustrating an exemplary information management system.

Systems and methods are described herein for implementing single snapshot for multiple applications and for checking and reporting on snapshot readiness. Examples of such systems and methods are discussed in further detail herein, e.g., with respect to FIGS. 2-12. Moreover, it will be appreciated that single snapshot for multiple applications and snapshot readiness checking and reporting may be implemented by information management systems such as those that will now be described with respect to FIGS. 1A-1H. And, as will be described, the componentry for implementing single snapshot for multiple applications and snapshot readiness checking and reporting can be incorporated into such systems.

System Overview

The systems and methods described with respect to FIGS. 1A-1H can be used for implementing single snapshot for multiple applications. In some embodiments, a snapshot manager is a software module that forms a part of or resides on the storage manager 140 or, alternatively, the media agents 144. The snapshot manager can additionally be a software module executing on one or more of the client computing devices 102. In some embodiments, the snapshot manager may be implemented as a part of the data agent 142. Single snapshot for multiple applications will be discussed in more detail with respect to FIGS. 2-10. Furthermore, systems and methods for checking and reporting on snapshot readiness are also described herein, with particular respect to FIGS. 11-12. In some embodiments, a snapshot readiness manager is a software module that forms a part of or resides on the storage manager 140 or, alternatively, the media agents 144. The snapshot readiness manager can additionally be a software module executing on one or more of the client computing devices 102. In certain embodiments, the snapshot readiness manager may be implemented as a part of the data agent 142. In some embodiments, the snapshot manager and the snapshot readiness manager described herein are implemented as separate modules; in other embodiments, they are implemented as a single unified module that executes on one or more of the above-mentioned components.

Information Management System Overview

With the increasing importance of protecting and leveraging data, organizations simply cannot afford to take the risk of losing critical data. Moreover, runaway data growth and other modern realities make protecting and managing data an increasingly difficult task. There is therefore a need for efficient, powerful, and user-friendly solutions for protecting and managing data.

Depending on the size of the organization, there are typically many data production sources which are under the purview of tens, hundreds, or even thousands of employees or other individuals. In the past, individual employees were sometimes responsible for managing and protecting their data. A patchwork of hardware and software point solutions has been applied in other cases. These solutions were often provided by different vendors and had limited or no interoperability.

Certain embodiments described herein provide systems and methods capable of addressing these and other shortcomings of prior approaches by implementing unified, organization-wide information management. FIG. 1A shows one such information management system 100, which generally includes combinations of hardware and software configured to protect and manage data and metadata generated and used by the various computing devices in the information management system 100.

The organization which employs the information management system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to CommVault Systems, Inc., each of which is hereby incorporated in its entirety by reference herein:

- U.S. Pat. No. 8,285,681, entitled "Data Object Store and Server for a Cloud Storage Environment, Including Data Deduplication and Data Management Across Multiple Cloud Storage Sites";
- U.S. Pat. No. 8,307,177, entitled "Systems And Methods For Management Of Virtualization Data";
- U.S. Pat. No. 7,035,880, entitled "Modular Backup and Retrieval System Used in Conjunction With a Storage Area Network";
- U.S. Pat. No. 7,343,453, entitled "Hierarchical Systems and Methods for Providing a Unified View of Storage Information";
- U.S. Pat. No. 7,395,282, entitled "Hierarchical Backup and Retrieval System";
- U.S. Pat. No. 7,246,207, entitled "System and Method for Dynamically Performing Storage Operations in a Computer Network";
- U.S. Pat. No. 7,747,579, entitled "Metabase for Facilitating Data Classification";
- U.S. Pat. No. 8,229,954, entitled "Managing Copies of Data";
- U.S. Pat. No. 7,617,262, entitled "System and Methods for Monitoring Application Data in a Data Replication System";
- U.S. Pat. No. 7,529,782, entitled "System and Methods for Performing a Snapshot and for Restoring Data";
- U.S. Pat. No. 8,230,195, entitled "System And Method For Performing Auxiliary Storage Operations";
- U.S. Pat. No. 7,315,923, entitled "System And Method For Combining Data Streams In Pipelined Storage Operations In A Storage Network";
- U.S. Pat. No. 8,364,652, entitled "Content-Aligned, Block-Based Deduplication";
- U.S. Pat. Pub. No. 2006/0224846, entitled "System and Method to Support Single Instance Storage Operations";
- U.S. Pat. No. 8,578,120, entitled "Block-Level Single Instancing";
- U.S. Pat. Pub. No. 2009/0319534, entitled "Application-Aware and Remote Single Instance Data Management";
- U.S. Pat. Pub. No. 2012/0150826, entitled "Distributed Deduplicated Storage System";
- U.S. Pat. Pub. No. 2012/0150818, entitled "Client-Side Repository in a Networked Deduplicated Storage System";
- U.S. Pat. No. 8,170,995, entitled "Method and System for Offline Indexing of Content and Classifying Stored Data";
- U.S. Pat. No. 7,107,298, entitled "System And Method For Archiving Objects In An Information Store";
- U.S. Pat. No. 8,230,195, entitled "System And Method For Performing Auxiliary Storage Operations";
- U.S. Pat. No. 8,229,954, entitled "Managing Copies Of Data"; and
- U.S. Pat. No. 8,156,086, entitled "Systems And Methods For Stored Data Verification".

The information management system 100 can include a variety of different computing devices. For instance, as will be described in greater detail herein, the information management system 100 can include one or more client computing devices 102 and secondary storage computing devices 106.

Computing devices can include, without limitation, one or more: workstations, personal computers, desktop computers, or other types of generally fixed computing systems such as mainframe computers and minicomputers.

Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Computing devices can include servers, such as mail servers, file servers, database servers, and web servers.

In some cases, a computing device includes virtualized and/or cloud computing resources. For instance, one or more virtual machines may be provided to the organization by a third-party cloud service vendor. Or, in some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host computer. One example of hypervisor as virtualization software is ESX Server, by VMware, Inc. of Palo Alto, Calif.; other examples include Microsoft Virtual Server and Microsoft Windows Server Hyper-V, both by Microsoft Corporation of Redmond, Wash., and Sun xVM by Oracle America Inc. of Santa Clara, Calif. In some embodiments, the hypervisor may be firmware or hardware or a combination of software and/or firmware and/or hardware.

The hypervisor provides to each virtual operating system virtual resources, such as a virtual processor, virtual memory, a virtual network device, and a virtual disk. Each virtual machine has one or more virtual disks. The hypervisor typically stores the data of virtual disks in files on the file system of the physical host computer, called virtual machine disk files (in the case of VMware virtual servers) or virtual hard disk image files (in the case of Microsoft virtual servers). For example, VMware's ESX Server provides the Virtual Machine File System (VMFS) for the storage of virtual machine disk files. A virtual machine reads data from and writes data to its virtual disk much the same way that an actual physical machine reads data from and writes data to an actual disk.

Examples of techniques for implementing information management techniques in a cloud computing environment are described in U.S. Pat. No. 8,285,681, which is incorporated by reference herein. Examples of techniques for implementing information management techniques in a virtualized computing environment are described in U.S. Pat. No. 8,307,177, also incorporated by reference herein.

The information management system 100 can also include a variety of storage devices, including primary storage devices 104 and secondary storage devices 108, for example. Storage devices can generally be of any suitable type including, without limitation, disk drives, hard-disk arrays, semiconductor memory (e.g., solid state storage devices), network attached storage (NAS) devices, tape libraries or other magnetic, non-tape storage devices, optical media storage devices, DNA/RNA-based memory technology, combinations of the same, and the like. In some embodiments, storage devices can form part of a distributed file system. In some cases, storage devices are provided in a cloud (e.g., a private cloud or one operated by a third-party vendor). A storage device in some cases comprises a disk array or portion thereof.

The illustrated information management system 100 includes one or more client computing device 102 having at least one application 110 executing thereon, and one or more primary storage devices 104 storing primary data 112. The client computing device(s) 102 and the primary storage devices 104 may generally be referred to in some cases as a primary storage subsystem 117. A computing device in an information management system 100 that has a data agent 142 installed on it is generally referred to as a client computing device 102 (or, in the context of a component of the information management system 100 simply as a "client").

Depending on the context, the term "information management system" can refer to generally all of the illustrated hardware and software components. Or, in other instances, the term may refer to only a subset of the illustrated components.

For instance, in some cases, the information management system 100 generally refers to a combination of specialized components used to protect, move, manage, manipulate, analyze, and/or process data and metadata generated by the client computing devices 102. However, the information management system 100 in some cases does not include the underlying components that generate and/or store the primary data 112, such as the client computing devices 102 themselves, the applications 110 and operating system residing on the client computing devices 102, and the primary storage devices 104. As an example, "information management system" may sometimes refer to one or more of the following components and corresponding data structures: storage managers, data agents, and media agents. These components will be described in further detail below.

Client Computing Devices

There are typically a variety of sources in an organization that produce data to be protected and managed. As just one illustrative example, in a corporate environment such data sources can be employee workstations and company servers such as a mail server, a web server, or the like. In the information management system 100, the data generation sources include the one or more client computing devices 102.

The client computing devices 102 may include any of the types of computing devices described above, without limitation, and in some cases the client computing devices 102 are associated with one or more users and/or corresponding user accounts, of employees or other individuals.

The information management system 100 generally addresses and handles the data management and protection needs for the data generated by the client computing devices 102. However, the use of this term does not imply that the client computing devices 102 cannot be "servers" in other respects. For instance, a particular client computing device 102 may act as a server with respect to other devices, such as other client computing devices 102. As just a few examples, the client computing devices 102 can include mail servers, file servers, database servers, and web servers.

Each client computing device 102 may have one or more applications 110 (e.g., software applications) executing thereon which generate and manipulate the data that is to be protected from loss and managed.

The applications 110 generally facilitate the operations of an organization (or multiple affiliated organizations), and can include, without limitation, mail server applications (e.g., Microsoft Exchange Server), file server applications, mail client applications (e.g., Microsoft Exchange Client), database applications (e.g., SQL, Oracle, SAP, Lotus Notes Database), word processing applications (e.g., Microsoft Word), spreadsheet applications, financial applications, presentation applications, browser applications, mobile applications, entertainment applications, and so on.

The client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110.

As shown, the client computing devices 102 and other components in the information management system 100 can be connected to one another via one or more communication pathways 114. The communication pathways 114 can include one or more networks or other connection types including as any of following, without limitation: the Internet, a wide area network (WAN), a local area network (LAN), a Storage Area Network (SAN), a Fibre Channel connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate wired, wireless, or partially wired/wireless computer or telecommunications networks, combinations of the same or the like. The communication pathways 114 in some cases may also include application programming interfaces (APIs) including, e.g., cloud service provider APIs, virtual machine management APIs, and hosted service provider APIs.

Primary Data and Exemplary Primary Storage Devices

Primary data 112 according to some embodiments is production data or other "live" data generated by the operating system and other applications 110 residing on a client computing device 102. The primary data 112 is generally stored on the primary storage device(s) 104 and is organized via a file system supported by the client computing device 102. For instance, the client computing device(s) 102 and corresponding applications 110 may create, access, modify, write, delete, and otherwise use primary data 112. In some cases, some or all of the primary data 112 can be stored in cloud storage resources.

Primary data 112 is generally in the native format of the source application 110. According to certain aspects, primary data 112 is an initial or first (e.g., created before any other copies or before at least one other copy) stored copy of data generated by the source application 110. Primary data 112 in some cases is created substantially directly from data generated by the corresponding source applications 110.

The primary data 112 may sometimes be referred to as a "primary copy" in the sense that it is a discrete set of data. However, the use of this term does not necessarily imply that the "primary copy" is a copy in the sense that it was copied or otherwise derived from another stored version.

The primary storage devices 104 storing the primary data 112 may be relatively fast and/or expensive (e.g., a disk drive, a hard-disk array, solid state memory, etc.). In addition, primary data 112 may be intended for relatively short term retention (e.g., several hours, days, or weeks).

According to some embodiments, the client computing device 102 can access primary data 112 from the primary storage device 104 by making conventional file system calls via the operating system. Primary data 112 representing files may include structured data (e.g., database files), unstructured data (e.g., documents), and/or semi-structured data. Some specific examples are described below with respect to FIG. 1B.

It can be useful in performing certain tasks to organize the primary data 112 into units of different granularities. In general, primary data 112 can include files, directories, file system volumes, data blocks, extents, or any other hierarchies or organizations of data objects. As used herein, a "data object" can refer to both (1) any file that is currently addressable by a file system or that was previously addressable by the file system (e.g., an archive file) and (2) a subset of such a file (e.g., a data block).

As will be described in further detail, it can also be useful in performing certain functions of the information management system 100 to access and modify metadata within the primary data 112. Metadata generally includes information about data objects or characteristics associated with the data objects.

Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists [ACLs]), system metadata (e.g., registry information), combinations of the same or the other similar information related to the data object.

In addition to metadata generated by or related to file systems and operating systems, some of the applications 110 and/or other components of the information management system 100 maintain indices of metadata for data objects, e.g., metadata associated with individual email messages. Thus, each data object may be associated with corresponding metadata. The use of metadata to perform classification and other functions is described in greater detail below.

Each of the client computing devices 102 are generally associated with and/or in communication with one or more of the primary storage devices 104 storing corresponding primary data 112. A client computing device 102 may be considered to be "associated with" or "in communication with" a primary storage device 104 if it is capable of one or more of: routing and/or storing data to the particular primary storage device 104, coordinating the routing and/or storing of data to the particular primary storage device 104, retrieving data from the particular primary storage device 104, coordinating the retrieval of data from the particular primary storage device 104, and modifying and/or deleting data retrieved from the particular primary storage device 104.

The primary storage devices 104 can include any of the different types of storage devices described above, or some other kind of suitable storage device. The primary storage devices 104 may have relatively fast I/O times and/or are relatively expensive in comparison to the secondary storage devices 108. For example, the information management system 100 may generally regularly access data and metadata stored on primary storage devices 104, whereas data and metadata stored on the secondary storage devices 108 is accessed relatively less frequently.

In some cases, each primary storage device 104 is dedicated to an associated client computing device 102. For instance, a primary storage device 104 in one embodiment is a local disk drive of a corresponding client computing device 102. In other cases, one or more primary storage devices 104 can be shared by multiple client computing devices 102, e.g., via a network such as in a cloud storage implementation. As one example, a primary storage device 104 can be a disk array shared by a group of client computing devices 102, such as one of the following types of disk arrays: EMC Clariion, EMC Symmetrix, EMC Celerra, Dell EqualLogic, IBM XIV, NetApp FAS, HP EVA, and HP 3PAR.

The information management system 100 may also include hosted services (not shown), which may be hosted in some cases by an entity other than the organization that employs the other components of the information management system 100. For instance, the hosted services may be provided by various online service providers to the organization. Such service providers can provide services including social networking services, hosted email services, or hosted productivity applications or other hosted applications).

Hosted services may include software-as-a-service (SaaS), platform-as-a-service (PaaS), application service providers (ASPs), cloud services, or other mechanisms for delivering functionality via a network. As it provides services to users, each hosted service may generate additional data and metadata under management of the information management system 100, e.g., as primary data 112. In some cases, the hosted services may be accessed using one of the applications 110. As an example, a hosted mail service may be accessed via browser running on a client computing device 102. The hosted services may be implemented in a variety of computing environments. In some cases, they are implemented in an environment having a similar arrangement to the information management system 100, where various physical and logical components are distributed over a network.

Secondary Copies and Exemplary Secondary Storage Devices

The primary data 112 stored on the primary storage devices 104 may be compromised in some cases, such as when an employee deliberately or accidentally deletes or overwrites primary data 112 during their normal course of work. Or the primary storage devices 104 can be damaged or otherwise corrupted.

For recovery and/or regulatory compliance purposes, it is therefore useful to generate copies of the primary data 112.

Accordingly, the information management system 100 includes one or more secondary storage computing devices 106 and one or more secondary storage devices 108 configured to create and store one or more secondary copies 116 of the primary data 112 and associated metadata. The secondary storage computing devices 106 and the secondary storage devices 108 may sometimes be referred to as a secondary storage subsystem 118.

Creation of secondary copies 116 can help in search and analysis efforts and meet other information management goals, such as: restoring data and/or metadata if an original version (e.g., of primary data 112) is lost (e.g., by deletion, corruption, or disaster); allowing point-in-time recovery; complying with regulatory data retention and electronic discovery (e-discovery) requirements; reducing utilized storage capacity; facilitating organization and search of data; improving user access to data files across multiple computing devices and/or hosted services; and implementing data retention policies.

The client computing devices 102 access or receive primary data 112 and communicate the data, e.g., over the communication pathways 114, for storage in the secondary storage device(s) 108.

A secondary copy 116 can comprise a separate stored copy of application data that is derived from one or more earlier-created, stored copies (e.g., derived from primary data 112 or another secondary copy 116). Secondary copies 116 can include point-in-time data, and may be intended for relatively long-term retention (e.g., weeks, months or years), before some or all of the data is moved to other storage or is discarded.

In some cases, a secondary copy 116 is a copy of application data created and stored subsequent to at least one other stored instance (e.g., subsequent to corresponding primary data 112 or to another secondary copy 116), in a different storage device than at least one previous stored copy, and/or remotely from at least one previous stored copy. In some other cases, secondary copies can be stored in the same storage device as primary data 112 and/or other previously stored copies. For example, in one embodiment a disk array capable of performing hardware snapshots stores primary data 112 and creates and stores hardware snapshots of the primary data 112 as secondary copies 116. Secondary copies 116 may be stored in relatively slow and/or low cost storage (e.g., magnetic tape). A secondary copy 116 may be stored in a backup or archive format, or in some other format different than the native source application format or other primary data format.

In some cases, secondary copies 116 are indexed so users can browse and restore at another point in time. After creation of a secondary copy 116 representative of certain primary data 112, a pointer or other location indicia (e.g., a stub) may be placed in primary data 112, or be otherwise associated with primary data 112 to indicate the current location on the secondary storage device(s) 108.

Since an instance of a data object or metadata in primary data 112 may change over time as it is modified by an application 110 (or hosted service or the operating system), the information management system 100 may create and manage multiple secondary copies 116 of a particular data object or metadata, each representing the state of the data object in primary data 112 at a particular point in time. Moreover, since an instance of a data object in primary data 112 may eventually be deleted from the primary storage device 104 and the file system, the information management system 100 may continue to manage point-in-time representations of that data object, even though the instance in primary data 112 no longer exists.

For virtualized computing devices the operating system and other applications 110 of the client computing device(s) 102 may execute within or under the management of virtualization software (e.g., a VMM), and the primary storage device(s) 104 may comprise a virtual disk created on a physical storage device. The information management system 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112 in a variety of ways, some of which will now be described. First, as discussed, secondary copies 116 can be stored in a different format (e.g., backup, archive, or other non-native format) than primary data 112. For this or other reasons, secondary copies 116 may not be directly useable by the applications 110 of the client computing device 102, e.g., via standard system calls or otherwise without modification, processing, or other intervention by the information management system 100.

Secondary copies 116 are also in some embodiments stored on a secondary storage device 108 that is inaccessible to the applications 110 running on the client computing devices 102 (and/or hosted services). Some secondary copies 116 may be "offline copies," in that they are not readily available (e.g., not mounted to tape or disk). Offline copies can include copies of data that the information management system 100 can access without human intervention (e.g., tapes within an automated tape library, but not yet mounted in a drive), and copies that the information management system 100 can access only with at least some human intervention (e.g., tapes located at an offsite storage site).

The Use of Intermediate Devices for Creating Secondary Copies

Creating secondary copies can be a challenging task. For instance, there can be hundreds or thousands of client computing devices 102 continually generating large volumes of primary data 112 to be protected. Also, there can be significant overhead involved in the creation of secondary copies 116. Moreover, secondary storage devices 108 may be special purpose components, and interacting with them can require specialized intelligence.

In some cases, the client computing devices 102 interact directly with the secondary storage device 108 to create the secondary copies 116. However, in view of the factors described above, this approach can negatively impact the ability of the client computing devices 102 to serve the applications 110 and produce primary data 112. Further, the client computing devices 102 may not be optimized for interaction with the secondary storage devices 108.

Thus, in some embodiments, the information management system 100 includes one or more software and/or hardware components which generally act as intermediaries between the client computing devices 102 and the secondary storage devices 108. In addition to off-loading certain responsibilities from the client computing devices 102, these intermediate components can provide other benefits. For instance, as discussed further below with respect to FIG. 1D, distributing some of the work involved in creating secondary copies 116 can enhance scalability.

The intermediate components can include one or more secondary storage computing devices 106 as shown in FIG. 1A and/or one or more media agents, which can be software modules residing on corresponding secondary storage computing devices 106 (or other appropriate devices). Media agents are discussed below (e.g., with respect to FIGS. 1C-1E).

The secondary storage computing device(s) 106 can comprise any of the computing devices described above, without limitation. In some cases, the secondary storage computing device(s) 106 include specialized hardware and/or software componentry for interacting with the secondary storage devices 108.

To create a secondary copy 116 involving the copying of data from the primary storage subsystem 117 to the secondary storage subsystem 118, the client computing device 102 in some embodiments communicates the primary data 112 to be copied (or a processed version thereof) to the designated secondary storage computing device 106, via the communication pathway 114. The secondary storage computing device 106 in turn conveys the received data (or a processed version thereof) to the secondary storage device 108. In some such configurations, the communication pathway 114 between the client computing device 102 and the secondary storage computing device 106 comprises a portion of a LAN, WAN or SAN. In other cases, at least some client computing devices 102 communicate directly with the secondary storage devices 108 (e.g., via Fibre Channel or SCSI connections). In some other cases, one or more secondary copies 116 are created from existing secondary copies, such as in the case of an auxiliary copy operation, described in greater detail below.

Exemplary Primary Data and an Exemplary Secondary Copy

Figure 1B:
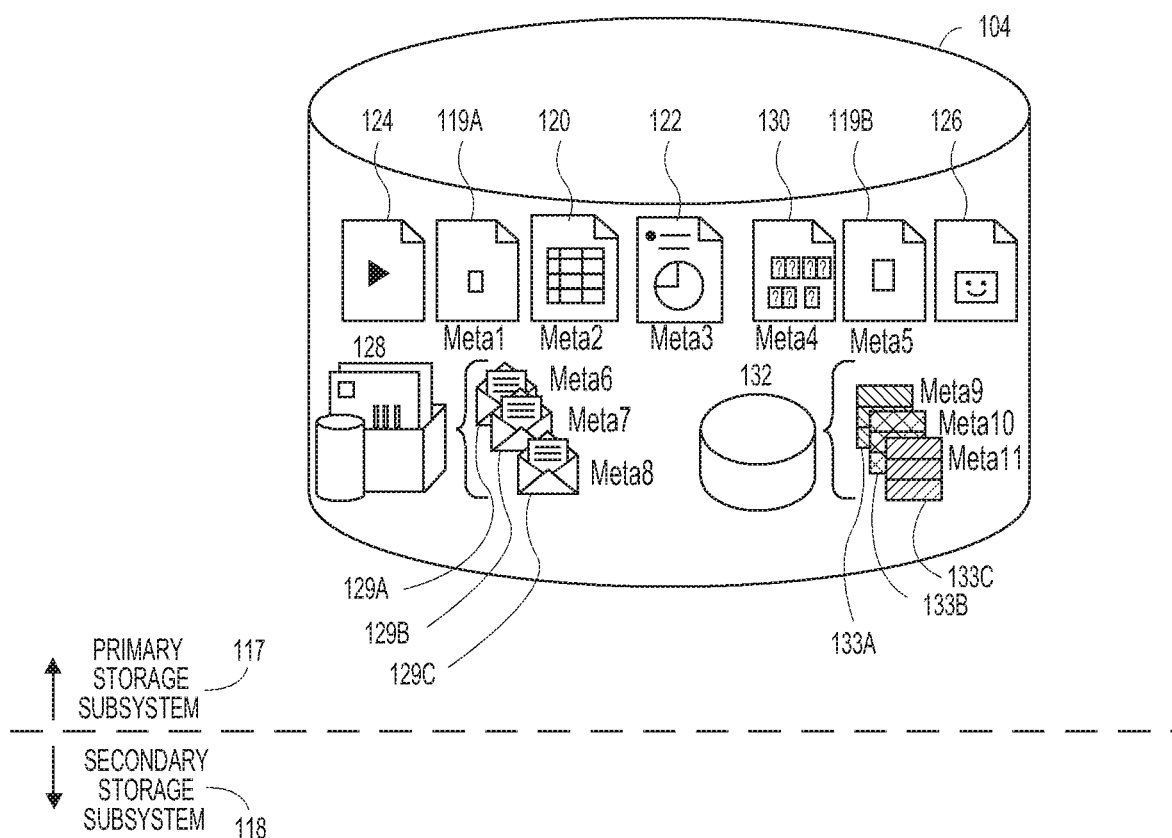
FIG. 1B is a detailed view of a primary storage device, a secondary storage device, and some examples of primary data and secondary copy data.
Figure 1B:
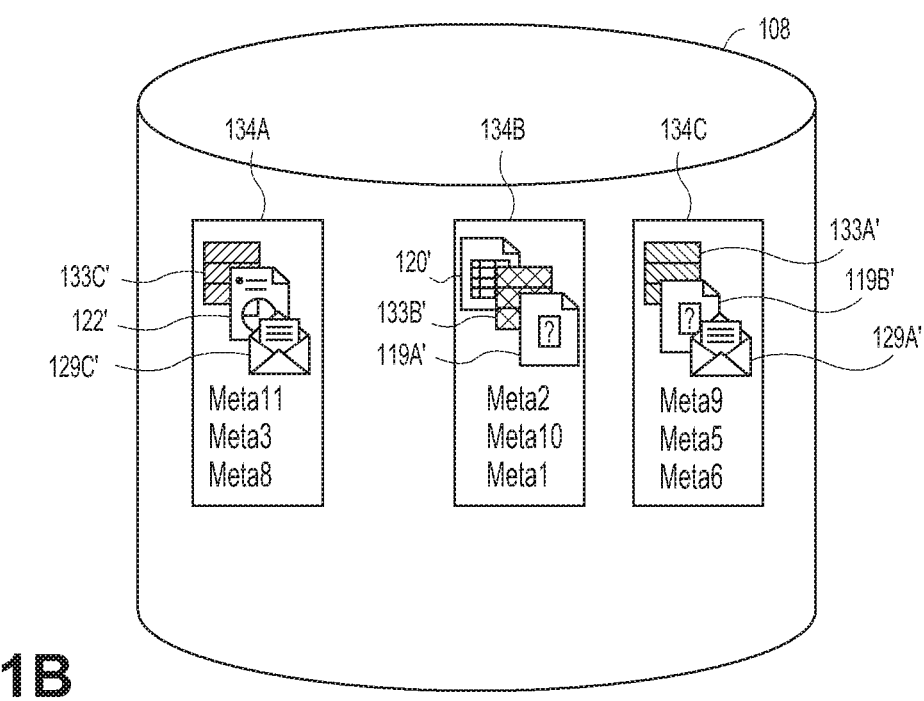
Figure 1C:
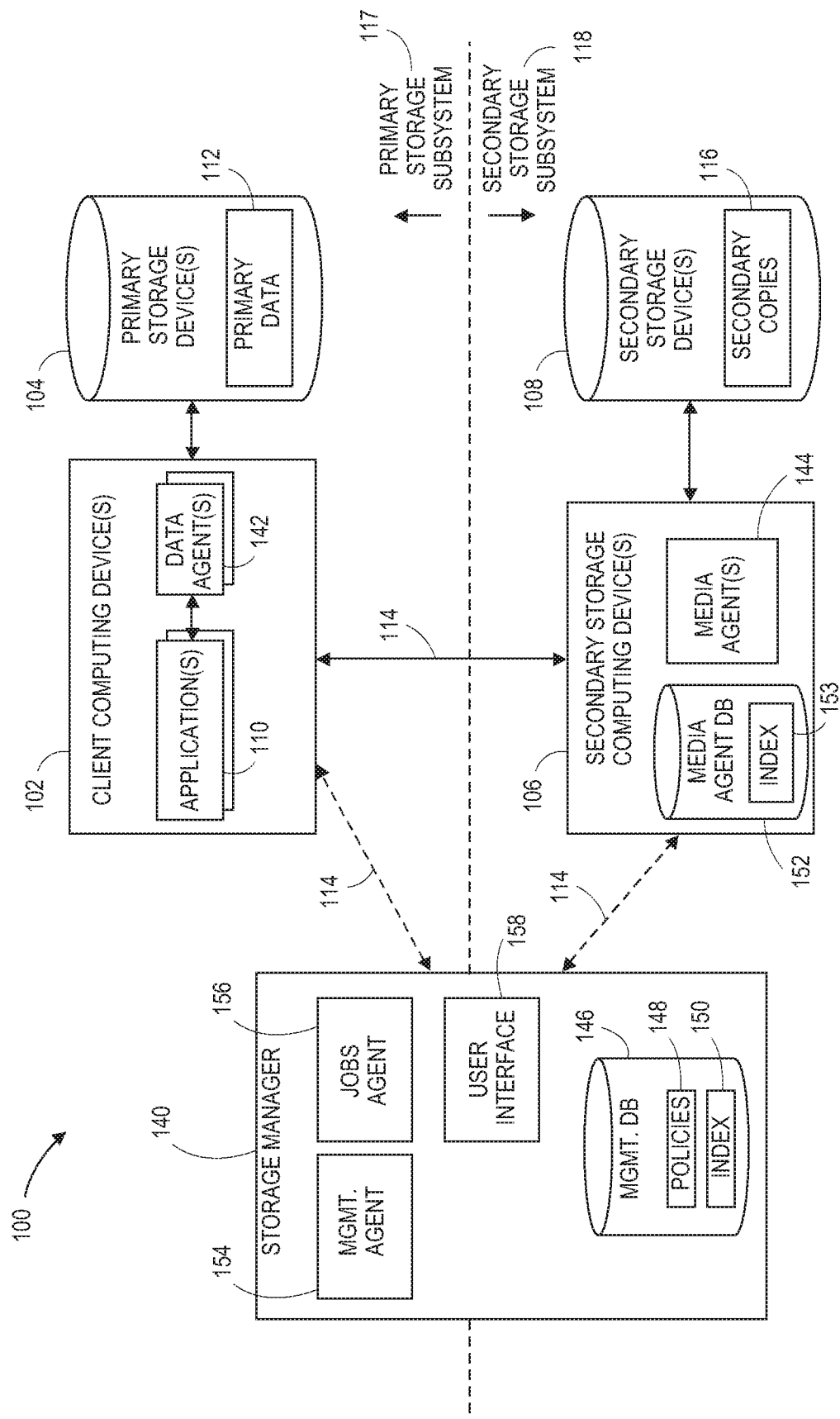
FIG. 1C is a block diagram of an exemplary information management system including a storage manager, one or more data agents, and one or more media agents.

FIG. 1B is a detailed view showing some specific examples of primary data stored on the primary storage device(s) 104 and secondary copy data stored on the secondary storage device(s) 108, with other components in the system removed for the purposes of illustration. Stored on the primary storage device(s) 104 are primary data objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C).

Some or all primary data objects are associated with corresponding metadata (e.g., "Meta1-11"), which may include file system metadata and/or application specific metadata. Stored on the secondary storage device(s) 108 are secondary copy data objects 134A-C which may include copies of or otherwise represent corresponding primary data objects and metadata.

As shown, the secondary copy data objects 134A-C can individually represent more than one primary data object. For example, secondary copy data object 134A represents three separate primary data objects 133C, 122 and 129C (represented as 133C', 122' and 129C', respectively, and accompanied by the corresponding metadata Meta11, Meta3, and Meta8, respectively). Moreover, as indicated by the prime mark ('), a secondary copy object may store a representation of a primary data object or metadata differently than the original format, e.g., in a compressed, encrypted, deduplicated, or other modified format. Likewise, secondary data object 134B represents primary data objects 120, 133B, and 119A as 120', 133B', and 119A', respectively and accompanied by corresponding metadata Meta2, Meta10, and Meta1, respectively. Also, secondary data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

The information management system 100 can incorporate a variety of different hardware and software components, which can in turn be organized with respect to one another in many different configurations, depending on the embodiment. There are critical design choices involved in specifying the functional responsibilities of the components and the role of each component in the information management system 100. For instance, as will be discussed, such design choices can impact performance as well as the adaptability of the information management system 100 to data growth or other changing circumstances.

Figure 10:
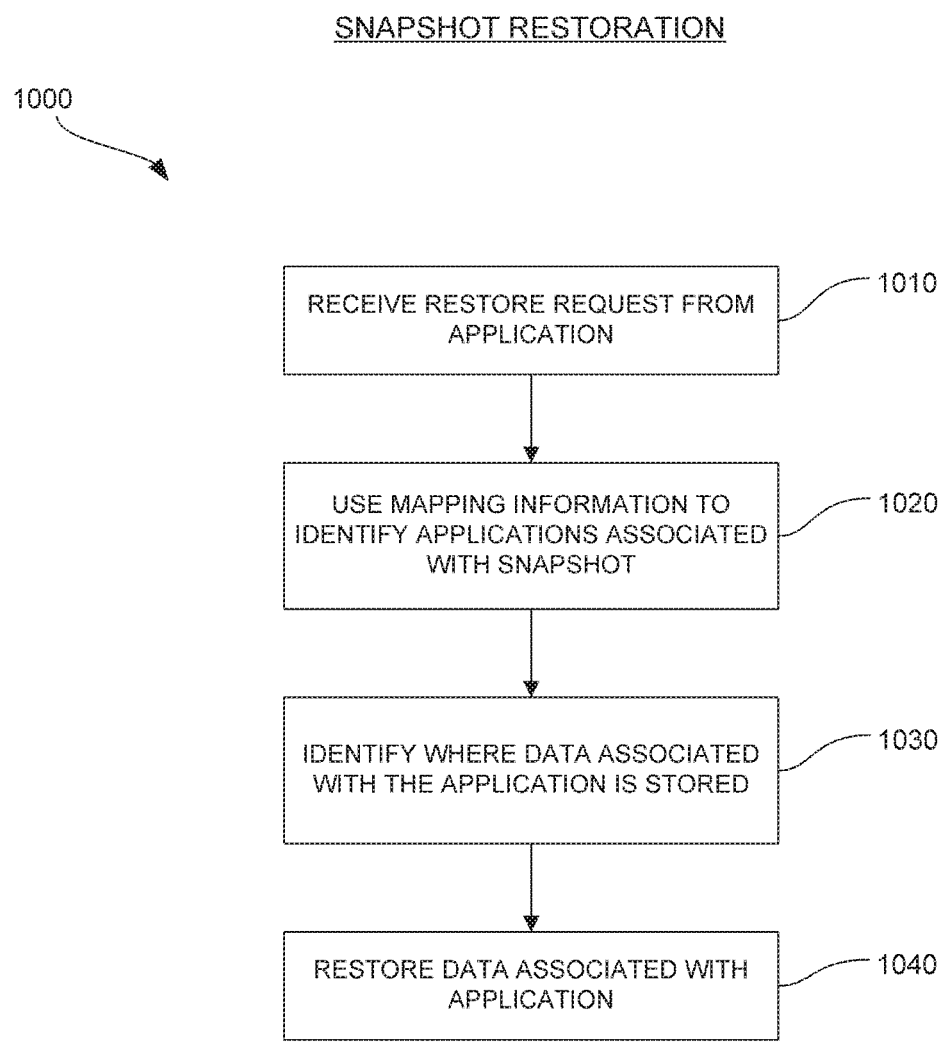
FIG. 10 provides a flowchart illustrating a process for restoring from a shared snapshot according to one or more embodiments disclosed herein.

FIG. 10 shows an information management system 100 designed according to these considerations and which includes: storage manager 140, a centralized storage and/or information manager that is configured to perform certain control functions, one or more data agents 142 executing on the client computing device(s) 102 configured to process primary data 112, and one or more media agents 144 executing on the one or more secondary storage computing devices 106 for performing tasks involving the secondary storage devices 108. While distributing functionality amongst multiple computing devices can have certain advantages, in other contexts it can be beneficial to consolidate functionality on the same computing device. As such, in various other embodiments, one or more of the components shown in FIG. 10 as being implemented on separate computing devices are implemented on the same computing device. In one configuration, a storage manager 140, one or more data agents 142, and one or more media agents 144 are all implemented on the same computing device. In another embodiment, one or more data agents 142 and one or more media agents 144 are implemented on the same computing device, while the storage manager 140 is implemented on a separate computing device.

Storage Manager

As noted, the number of components in the information management system 100 and the amount of data under management can be quite large. Managing the components and data is therefore a significant task, and a task that can grow in an often unpredictable fashion as the quantity of components and data scale to meet the needs of the organization.

For these and other reasons, according to certain embodiments, responsibility for controlling the information management system 100, or at least a significant portion of that responsibility, is allocated to the storage manager 140.

By distributing control functionality in this manner, the storage manager 140 can be adapted independently according to changing circumstances. Moreover, a computing device for hosting the storage manager 140 can be selected to best suit the functions of the storage manager 140. These and other advantages are described in further detail below with respect to FIG. 1D.

The storage manager 140 may be a software module or other application. In some embodiments, storage manager 140 is a computing device comprising circuitry for executing computer instructions and performs the functions described herein. The storage manager generally initiates, performs, coordinates and/or controls storage and other information management operations performed by the information management system 100, e.g., to protect and control the primary data 112 and secondary copies 116 of data and metadata.

As shown by the dashed arrowed lines 114, the storage manager 140 may communicate with and/or control some or all elements of the information management system 100, such as the data agents 142 and media agents 144. Thus, in certain embodiments, control information originates from the storage manager 140, whereas payload data and payload metadata is generally communicated between the data agents 142 and the media agents 144 (or otherwise between the client computing device(s) 102 and the secondary storage computing device(s) 106), e.g., at the direction of the storage manager 140. Control information can generally include parameters and instructions for carrying out information management operations, such as, without limitation, instructions to perform a task associated with an operation, timing information specifying when to initiate a task associated with an operation, data path information specifying what components to communicate with or access in carrying out an operation, and the like. Payload data, on the other hand, can include the actual data involved in the storage operation, such as content data written to a secondary storage device 108 in a secondary copy operation. Payload metadata can include any of the types of metadata described herein, and may be written to a storage device along with the payload content data (e.g., in the form of a header).

In other embodiments, some information management operations are controlled by other components in the information management system 100 (e.g., the media agent(s) 144 or data agent(s) 142), instead of or in combination with the storage manager 140.

According to certain embodiments, the storage manager 140 provides one or more of the following functions:
initiating execution of secondary copy operations;
managing secondary storage devices 108 and inventory/capacity of the same;
reporting, searching, and/or classification of data in the information management system 100;
allocating secondary storage devices 108 for secondary storage operations;
monitoring completion of and providing status reporting related to secondary storage operations;
tracking age information relating to secondary copies 116, secondary storage devices 108, and comparing the age information against retention guidelines;
tracking movement of data within the information management system 100;
tracking logical associations between components in the information management system 100;
protecting metadata associated with the information management system 100; and
implementing operations management functionality.

The storage manager 140 may maintain a database 146 (or "storage manager database 146" or "management database 146") of management-related data and information management policies 148. The database 146 may include a management index 150 (or "index 150") or other data structure that stores logical associations between components of the system, user preferences and/or profiles (e.g., preferences regarding encryption, compression, or deduplication of primary or secondary copy data, preferences regarding the scheduling, type, or other aspects of primary or secondary copy or other operations, mappings of particular information management users or user accounts to certain computing devices or other components, etc.), management tasks, media containerization, or other useful data. For example, the storage manager 140 may use the index 150 to track logical associations between media agents 144 and secondary storage devices 108 and/or movement of data from primary storage devices 104 to secondary storage devices 108. For instance, the index 150 may store data associating a client computing device 102 with a particular media agent 144 and/or secondary storage device 108, as specified in an information management policy 148 (e.g., a storage policy, which is defined in more detail below).

Administrators and other employees may be able to manually configure and initiate certain information management operations on an individual basis. But while this may be acceptable for some recovery operations or other relatively less frequent tasks, it is often not workable for implementing on-going organization-wide data protection and management.

Thus, the information management system 100 may utilize information management policies 148 for specifying and executing information management operations (e.g., on an automated basis). Generally, an information management policy 148 can include a data structure or other information source that specifies a set of parameters (e.g., criteria and rules) associated with storage or other information management operations.

The storage manager database 146 may maintain the information management policies 148 and associated data, although the information management policies 148 can be stored in any appropriate location. For instance, an information management policy 148 such as a storage policy may be stored as metadata in a media agent database 152 or in a secondary storage device 108 (e.g., as an archive copy) for use in restore operations or other information management operations, depending on the embodiment. Information management policies 148 are described further below.

According to certain embodiments, the storage manager database 146 comprises a relational database (e.g., an SQL database) for tracking metadata, such as metadata associated with secondary copy operations (e.g., what client computing devices 102 and corresponding data were protected). This and other metadata may additionally be stored in other locations, such as at the secondary storage computing devices 106 or on the secondary storage devices 108, allowing data recovery without the use of the storage manager 140.

As shown, the storage manager 140 may include a jobs agent 156, a user interface 158, and a management agent 154, all of which may be implemented as interconnected software modules or application programs.

The jobs agent 156 in some embodiments initiates, controls, and/or monitors the status of some or all storage or other information management operations previously performed, currently being performed, or scheduled to be performed by the information management system 100. For instance, the jobs agent 156 may access information management policies 148 to determine when and how to initiate and control secondary copy and other information management operations, as will be discussed further.

The user interface 158 may include information processing and display software, such as a graphical user interface ("GUI"), an application program interface ("API"), or other interactive interface(s) through which users and system processes can retrieve information about the status of information management operations (e.g., storage operations) or issue instructions to the information management system 100 and its constituent components.

Via the user interface 158, users may optionally issue instructions to the components in the information management system 100 regarding performance of storage and recovery operations. For example, a user may modify a schedule concerning the number of pending secondary copy operations. As another example, a user may employ the GUI to view the status of pending storage operations or to monitor the status of certain components in the information management system 100 (e.g., the amount of capacity left in a storage device).

An information management "cell" (or "storage operation cell") may generally include a logical and/or physical grouping of a combination of hardware and software components associated with performing information management operations on electronic data, typically one storage manager 140 and at least one client computing device 102 (comprising data agent(s) 142) and at least one media agent 144. For instance, the components shown in FIG. 1C may together form an information management cell. Multiple cells may be organized hierarchically. With this configuration, cells may inherit properties from hierarchically superior cells or be controlled by other cells in the hierarchy (automatically or otherwise). Alternatively, in some embodiments, cells may inherit or otherwise be associated with information management policies, preferences, information management metrics, or other properties or characteristics according to their relative position in a hierarchy of cells. Cells may also be delineated and/or organized hierarchically according to function, geography, architectural considerations, or other factors useful or desirable in performing information management operations. A first cell may represent a geographic segment of an enterprise, such as a Chicago office, and a second cell may represent a different geographic segment, such as a New York office. Other cells may represent departments within a particular office. Where delineated by function, a first cell may perform one or more first types of information management operations (e.g., one or more first types of secondary or other copies), and a second cell may perform one or more second types of information management operations (e.g., one or more second types of secondary or other copies).

The storage manager 140 may also track information that permits it to select, designate, or otherwise identify content indices, deduplication databases, or similar databases or resources or data sets within its information management cell (or another cell) to be searched in response to certain queries. Such queries may be entered by the user via interaction with the user interface 158. In general, the management agent 154 allows multiple information management cells to communicate with one another. For example, the information management system 100 in some cases may be one information management cell of a network of multiple cells adjacent to one another or otherwise logically related in a WAN or LAN. With this arrangement, the cells may be connected to one another through respective management agents 154.

For instance, the management agent 154 can provide the storage manager 140 with the ability to communicate with other components within the information management system 100 (and/or other cells within a larger information management system) via network protocols and application programming interfaces ("APIs") including, e.g., HTTP, HTTPS, FTP, REST, virtualization software APIs, cloud service provider APIs, and hosted service provider APIs. Inter-cell communication and hierarchy is described in greater detail in U.S. Pat. Nos. 7,747,579 and 7,343,453, which are incorporated by reference herein.

Data Agents

As discussed, a variety of different types of applications 110 can reside on a given client computing device 102, including operating systems, database applications, e-mail applications, and virtual machines, just to name a few. And, as part of the process of creating and restoring secondary copies 116, the client computing devices 102 may be tasked with processing and preparing the primary data 112 from these various different applications 110. Moreover, the nature of the processing/preparation can differ across clients and application types, e.g., due to inherent structural and formatting differences between applications 110.

The one or more data agent(s) 142 are therefore advantageously configured in some embodiments to assist in the performance of information management operations based on the type of data that is being protected, at a client-specific and/or application-specific level.

The data agent 142 may be a software module or component that is generally responsible for managing, initiating, or otherwise assisting in the performance of information management operations. For instance, the data agent 142 may take part in performing data storage operations such as the copying, archiving, migrating, replicating of primary data 112 stored in the primary storage device(s) 104. The data agent 142 may receive control information from the storage manager 140, such as commands to transfer copies of data objects, metadata, and other payload data to the media agents 144.

In some embodiments, a data agent 142 may be distributed between the client computing device 102 and storage manager 140 (and any other intermediate components) or may be deployed from a remote location or its functions approximated by a remote process that performs some or all of the functions of data agent 142. In addition, a data agent 142 may perform some functions provided by a media agent 144, or may perform other functions such as encryption and deduplication.

As indicated, each data agent 142 may be specialized for a particular application 110, and the system can employ multiple application-specific data agents 142, each of which may perform information management operations (e.g., perform backup, migration, and data recovery) associated with a different application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data.

A file system data agent, for example, may handle data files and/or other file system information. If a client computing device 102 has two or more types of data, one data agent 142 may be used for each data type to copy, archive, migrate, and restore the client computing device 102 data. For example, to backup, migrate, and restore all of the data on a Microsoft Exchange server, the client computing device 102 may use one Microsoft Exchange Mailbox data agent 142 to backup the Exchange mailboxes, one Microsoft Exchange Database data agent 142 to backup the Exchange databases, one Microsoft Exchange Public Folder data agent 142 to backup the Exchange Public Folders, and one Microsoft Windows File System data agent 142 to backup the file system of the client computing device 102. In such embodiments, these data agents 142 may be treated as four separate data agents 142 even though they reside on the same client computing device 102.

Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data while another generic data agent may handle Microsoft Exchange Public Folder data and Microsoft Windows File System data.

Each data agent 142 may be configured to access data and/or metadata stored in the primary storage device(s) 104 associated with the data agent 142 and process the data as appropriate. For example, during a secondary copy operation, the data agent 142 may arrange or assemble the data and metadata into one or more files having a certain format (e.g., a particular backup or archive format) before transferring the file(s) to a media agent 144 or other component. The file(s) may include a list of files or other metadata. Each data agent 142 can also assist in restoring data or metadata to primary storage devices 104 from a secondary copy 116. For instance, the data agent 142 may operate in conjunction with the storage manager 140 and one or more of the media agents 144 to restore data from secondary storage device(s) 108.

Media Agents

As indicated above with respect to FIG. 1A, off-loading certain responsibilities from the client computing devices 102 to intermediate components such as the media agent(s) 144 can provide a number of benefits including improved client computing device 102 operation, faster secondary copy operation performance, and enhanced scalability. As one specific example which will be discussed below in further detail, the media agent 144 can act as a local cache of copied data and/or metadata that it has stored to the secondary storage device(s) 108, providing improved restore capabilities.

Generally speaking, a media agent 144 may be implemented as a software module that manages, coordinates, and facilitates the transmission of data, as directed by the storage manager 140, between a client computing device 102 and one or more secondary storage devices 108. Whereas the storage manager 140 controls the operation of the information management system 100, the media agent 144 generally provides a portal to secondary storage devices 108. For instance, other components in the system interact with the media agents 144 to gain access to data stored on the secondary storage devices 108, whether it be for the purposes of reading, writing, modifying, or deleting data. Moreover, as will be described further, media agents 144 can generate and store information relating to characteristics of the stored data and/or metadata, or can generate and store other types of information that generally provides insight into the contents of the secondary storage devices 108.

Media agents 144 can comprise separate nodes in the information management system 100 (e.g., nodes that are separate from the client computing devices 102, storage manager 140, and/or secondary storage devices 108). In general, a node within the information management system 100 can be a logically and/or physically separate component, and in some cases is a component that is individually addressable or otherwise identifiable. In addition, each media agent 144 may reside on a dedicated secondary storage computing device 106 in some cases, while in other embodiments a plurality of media agents 144 reside on the same secondary storage computing device 106.

A media agent 144 (and corresponding media agent database 152) may be considered to be "associated with" a particular secondary storage device 108 if that media agent 144 is capable of one or more of: routing and/or storing data to the particular secondary storage device 108, coordinating the routing and/or storing of data to the particular secondary storage device 108, retrieving data from the particular secondary storage device 108, coordinating the retrieval of data from a particular secondary storage device 108, and modifying and/or deleting data retrieved from the particular secondary storage device 108.

While media agent(s) 144 are generally associated with one or more secondary storage devices 108, one or more media agents 144 in certain embodiments are physically separate from the secondary storage devices 108. For instance, the media agents 144 may reside on secondary storage computing devices 106 having different housings or packages than the secondary storage devices 108. In one example, a media agent 144 resides on a first server computer and is in communication with a secondary storage device(s) 108 residing in a separate, rack-mounted RAID-based system.

Where the information management system 100 includes multiple media agents 144 (FIG. 1D), a first media agent 144 may provide failover functionality for a second, failed media agent 144. In addition, media agents 144 can be dynamically selected for storage operations to provide load balancing. Failover and load balancing are described in greater detail below.

In operation, a media agent 144 associated with a particular secondary storage device 108 may instruct the secondary storage device 108 to perform an information management operation. For instance, a media agent 144 may instruct a tape library to use a robotic arm or other retrieval means to load or eject a certain storage media, and to subsequently archive, migrate, or retrieve data to or from that media, e.g., for the purpose of restoring the data to a client computing device 102. As another example, a secondary storage device 108 may include an array of hard disk drives or solid state drives organized in a RAID configuration, and the media agent 144 may forward a logical unit number (LUN) and other appropriate information to the array, which uses the received information to execute the desired storage operation. The media agent 144 may communicate with a secondary storage device 108 via a suitable communications link, such as a SCSI or Fiber Channel link.

As shown, each media agent 144 may maintain an associated media agent database 152. The media agent database 152 may be stored in a disk or other storage device (not shown) that is local to the secondary storage computing device 106 on which the media agent 144 resides. In other cases, the media agent database 152 is stored remotely from the secondary storage computing device 106.

The media agent database 152 can include, among other things, an index 153 including data generated during secondary copy operations and other storage or information management operations. The index 153 provides a media agent 144 or other component with a fast and efficient mechanism for locating secondary copies 116 or other data stored in the secondary storage devices 108. In some cases, the index 153 does not form a part of and is instead separate from the media agent database 152.

A media agent index 153 or other data structure associated with the particular media agent 144 may include information about the stored data. For instance, for each secondary copy 116, the index 153 may include metadata such as a list of the data objects (e.g., files/subdirectories, database objects, mailbox objects, etc.), a path to the secondary copy 116 on the corresponding secondary storage device 108, location information indicating where the data objects are stored in the secondary storage device 108, when the data objects were created or modified, etc. Thus, the index 153 includes metadata associated with the secondary copies 116 that is readily available for use in storage operations and other activities without having to be first retrieved from the secondary storage device 108. In yet further embodiments, some or all of the data in the index 153 may instead or additionally be stored along with the data in a secondary storage device 108, e.g., with a copy of the index 153. In some embodiments, the secondary storage devices 108 can include sufficient information to perform a "bare metal restore", where the operating system of a failed client computing device 102 or other restore target is automatically rebuilt as part of a restore operation.

Because the index 153 maintained in the media agent database 152 may operate as a cache, it can also be referred to as "an index cache." In such cases, information stored in the index cache 153 typically comprises data that reflects certain particulars about storage operations that have occurred relatively recently. After some triggering event, such as after a certain period of time elapses, or the index cache 153 reaches a particular size, the index cache 153 may be copied or migrated to a secondary storage device(s) 108. This information may need to be retrieved and uploaded back into the index cache 153 or otherwise restored to a media agent 144 to facilitate retrieval of data from the secondary storage device(s) 108. In some embodiments, the cached information may include format or containerization information related to archives or other files stored on the storage device(s) 108. In this manner, the index cache 153 allows for accelerated restores.

In some alternative embodiments the media agent 144 generally acts as a coordinator or facilitator of storage operations between client computing devices 102 and corresponding secondary storage devices 108, but does not actually write the data to the secondary storage device 108. For instance, the storage manager 140 (or the media agent 144) may instruct a client computing device 102 and secondary storage device 108 to communicate with one another directly. In such a case the client computing device 102 transmits the data directly or via one or more intermediary components to the secondary storage device 108 according to the received instructions, and vice versa. In some such cases, the media agent 144 may still receive, process, and/or maintain metadata related to the storage operations. Moreover, in these embodiments, the payload data can flow through the media agent 144 for the purposes of populating the index cache 153 maintained in the media agent database 152, but not for writing to the secondary storage device 108.

The media agent 144 and/or other components such as the storage manager 140 may in some cases incorporate additional functionality, such as data classification, content indexing, deduplication, encryption, compression, and the like. Further details regarding these and other functions are described below.

Distributed, Scalable Architecture

As described, certain functions of the information management system 100 can be distributed amongst various physical and/or logical components in the system. For instance, one or more of the storage manager 140, data agents 142, and media agents 144 may reside on computing devices that are physically separate from one another. This architecture can provide a number of benefits.

For instance, hardware and software design choices for each distributed component can be targeted to suit its particular function. The secondary computing devices 106 on which the media agents 144 reside can be tailored for interaction with associated secondary storage devices 108 and provide fast index cache operation, among other specific tasks. Similarly, the client computing device(s) 102 can be selected to effectively service the applications 110 residing thereon, in order to efficiently produce and store primary data 112.

Moreover, in some cases, one or more of the individual components in the information management system 100 can be distributed to multiple, separate computing devices. As one example, for large file systems where the amount of data stored in the database 146 is relatively large, the database 146 may be migrated to or otherwise reside on a specialized database server (e.g., an SQL server) separate from a server that implements the other functions of the storage manager 140. This configuration can provide added protection because the database 146 can be protected with standard database utilities (e.g., SQL log shipping or database replication) independent from other functions of the storage manager 140. The database 146 can be efficiently replicated to a remote site for use in the event of a disaster or other data loss incident at the primary site. Or the database 146 can be replicated to another computing device within the same site, such as to a higher performance machine in the event that a storage manager host device can no longer service the needs of a growing information management system 100.

Figure 1D:
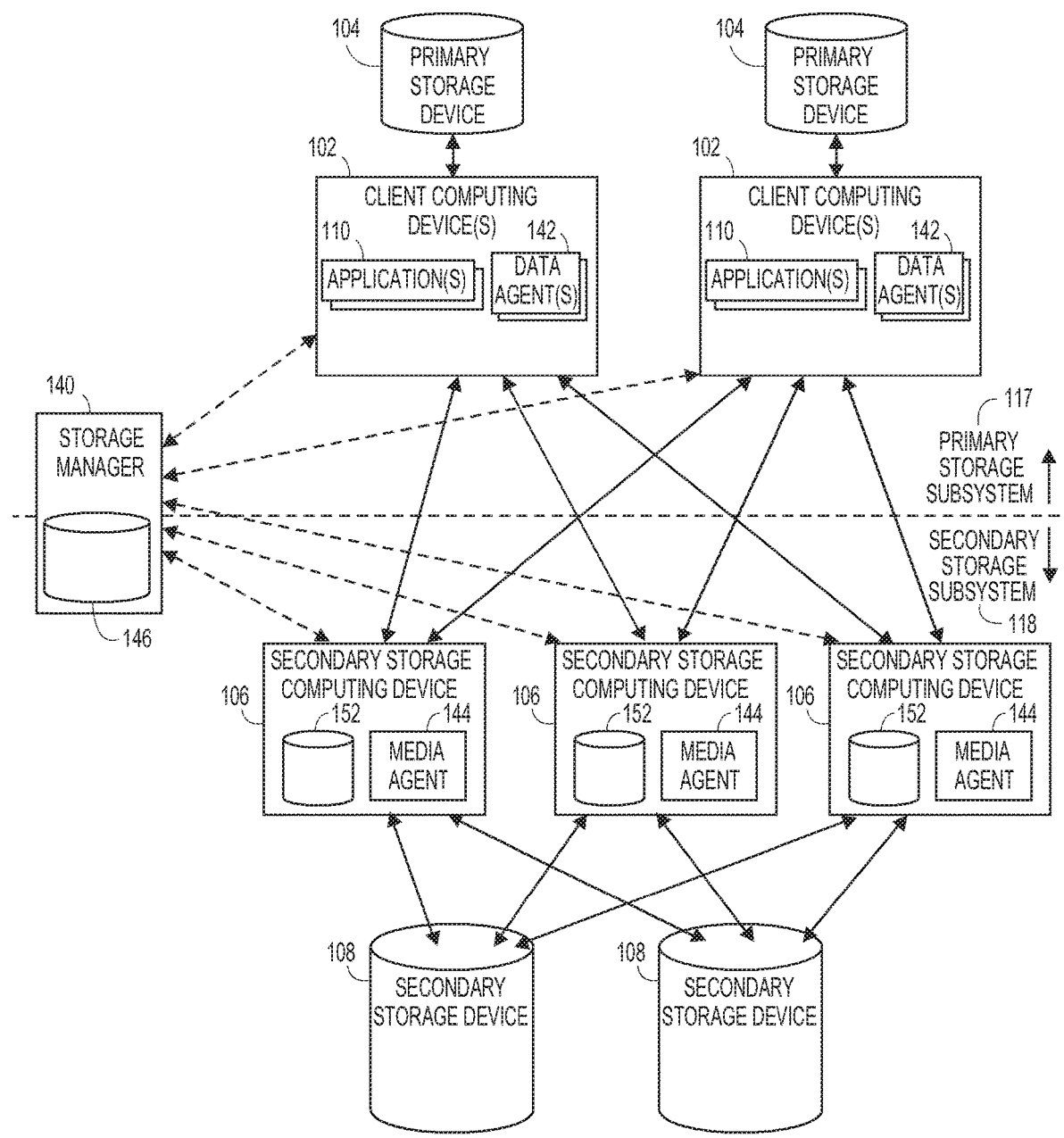
FIG. 1D is a block diagram illustrating a scalable information management system.

The distributed architecture also provides both scalability and efficient component utilization. FIG. 1D shows an embodiment of the information management system 100 including a plurality of client computing devices 102 and associated data agents 142 as well as a plurality of secondary storage computing devices 106 and associated media agents 144.

Additional components can be added or subtracted based on the evolving needs of the information management system 100. For instance, depending on where bottlenecks are identified, administrators can add additional client computing devices 102, secondary storage computing devices 106 (and corresponding media agents 144), and/or secondary storage devices 108. Moreover, where multiple fungible components are available, load balancing can be implemented to dynamically address identified bottlenecks. As an example, the storage manager 140 may dynamically select which media agents 144 and/or secondary storage devices 108 to use for storage operations based on a processing load analysis of the media agents 144 and/or secondary storage devices 108, respectively.

Moreover, each client computing device 102 in some embodiments can communicate with, among other components, any of the media agents 144, e.g., as directed by the storage manager 140. And each media agent 144 may be able to communicate with, among other components, any of the secondary storage devices 108, e.g., as directed by the storage manager 140. Thus, operations can be routed to the secondary storage devices 108 in a dynamic and highly flexible manner, to provide load balancing, failover, and the like. Further examples of scalable systems capable of dynamic storage operations, and of systems capable of performing load balancing and fail over are provided in U.S. Pat. No. 7,246,207, which is incorporated by reference herein.

In alternative configurations, certain components are not distributed and may instead reside and execute on the same computing device. For example, in some embodiments one or more data agents 142 and the storage manager 140 reside on the same client computing device 102. In another embodiment, one or more data agents 142 and one or more media agents 144 reside on a single computing device.

Exemplary Types of Information Management Operations

In order to protect and leverage stored data, the information management system 100 can be configured to perform a variety of information management operations. As will be described, these operations can generally include secondary copy and other data movement operations, processing and data manipulation operations, analysis, reporting, and management operations. The operations described herein may be performed on any type of computing platform, e.g., between two computers connected via a LAN, to a mobile client telecommunications device connected to a server via a WLAN, to any manner of client device coupled to a cloud storage target.

Data Movement Operations

Data movement operations according to certain embodiments are generally operations that involve the copying or migration of data (e.g., payload data) between different locations in the information management system 100 in an original/native and/or one or more different formats. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104.

Data movement operations can include by way of example, backup operations, archive operations, information lifecycle management operations such as hierarchical storage management operations, replication operations (e.g., continuous data replication operations), snapshot operations, deduplication or single-instancing operations, auxiliary copy operations, and the like. As will be discussed, some of these operations involve the copying, migration or other movement of data, without actually creating multiple, distinct copies. Nonetheless, some or all of these operations are referred to as "copy" operations for simplicity.

Backup Operations

A backup operation creates a copy of a version of data (e.g., one or more files or other data units) in primary data 112 at a particular point in time. Each subsequent backup copy may be maintained independently of the first. Further, a backup copy in some embodiments is generally stored in a form that is different than the native format, e.g., a backup format. This can be in contrast to the version in primary data 112 from which the backup copy is derived, and which may instead be stored in a native format of the source application(s) 110. In various cases, backup copies can be stored in a format in which the data is compressed, encrypted, deduplicated, and/or otherwise modified from the original application format. For example, a backup copy may be stored in a backup format that facilitates compression and/or efficient long-term storage.

Backup copies can have relatively long retention periods as compared to primary data 112, and may be stored on media with slower retrieval times than primary data 112 and certain other types of secondary copies 116. On the other hand, backups may have relatively shorter retention periods than some other types of secondary copies 116, such as archive copies (described below). Backups may sometimes be stored at on offsite location.

Backup operations can include full, synthetic or incremental backups. A full backup in some embodiments is generally a complete image of the data to be protected. However, because full backup copies can consume a relatively large amount of storage, it can be useful to use a full backup copy as a baseline and only store changes relative to the full backup copy for subsequent backup copies.

For instance, a differential backup operation (or cumulative incremental backup operation) tracks and stores changes that have occurred since the last full backup. Differential backups can grow quickly in size, but can provide relatively efficient restore times because a restore can be completed in some cases using only the full backup copy and the latest differential copy.

An incremental backup operation generally tracks and stores changes since the most recent backup copy of any type, which can greatly reduce storage utilization. In some cases, however, restore times can be relatively long in comparison to full or differential backups because completing a restore operation may involve accessing a full backup in addition to multiple incremental backups.

Any of the above types of backup operations can be at the volume-level, file-level, or block-level. Volume level backup operations generally involve the copying of a data volume (e.g., a logical disk or partition) as a whole. In a file-level backup, the information management system 100 may generally track changes to individual files at the file-level, and includes copies of files in the backup copy. In the case of a block-level backup, files are broken into constituent blocks, and changes are tracked at the block-level. Upon restore, the information management system 100 reassembles the blocks into files in a transparent fashion.

Far less data may actually be transferred and copied to the secondary storage devices 108 during a file-level copy than a volume-level copy. Likewise, a block-level copy may involve the transfer of less data than a file-level copy, resulting in faster execution times. However, restoring a relatively higher-granularity copy can result in longer restore times. For instance, when restoring a block-level copy, the process of locating constituent blocks can sometimes result in longer restore times as compared to file-level backups. Similar to backup operations, the other types of secondary copy operations described herein can also be implemented at either the volume-level, file-level, or block-level.

Archive Operations

Because backup operations generally involve maintaining a version of the copied data in primary data 112 and also maintaining backup copies in secondary storage device(s) 108, they can consume significant storage capacity. To help reduce storage consumption, an archive operation according to certain embodiments creates a secondary copy 116 by both copying and removing source data. Or, seen another way, archive operations can involve moving some or all of the source data to the archive destination. Thus, data satisfying criteria for removal (e.g., data of a threshold age or size) from the source copy may be removed from source storage. Archive copies are sometimes stored in an archive format or other non-native application format. The source data may be primary data 112 or a secondary copy 116, depending on the situation. As with backup copies, archive copies can be stored in a format in which the data is compressed, encrypted, deduplicated, and/or otherwise modified from the original application format.

In addition, archive copies may be retained for relatively long periods of time (e.g., years) and, in some cases, are never deleted. Archive copies are generally retained for longer periods of time than backup copies, for example. In certain embodiments, archive copies may be made and kept for extended periods in order to meet compliance regulations.

Moreover, when primary data 112 is archived, in some cases the archived primary data 112 or a portion thereof is deleted when creating the archive copy. Thus, archiving can serve the purpose of freeing up space in the primary storage device(s) 104. Similarly, when a secondary copy 116 is archived, the secondary copy 116 may be deleted, and an archive copy can therefore serve the purpose of freeing up space in secondary storage device(s) 108. In contrast, source copies often remain intact when creating backup copies. Examples of compatible data archiving operations are provided in U.S. Pat. No. 7,107,298, which is incorporated by reference herein.

Snapshot Operations

Snapshot operations can provide a relatively lightweight, efficient mechanism for protecting data. From an end-user viewpoint, a snapshot may be thought of as an "instant" image of the primary data 112 at a given point in time, and may include state and/or status information relative to an application that creates/manages the data. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software residing on the storage device itself. For instance, the storage device may be capable of performing snapshot operations upon request, generally without intervention or oversight from any of the other components in the information management system 100. In this manner, hardware snapshots can off-load other components of information management system 100 from processing involved in snapshot creation and management.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component implementing the snapshot management software layer may derive a set of pointers and/or data that represents the snapshot. The snapshot management software layer may then transmit the same to the target storage device, along with appropriate instructions for writing the snapshot.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or an application. In some other cases, the snapshot may be created at the block-level, such as where creation of the snapshot occurs without awareness of the file system. Each pointer points to a respective stored data block, so that collectively, the set of pointers reflect the storage location and state of the data object (e.g., file(s) or volume(s) or data set(s)) at a particular point in time when the snapshot copy was created.

Once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually later modified. Furthermore, when files are modified, typically only the pointers which map to blocks are copied, not the blocks themselves. In some embodiments, for example in the case of "copy-on-write" snapshots, when a block changes in primary storage, the block is copied to secondary storage or cached in primary storage before the block is overwritten in primary storage, and the pointer to that block changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782, which is incorporated by reference herein.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating the primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments storage operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data was the "live", primary data 112. This can reduce access time, storage utilization, and impact on source applications 110, among other benefits.

Based on known good state information, the information management system 100 can replicate sections of application data that represent a recoverable state rather than rote copying of blocks of data. Examples of compatible replication operations (e.g., continuous data replication) are provided in U.S. Pat. No. 7,617,262, which is incorporated by reference herein.

Deduplication/Single-Instancing Operations

Another type of data movement operation is deduplication or single-instance storage, which is useful to reduce the amount of data within the system. For instance, some or all of the above-described secondary storage operations can involve deduplication in some fashion. New data is read, broken down into portions (e.g., sub-file level blocks, files, etc.) of a selected granularity, compared with blocks that are already stored, and only the new blocks are stored. Blocks that already exist are represented as pointers to the already stored data.

In order to streamline the comparison process, the information management system 100 may calculate and/or store signatures (e.g., hashes or cryptographically unique IDs) corresponding to the individual data blocks in a database and compare the signatures instead of comparing entire data blocks. In some cases, only a single instance of each element is stored, and deduplication operations may therefore be referred to interchangeably as "single-instancing" operations. Depending on the implementation, however, deduplication or single-instancing operations can store more than one instance of certain data blocks, but nonetheless significantly reduce data redundancy.

Depending on the embodiment, deduplication blocks can be of fixed or variable length. Using variable length blocks can provide enhanced deduplication by responding to changes in the data stream, but can involve complex processing. In some cases, the information management system 100 utilizes a technique for dynamically aligning deduplication blocks (e.g., fixed-length blocks) based on changing content in the data stream, as described in U.S. Pat. No. 8,364,652, which is incorporated by reference herein.

The information management system 100 can perform deduplication in a variety of manners at a variety of locations in the information management system 100. For instance, in some embodiments, the information management system 100 implements "target-side" deduplication by deduplicating data (e.g., secondary copies 116) stored in the secondary storage devices 108. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. Pub. No. 2012/0150826, which is incorporated by reference herein. Instead of or in combination with "target-side" deduplication, deduplication can also be performed on the "source-side" (or "client-side"), e.g., to reduce the amount of traffic between the media agents 144 and the client computing device(s) 102 and/or reduce redundant data stored in the primary storage devices 104. According to various implementations, one or more of the storage devices of the target-side, source-side, or client-side of an operation can be cloud-based storage devices. Thus, the target-side, source-side, and/or client-side deduplication can be cloud-based deduplication. In particular, as discussed previously, the storage manager 140 may communicate with other components within the information management system 100 via network protocols and cloud service provider APIs to facilitate cloud-based deduplication/single instancing. Examples of such deduplication techniques are provided in U.S. Pat. Pub. No. 2012/0150818, which is incorporated by reference herein. Some other compatible deduplication/single instancing techniques are described in U.S. Pat. Pub. Nos. 2006/0224846 and 2009/0319534, which are incorporated by reference herein.

Information Lifecycle Management and Hierarchical Storage Management Operations

In some embodiments, files and other data over their lifetime move from more expensive, quick access storage to less expensive, slower access storage. Operations associated with moving data through various tiers of storage are sometimes referred to as information lifecycle management (ILM) operations.

One type of ILM operation is a hierarchical storage management (HSM) operation. A HSM operation is generally an operation for automatically moving data between classes of storage devices, such as between high-cost and low-cost storage devices. For instance, an HSM operation may involve movement of data from primary storage devices 104 to secondary storage devices 108, or between tiers of secondary storage devices 108. With each tier, the storage devices may be progressively relatively cheaper, have relatively slower access/restore times, etc. For example, movement of data between tiers may occur as data becomes less important over time.

In some embodiments, an HSM operation is similar to an archive operation in that creating an HSM copy may (though not always) involve deleting some of the source data, e.g., according to one or more criteria related to the source data. For example, an HSM copy may include data from primary data 112 or a secondary copy 116 that is larger than a given size threshold or older than a given age threshold and that is stored in a backup format.

Often, and unlike some types of archive copies, HSM data that is removed or aged from the source copy is replaced by a logical reference pointer or stub. The reference pointer or stub can be stored in the primary storage device 104 (or other source storage device, such as a secondary storage device 108) to replace the deleted data in primary data 112 (or other source copy) and to point to or otherwise indicate the new location in a secondary storage device 108.

According to one example, files are generally moved between higher and lower cost storage depending on how often the files are accessed. When a user requests access to the HSM data that has been removed or migrated, the information management system 100 uses the stub to locate the data and often make recovery of the data appear transparent, even though the HSM data may be stored at a location different from the remaining source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., where the data is compressed, encrypted, deduplicated, and/or otherwise modified from the original application format). In some cases, copies which involve the removal of data from source storage and the maintenance of stub or other logical reference information on source storage may be referred to generally as "on-line archive copies". On the other hand, copies which involve the removal of data from source storage without the maintenance of stub or other logical reference information on source storage may be referred to as "off-line archive copies". Examples of HSM and ILM techniques are provided in U.S. Pat. No. 7,343,453, which is incorporated by reference herein.

Auxiliary Copy and Disaster Recovery Operations

An auxiliary copy is generally a copy operation in which a copy is created of an existing secondary copy 116. For instance, an initial secondary copy 116 may be generated using or otherwise be derived from primary data 112 (or other data residing in the secondary storage subsystem 118), whereas an auxiliary copy is generated from the initial secondary copy 116. Auxiliary copies can be used to create additional standby copies of data and may reside on different secondary storage devices 108 than the initial secondary copies 116. Thus, auxiliary copies can be used for recovery purposes if initial secondary copies 116 become unavailable. Exemplary compatible auxiliary copy techniques are described in further detail in U.S. Pat. No. 8,230,195, which is incorporated by reference herein.

The information management system 100 may also perform disaster recovery operations that make or retain disaster recovery copies, often as secondary, high-availability disk copies. The information management system 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Analysis, Reporting, and Management Operations

Data analysis, reporting, and management operations can be different than data movement operations in that they do not necessarily involve the copying, migration or other transfer of data (e.g., primary data 112 or secondary copies 116) between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, the information management system 100 analyzes and indexes characteristics, content, and metadata associated with the data stored within the primary data 112 and/or secondary copies 116, providing enhanced search and management capabilities for data discovery and other purposes. The content indexing can be used to identify files or other data objects having pre-defined content (e.g., user-defined keywords or phrases, other keywords/phrases that are not defined by a user, etc.), and/or metadata (e.g., email metadata such as "to", "from", "cc", "bcc", attachment name, received time, etc.).

The information management system 100 generally organizes and catalogues the results in a content index, which may be stored within the media agent database 152, for example. The content index can also include the storage locations of (or pointer references to) the indexed data in the primary data 112 or secondary copies 116, as appropriate. The results may also be stored, in the form of a content index database or otherwise, elsewhere in the information management system 100 (e.g., in the primary storage devices 104, or in the secondary storage device 108). Such index data provides the storage manager 140 or another component with an efficient mechanism for locating primary data 112 and/or secondary copies 116 of data objects that match particular criteria.

For instance, search criteria can be specified by a user through user interface 158 of the storage manager 140. In some cases, the information management system 100 analyzes data and/or metadata in secondary copies 116 to create an "off-line" content index, without significantly impacting the performance of the client computing devices 102. Depending on the embodiment, the system can also implement "on-line" content indexing, e.g., of primary data 112. Examples of compatible content indexing techniques are provided in U.S. Pat. No. 8,170,995, which is incorporated by reference herein.

In order to further leverage the data stored in the information management system 100 to perform these and other tasks, one or more components can be configured to scan data and/or associated metadata for classification purposes to populate a database (or other data structure) of information (which can be referred to as a "data classification database" or a "metabase"). Depending on the embodiment, the data classification database(s) can be organized in a variety of different ways, including centralization, logical sub-divisions, and/or physical sub-divisions. For instance, one or more centralized data classification databases may be associated with different subsystems or tiers within the information management system 100. As an example, there may be a first centralized metabase associated with the primary storage subsystem 117 and a second centralized metabase associated with the secondary storage subsystem 118. In other cases, there may be one or more metabases associated with individual components. For instance, there may be a dedicated metabase associated with some or all of the client computing devices 102 and/or media agents 144. In some embodiments, a data classification database may reside as one or more data structures within management database 146, or may be otherwise associated with storage manager 140.

In some cases, the metabase(s) may be included in separate database(s) and/or on separate storage device(s) from primary data 112 and/or secondary copies 116, such that operations related to the metabase do not significantly impact performance on other components in the information management system 100. In other cases, the metabase(s) may be stored along with primary data 112 and/or secondary copies 116. Files or other data objects can be associated with identifiers (e.g., tag entries, etc.) in the media agent 144 (or other indices) to facilitate searches of stored data objects. Among a number of other benefits, the metabase can also allow efficient, automatic identification of files or other data objects to associate with secondary copy or other information management operations (e.g., in lieu of scanning an entire file system). Examples of compatible metabases and data classification operations are provided in U.S. Pat. Nos. 8,229,954 and 7,747,579, which are incorporated by reference herein.

Encryption Operations

The information management system 100 in some cases is configured to process data (e.g., files or other data objects, secondary copies 116, etc.), according to an appropriate encryption algorithm (e.g., Blowfish, Advanced Encryption Standard [AES], Triple Data Encryption Standard [3-DES], etc.) to limit access and provide data security in the information management system 100.

The information management system 100 in some cases encrypts the data at the client level, such that the client computing devices 102 (e.g., the data agents 142) encrypt the data prior to forwarding the data to other components, e.g., before sending the data to media agents 144 during a secondary copy operation. In such cases, the client computing device 102 may maintain or have access to an encryption key or passphrase for decrypting the data upon restore. Encryption can also occur when creating copies of secondary copies, e.g., when creating auxiliary copies or archive copies. In yet further embodiments, the secondary storage devices 108 can implement built-in, high performance hardware encryption.

Management and Reporting Operations

Certain embodiments leverage the integrated, ubiquitous nature of the information management system 100 to provide useful system-wide management and reporting functions. Examples of some compatible management and reporting techniques are provided in U.S. Pat. No. 7,343,453, which is incorporated by reference herein.

Operations management can generally include monitoring and managing the health and performance of information management system 100 by, without limitation, performing error tracking, generating granular storage/performance metrics (e.g., job success/failure information, deduplication efficiency, etc.), generating storage modeling and costing information, and the like.

As an example, a storage manager 140 or other component in the information management system 100 may analyze traffic patterns and suggest or automatically route data via a particular route to e.g., certain facilitate storage and minimize congestion. In some embodiments, the system can generate predictions relating to storage operations or storage operation information. Such predictions described may be based on a trending analysis that may be used to predict various network operations or use of network resources such as network traffic levels, storage media use, use of bandwidth of communication links, use of media agent components, etc. Further examples of traffic analysis, trend analysis, prediction generation, and the like are described in U.S. Pat. No. 7,343,453, which is incorporated by reference herein.

In some configurations, a master storage manager 140 may track the status of a set of associated storage operation cells in a hierarchy of information management cells, such as the status of jobs, system components, system resources, and other items, by communicating with storage managers 140 (or other components) in the respective storage operation cells. Moreover, the master storage manager 140 may track the status of its associated storage operation cells and associated information management operations by receiving periodic status updates from the storage managers 140 (or other components) in the respective cells regarding jobs, system components, system resources, and other items. In some embodiments, a master storage manager 140 may store status information and other information regarding its associated storage operation cells and other system information in its index 150 (or other location).

The master storage manager 140 or other component in the system may also determine whether a storage-related criteria or other criteria is satisfied, and perform an action or trigger event (e.g., data migration) in response to the criteria being satisfied, such as where a storage threshold is met for a particular volume, or where inadequate protection exists for certain data. For instance, in some embodiments, the system uses data from one or more storage operation cells to advise users of risks or indicates actions that can be used to mitigate or otherwise minimize these risks, and in some embodiments, dynamically takes action to mitigate or minimize these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be able to be restored within a given time period, that data on a secondary volume may be mirrored or otherwise migrated to a specified number of other volumes, etc.). If a risk condition or other criteria is triggered, the system can notify the user of these conditions and may suggest (or automatically implement) an action to mitigate or otherwise address the condition or minimize risk. For example, the system may indicate that data from a primary copy 112 should be migrated to a secondary storage device 108 to free space on the primary storage device 104. Examples of the use of risk factors and other triggering criteria are described in U.S. Pat. No. 7,343,453, which is incorporated by reference herein.

In some embodiments, the system 100 may also determine whether a metric or other indication satisfies a particular storage criteria and, if so, perform an action. For example, as previously described, a storage policy or other definition might indicate that a storage manager 140 should initiate a particular action if a storage metric or other indication drops below or otherwise fails to satisfy specified criteria such as a threshold of data protection. Examples of such metrics are described in U.S. Pat. No. 7,343,453, which is incorporated by reference herein.

In some embodiments, risk factors may be quantified into certain measurable service or risk levels for ease of comprehension. For example, certain applications and associated data may be considered to be more important by an enterprise than other data and services. Financial compliance data, for example, may be of greater importance than marketing materials, etc. Network administrators may assign priorities or "weights" to certain data or applications, corresponding to its importance (priority value). The level of compliance with the storage operations specified for these applications may also be assigned a certain value. Thus, the health, impact and overall importance of a service on an enterprise may be determined, for example, by measuring the compliance value and calculating the product of the priority value and the compliance value to determine the "service level" and comparing it to certain operational thresholds to determine if the operation is being performed within a specified data protection service level. Further examples of the service level determination are provided in U.S. Pat. No. 7,343,453, which is incorporated by reference herein.

The system 100 may additionally calculate data costing and data availability associated with information management operation cells according to an embodiment of the invention. For instance, data received from the cell may be used in conjunction with hardware-related information and other information about network elements to generate indications of costs associated with storage of particular data in the system or the availability of particular data in the system. In general, components in the system are identified and associated information is obtained (dynamically or manually). Characteristics or metrics associated with the network elements may be identified and associated with that component element for further use generating an indication of storage cost or data availability. Exemplary information generated could include how fast a particular department is using up available storage space, how long data would take to recover over a particular network pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides. Storage devices may be assigned to a particular cost category which is indicative of the cost of storing information on that device. Further examples of costing techniques are described in U.S. Pat. No. 7,343,453, which is incorporated by reference herein.

Any of the above types of information (e.g., information related to trending, predictions, job, cell or component status, risk, service level, costing, etc.) can generally be provided to users via the user interface 158 in a single, integrated view or console. The console may support a reporting capability that allows for the generation of a variety of reports, which may be tailored to a particular aspect of information management. Report types may include: scheduling, event management, media management and data aging. Available reports may also include backup history, data aging history, auxiliary copy history, job history, library and drive, media in library, restore history, and storage policy. Such reports may be specified and created at a certain point in time as a network analysis, forecasting, or provisioning tool. Integrated reports may also be generated that illustrate storage and performance metrics, risks and storage costing information. Moreover, users may create their own reports based on specific needs.

The integrated user interface 158 can include an option to show a "virtual view" of the system that graphically depicts the various components in the system using appropriate icons. As one example, the user interface 158 may provide a graphical depiction of one or more primary storage devices 104, the secondary storage devices 108, data agents 142 and/or media agents 144, and their relationship to one another in the information management system 100. The operations management functionality can facilitate planning and decision-making. For example, in some embodiments, a user may view the status of some or all jobs as well as the status of each component of the information management system 100. Users may then plan and make decisions based on this data. For instance, a user may view high-level information regarding storage operations for the information management system 100, such as job status, component status, resource status (e.g., network pathways, etc.), and other information. The user may also drill down or use other means to obtain more detailed information regarding a particular component, job, or the like.

Further examples of some reporting techniques and associated interfaces providing an integrated view of an information management system are provided in U.S. Pat. No. 7,343,453, which is incorporated by reference herein.

The information management system 100 can also be configured to perform system-wide e-discovery operations in some embodiments. In general, e-discovery operations provide a unified collection and search capability for data in the system, such as data stored in the secondary storage devices 108 (e.g., backups, archives, or other secondary copies 116). For example, the information management system 100 may construct and maintain a virtual repository for data stored in the information management system 100 that is integrated across source applications 110, different storage device types, etc. According to some embodiments, e-discovery utilizes other techniques described herein, such as data classification and/or content indexing.

Information Management Policies

As indicated previously, an information management policy 148 can include a data structure or other information source that specifies a set of parameters (e.g., criteria and rules) associated with secondary copy or other information management operations.

One type of information management policy 148 is a storage policy. According to certain embodiments, a storage policy generally comprises a data structure or other information source that defines (or includes information sufficient to determine) a set of preferences or other criteria for performing information management operations. Storage policies can include one or more of the following items: (1) what data will be associated with the storage policy; (2) a destination to which the data will be stored; (3) datapath information specifying how the data will be communicated to the destination; (4) the type of storage operation to be performed; and (5) retention information specifying how long the data will be retained at the destination.

As an illustrative example, data associated with a storage policy can be logically organized into groups. In some cases, these logical groupings can be referred to as "sub-clients". A sub-client may represent static or dynamic associations of portions of a data volume. Sub-clients may represent mutually exclusive portions. Thus, in certain embodiments, a portion of data may be given a label and the association is stored as a static entity in an index, database or other storage location.

Sub-clients may also be used as an effective administrative scheme of organizing data according to data type, department within the enterprise, storage preferences, or the like. Depending on the configuration, sub-clients can correspond to files, folders, virtual machines, databases, etc. In one exemplary scenario, an administrator may find it preferable to separate e-mail data from financial data using two different sub-clients.

A storage policy can define where data is stored by specifying a target or destination storage device (or group of storage devices). For instance, where the secondary storage device 108 includes a group of disk libraries, the storage policy may specify a particular disk library for storing the sub-clients associated with the policy. As another example, where the secondary storage devices 108 include one or more tape libraries, the storage policy may specify a particular tape library for storing the sub-clients associated with the storage policy, and may also specify a drive pool and a tape pool defining a group of tape drives and a group of tapes, respectively, for use in storing the sub-client data. While information in the storage policy can be statically assigned in some cases, some or all of the information in the storage policy can also be dynamically determined based on criteria, which can be set forth in the storage policy. For instance, based on such criteria, a particular destination storage device(s) (or other parameter of the storage policy) may be determined based on characteristics associated with the data involved in a particular storage operation, device availability (e.g., availability of a secondary storage device 108 or a media agent 144), network status and conditions (e.g., identified bottlenecks), user credentials, and the like).

Datapath information can also be included in the storage policy. For instance, the storage policy may specify network pathways and components to utilize when moving the data to the destination storage device(s). In some embodiments, the storage policy specifies one or more media agents 144 for conveying data (e.g., one or more sub-clients) associated with the storage policy between the source (e.g., one or more host client computing devices 102) and destination (e.g., a particular target secondary storage device 108).

A storage policy can also specify the type(s) of operations associated with the storage policy, such as a backup, archive, snapshot, auxiliary copy, or the like. Retention information can specify how long the data will be kept, depending on organizational needs (e.g., a number of days, months, years, etc.)

The information management policies 148 may also include one or more scheduling policies specifying when and how often to perform operations. Scheduling information may specify with what frequency (e.g., hourly, weekly, daily, event-based, etc.) or under what triggering conditions secondary copy or other information management operations will take place. Scheduling policies in some cases are associated with particular components, such as particular logical groupings of data associated with a storage policy (e.g., a sub-client), client computing device 102, and the like. In one configuration, a separate scheduling policy is maintained for particular logical groupings of data on a client computing device 102. The scheduling policy specifies that those logical groupings are to be moved to secondary storage devices 108 every hour according to storage policies associated with the respective sub-clients.

When adding a new client computing device 102, administrators can manually configure information management policies 148 and/or other settings, e.g., via the user interface 158. However, this can be an involved process resulting in delays, and it may be desirable to begin data protecting operations quickly.

Thus, in some embodiments, the information management system 100 automatically applies a default configuration to client computing device 102. As one example, when one or more data agent(s) 142 are installed on one or more client computing devices 102, the installation script may register the client computing device 102 with the storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Other types of information management policies 148 are possible. For instance, the information management policies 148 can also include one or more audit or security policies. An audit policy is a set of preferences, rules and/or criteria that protect sensitive data in the information management system 100. For example, an audit policy may define "sensitive objects" as files or objects that contain particular keywords (e.g., "confidential," or "privileged") and/or are associated with particular keywords (e.g., in metadata) or particular flags (e.g., in metadata identifying a document or email as personal, confidential, etc.).

An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

In some implementations, the information management policies 148 may include one or more provisioning policies. A provisioning policy can include a set of preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). The storage manager 140 or other components may enforce the provisioning policy. For instance, the media agents 144 may enforce the policy when transferring data to secondary storage devices 108. If a client computing device 102 exceeds a quota, a budget for the client computing device 102 (or associated department) is adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies. Moreover, while storage policies are typically associated with moving and storing data, other policies may be associated with other types of information management operations. The following is a non-exhaustive list of items the information management policies 148 may specify:

schedules or other timing information, e.g., specifying when and/or how often to perform information management operations;

the type of copy 116 (e.g., type of secondary copy) and/or copy format (e.g., snapshot, backup, archive, HSM, etc.);

a location or a class or quality of storage for storing secondary copies 116 (e.g., one or more particular secondary storage devices 108);

preferences regarding whether and how to encrypt, compress, deduplicate, or otherwise modify or transform secondary copies 116;

which system components and/or network pathways (e.g., preferred media agents 144) should be used to perform secondary storage operations;

resource allocation between different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the information management system 100.

Policies can additionally specify or depend on a variety of historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Storage Operations

Figure 1E:
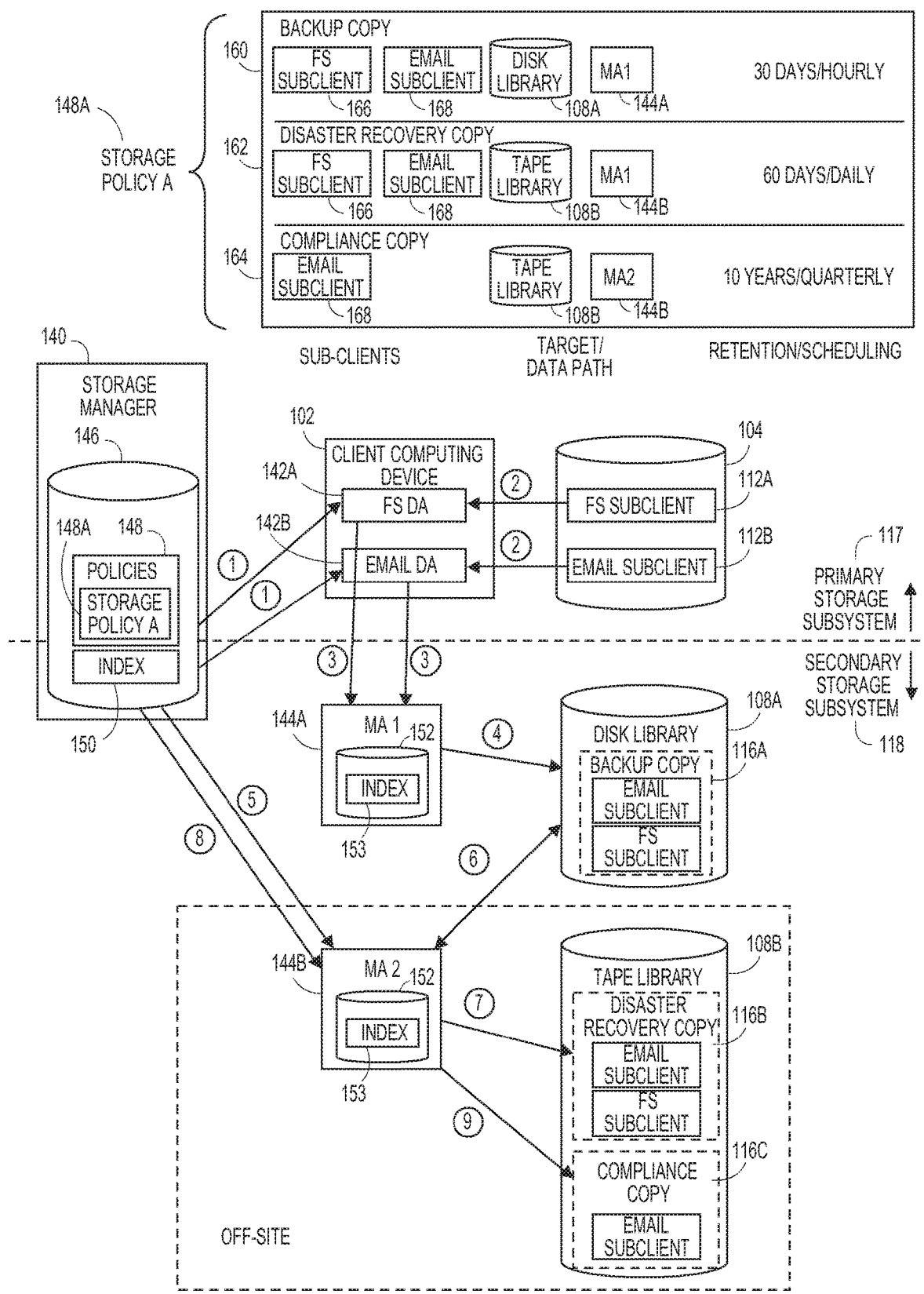
FIG. 1E illustrates certain secondary copy operations according to an exemplary storage policy.

FIG. 1E shows a data flow data diagram depicting performance of storage operations by an embodiment of an information management system 100, according to an exemplary storage policy 148A. The information management system 100 includes a storage manager 140, a client computing device 102 having a file system data agent 142A and an email data agent 142B residing thereon, a primary storage device 104, two media agents 144A, 144B, and two secondary storage devices 108A, 108B: a disk library 108A and a tape library 1086. As shown, the primary storage device 104 includes primary data 112A, 1126 associated with a logical grouping of data associated with a file system) and a logical grouping of data associated with email data, respectively. Although for simplicity the logical grouping of data associated with the file system is referred to as a file system sub-client, and the logical grouping of data associated with the email data is referred to as an email sub-client, the techniques described with respect to FIG. 1E can be utilized in conjunction with data that is organized in a variety of other manners.

As indicated by the dashed box, the second media agent 144B and the tape library 108B are "off-site", and may therefore be remotely located from the other components in the information management system 100 (e.g., in a different city, office building, etc.). Indeed, "off-site" may refer to a magnetic tape located in storage, which must be manually retrieved and loaded into a tape drive to be read. In this manner, information stored on the tape library 108B may provide protection in the event of a disaster or other failure.

The file system sub-client and its associated primary data 112A in certain embodiments generally comprise information generated by the file system and/or operating system of the client computing device 102, and can include, for example, file system data (e.g., regular files, file tables, mount points, etc.), operating system data (e.g., registries, event logs, etc.), and the like. The e-mail sub-client, on the other hand, and its associated primary data 1126, include data generated by an e-mail client application operating on the client computing device 102, and can include mailbox information, folder information, emails, attachments, associated database information, and the like. As described above, the sub-clients can be logical containers, and the data included in the corresponding primary data 112A, 1126 may or may not be stored contiguously.

The exemplary storage policy 148A includes backup copy preferences or rule set 160, disaster recovery copy preferences rule set 162, and compliance copy preferences or rule set 164. The backup copy rule set 160 specifies that it is associated with a file system sub-client 166 and an email sub-client 168. Each of these sub-clients 166, 168 are associated with the particular client computing device 102.

The backup copy rule set 160 further specifies that the backup operation will be written to the disk library 108A, and designates a particular media agent 144A to convey the data to the disk library 108A. Finally, the backup copy rule set 160 specifies that backup copies created according to the rule set 160 are scheduled to be generated on an hourly basis and to be retained for 30 days. In some other embodiments, scheduling information is not included in the storage policy 148A, and is instead specified by a separate scheduling policy.

The disaster recovery copy rule set 162 is associated with the same two sub-clients 166, 168. However, the disaster recovery copy rule set 162 is associated with the tape library 108B, unlike the backup copy rule set 160. Moreover, the disaster recovery copy rule set 162 specifies that a different media agent 144B than the media agent 144A associated with the backup copy rule set 160 will be used to convey the data to the tape library 108B. As indicated, disaster recovery copies created according to the rule set 162 will be retained for 60 days, and will be generated on a daily basis. Disaster recovery copies generated according to the disaster recovery copy rule set 162 can provide protection in the event of a disaster or other data-loss event that would affect the backup copy 116A maintained on the disk library 108A.

The compliance copy rule set 164 is only associated with the email sub-client 168, and not the file system sub-client 166. Compliance copies generated according to the compliance copy rule set 164 will therefore not include primary data 112A from the file system sub-client 166. For instance, the organization may be under an obligation to store and maintain copies of email data for a particular period of time (e.g., 10 years) to comply with state or federal regulations, while similar regulations do not apply to the file system data. The compliance copy rule set 164 is associated with the same tape library 108B and media agent 144B as the disaster recovery copy rule set 162, although a different storage device or media agent could be used in other embodiments. Finally, the compliance copy rule set 164 specifies that copies generated under the compliance copy rule set 164 will be retained for 10 years, and will be generated on a quarterly basis.

At step 1, the storage manager 140 initiates a backup operation according to the backup copy rule set 160. For instance, a scheduling service running on the storage manager 140 accesses scheduling information from the backup copy rule set 160 or a separate scheduling policy associated with the client computing device 102, and initiates a backup copy operation on an hourly basis. Thus, at the scheduled time slot the storage manager 140 sends instructions to the client computing device 102 to begin the backup operation.

At step 2, the file system data agent 142A and the email data agent 142B residing on the client computing device 102 respond to the instructions received from the storage manager 140 by accessing and processing the primary data 112A, 112B involved in the copy operation from the primary storage device 104. Because the operation is a backup copy operation, the data agent(s) 142A, 142B may format the data into a backup format or otherwise process the data.

At step 3, the client computing device 102 communicates the retrieved, processed data to the first media agent 144A, as directed by the storage manager 140, according to the backup copy rule set 160. In some other embodiments, the information management system 100 may implement a load-balancing, availability-based, or other appropriate algorithm to select from the available set of media agents 144A, 144B. Regardless of the manner the media agent 144A is selected, the storage manager 140 may further keep a record in the storage manager database 146 of the association between the selected media agent 144A and the client computing device 102 and/or between the selected media agent 144A and the backup copy 116A.

The target media agent 144A receives the data from the client computing device 102, and at step 4 conveys the data to the disk library 108A to create the backup copy 116A, again at the direction of the storage manager 140 and according to the backup copy rule set 160. The secondary storage device 108A can be selected in other ways. For instance, the media agent 144A may have a dedicated association with a particular secondary storage device(s), or the storage manager 140 or media agent 144A may select from a plurality of secondary storage devices, e.g., according to availability, using one of the techniques described in U.S. Pat. No. 7,246,207, which is incorporated by reference herein.

The media agent 144A can also update its index 153 to include data and/or metadata related to the backup copy 116A, such as information indicating where the backup copy 116A resides on the disk library 108A, data and metadata for cache retrieval, etc. After the 30 day retention period expires, the storage manager 140 instructs the media agent 144A to delete the backup copy 116A from the disk library 108A. The storage manager 140 may similarly update its index 150 to include information relating to the storage operation, such as information relating to the type of storage operation, a physical location associated with one or more copies created by the storage operation, the time the storage operation was performed, status information relating to the storage operation, the components involved in the storage operation, and the like. In some cases, the storage manager 140 may update its index 150 to include some or all of the information stored in the index 153 of the media agent 144A.

At step 5, the storage manager 140 initiates the creation of a disaster recovery copy 116B according to the disaster recovery copy rule set 162. For instance, at step 6, based on instructions received from the storage manager 140 at step 5, the specified media agent 144B retrieves the most recent backup copy 116A from the disk library 108A.

At step 7, again at the direction of the storage manager 140 and as specified in the disaster recovery copy rule set 162, the media agent 144B uses the retrieved data to create a disaster recovery copy 116B on the tape library 108B. In some cases, the disaster recovery copy 116B is a direct, mirror copy of the backup copy 116A, and remains in the backup format. In other embodiments, the disaster recovery copy 116B may be generated in some other manner, such as by using the primary data 112A, 112B from the primary storage device 104 as source data. The disaster recovery copy operation is initiated once a day and the disaster recovery copies 116B are deleted after 60 days.

At step 8, the storage manager 140 initiates the creation of a compliance copy 116C, according to the compliance copy rule set 164. For instance, the storage manager 140 instructs the media agent 144B to create the compliance copy 116C on the tape library 108B at step 9, as specified in the compliance copy rule set 164. In the example, the compliance copy 116C is generated using the disaster recovery copy 116B. In other embodiments, the compliance copy 116C is instead generated using either the primary data 112B corresponding to the email sub-client or using the backup copy 116A from the disk library 108A as source data. As specified, in the illustrated example, compliance copies 116C are created quarterly, and are deleted after ten years.

While not shown in FIG. 1E, at some later point in time, a restore operation can be initiated involving one or more of the secondary copies 116A, 116B, 116C. As one example, a user may manually initiate a restore of the backup copy 116A by interacting with the user interface 158 of the storage manager 140. The storage manager 140 then accesses data in its index 150 (and/or the respective storage policy 148A) associated with the selected backup copy 116A to identify the appropriate media agent 144A and/or secondary storage device 108A.

In other cases, a media agent may be selected for use in the restore operation based on a load balancing algorithm, an availability based algorithm, or other criteria. The selected media agent 144A retrieves the data from the disk library 108A. For instance, the media agent 144A may access its index 153 to identify a location of the backup copy 116A on the disk library 108A, or may access location information residing on the disk 108A itself.

When the backup copy 116A was recently created or accessed, the media agent 144A accesses a cached version of the backup copy 116A residing in the index 153, without having to access the disk library 108A for some or all of the data. Once it has retrieved the backup copy 116A, the media agent 144A communicates the data to the source client computing device 102. Upon receipt, the file system data agent 142A and the email data agent 142B may unpackage (e.g., restore from a backup format to the native application format) the data in the backup copy 116A and restore the unpackaged data to the primary storage device 104.

Exemplary Applications of Storage Policies

The storage manager 140 may permit a user to specify aspects of the storage policy 148A. For example, the storage policy can be modified to include information governance policies to define how data should be managed in order to comply with a certain regulation or business objective. The various policies may be stored, for example, in the database 146. An information governance policy may comprise a classification policy, which is described herein. An information governance policy may align with one or more compliance tasks that are imposed by regulations or business requirements. Examples of information governance policies might include a Sarbanes-Oxley policy, a HIPAA policy, an electronic discovery (E-Discovery) policy, and so on.

Information governance policies allow administrators to obtain different perspectives on all of an organization's online and offline data, without the need for a dedicated data silo created solely for each different viewpoint. As described previously, the data storage systems herein build a centralized index that reflects the contents of a distributed data set that spans numerous clients and storage devices, including both primary and secondary copies, and online and offline copies. An organization may apply multiple information governance policies in a top-down manner over that unified data set and indexing schema in order to permit an organization to view and manipulate the single data set through different lenses, each of which is adapted to a particular compliance or business goal. Thus, for example, by applying an E-discovery policy and a Sarbanes-Oxley policy, two different groups of users in an organization can conduct two very different analyses of the same underlying physical set of data copies, which may be distributed throughout the organization.

A classification policy defines a taxonomy of classification terms or tags relevant to a compliance task and/or business objective. A classification policy may also associate a defined tag with a classification rule. A classification rule defines a particular combination of data criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes. A classification rule may also be defined using other classification tags in the taxonomy. The various criteria used to define a classification rule may be combined in any suitable fashion, for example, via Boolean operators, to define a complex classification rule. As an example, an E-discovery classification policy might define a classification tag "privileged" that is associated with documents or data objects that (1) were created or modified by legal department staff, (2) were sent to or received from outside counsel via email, and/or (3) contain one of the following keywords: "privileged" or "attorney," "counsel", or other terms.

One specific type of classification tag, which may be added to an index at the time of indexing, is an entity tag. An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc.

A user may define a classification policy by indicating criteria, parameters or descriptors of the policy via a graphical user interface that provides facilities to present information and receive input data, such as a form or page with fields to be filled in, pull-down menus or entries allowing one or more of several options to be selected, buttons, sliders, hypertext links or other known user interface tools for receiving user input. For example, a user may define certain entity tags, such as a particular product number or project ID code that is relevant in the organization.

In some implementations, the classification policy can be implemented using cloud-based techniques. For example, the storage devices may be cloud storage devices, and the storage manager 140 may execute cloud service provider API over a network to classify data stored on cloud storage devices.

Exemplary Secondary Copy Formatting

The formatting and structure of secondary copies 116 can vary, depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to a single secondary storage device 108 or across multiple secondary storage devices 108. In some cases, users can select different chunk sizes, e.g., to improve throughput to tape storage devices.

Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, the media agent 144, storage manager 140, or other component may divide the associated files into chunks and generate headers for each chunk by processing the constituent files.

The headers can include a variety of information such as file identifier(s), volume(s), offset(s), or other information associated with the payload data items, a chunk sequence number, etc. Importantly, in addition to being stored with the secondary copy 116 on the secondary storage device 108, the chunk headers can also be stored to the index 153 of the associated media agent(s) 144 and/or the index 150. This is useful in some cases for providing faster processing of secondary copies 116 during restores or other operations. In some cases, once a chunk is successfully transferred to a secondary storage device 108, the secondary storage device 108 returns an indication of receipt, e.g., to the media agent 144 and/or storage manager 140, which may update their respective indexes 153, 150 accordingly. During restore, chunks may be processed (e.g., by the media agent 144) according to the information in the chunk header to reassemble the files.

Data can also be communicated within the information management system 100 in data channels that connect the client computing devices 102 to the secondary storage devices 108. These data channels can be referred to as "data streams", and multiple data streams can be employed to parallelize an information management operation, improving data transfer rate, among providing other advantages. Example data formatting techniques including techniques involving data streaming, chunking, and the use of other data structures in creating copies (e.g., secondary copies) are described in U.S. Pat. Nos. 7,315,923 and 8,156,086, and 8,578,120, each of which is incorporated by reference herein.

Figure 1F:
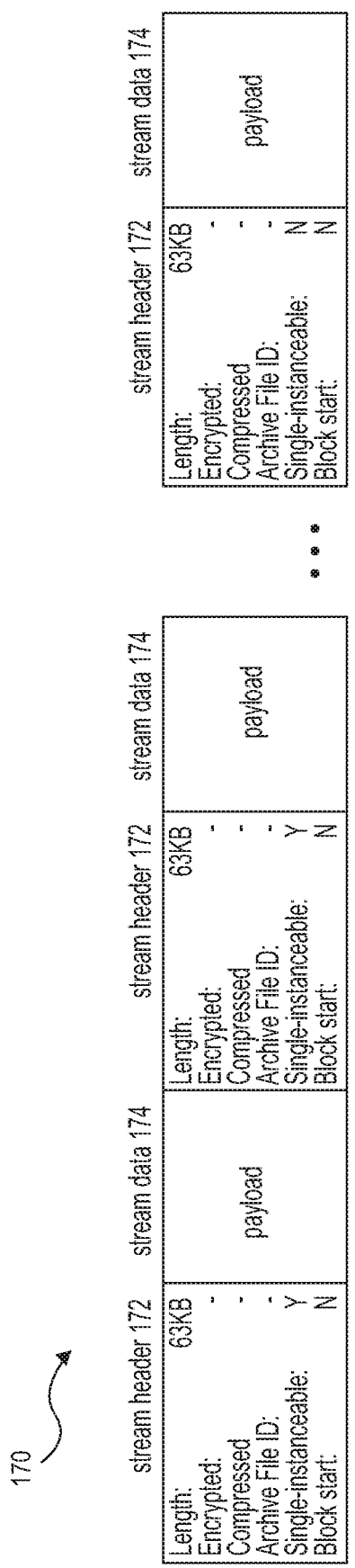
FIGS. 1F-1H are block diagrams illustrating suitable data structures that may be employed by the information management system.
Figure 1G:
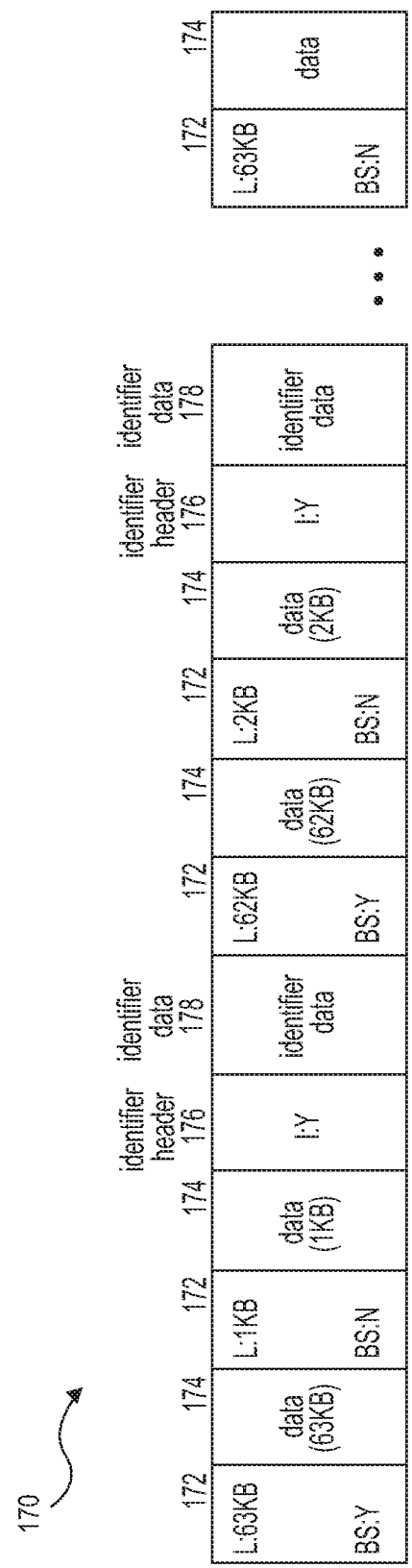

FIGS. 1F and 1G are diagrams of example data streams 170 and 171, respectively, which may be employed for performing data storage operations. Referring to FIG. 1F, the data agent 142 forms the data stream 170 from the data associated with a client computing device 102 (e.g., primary data 112). The data stream 170 is composed of multiple pairs of stream header 172 and stream data (or stream payload) 174. The data streams 170 and 171 shown in the illustrated example are for a single-instanced storage operation, and a stream payload 174 therefore may include both single-instance ("SI") data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, the data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or for non-SI data.

Figure 1H:
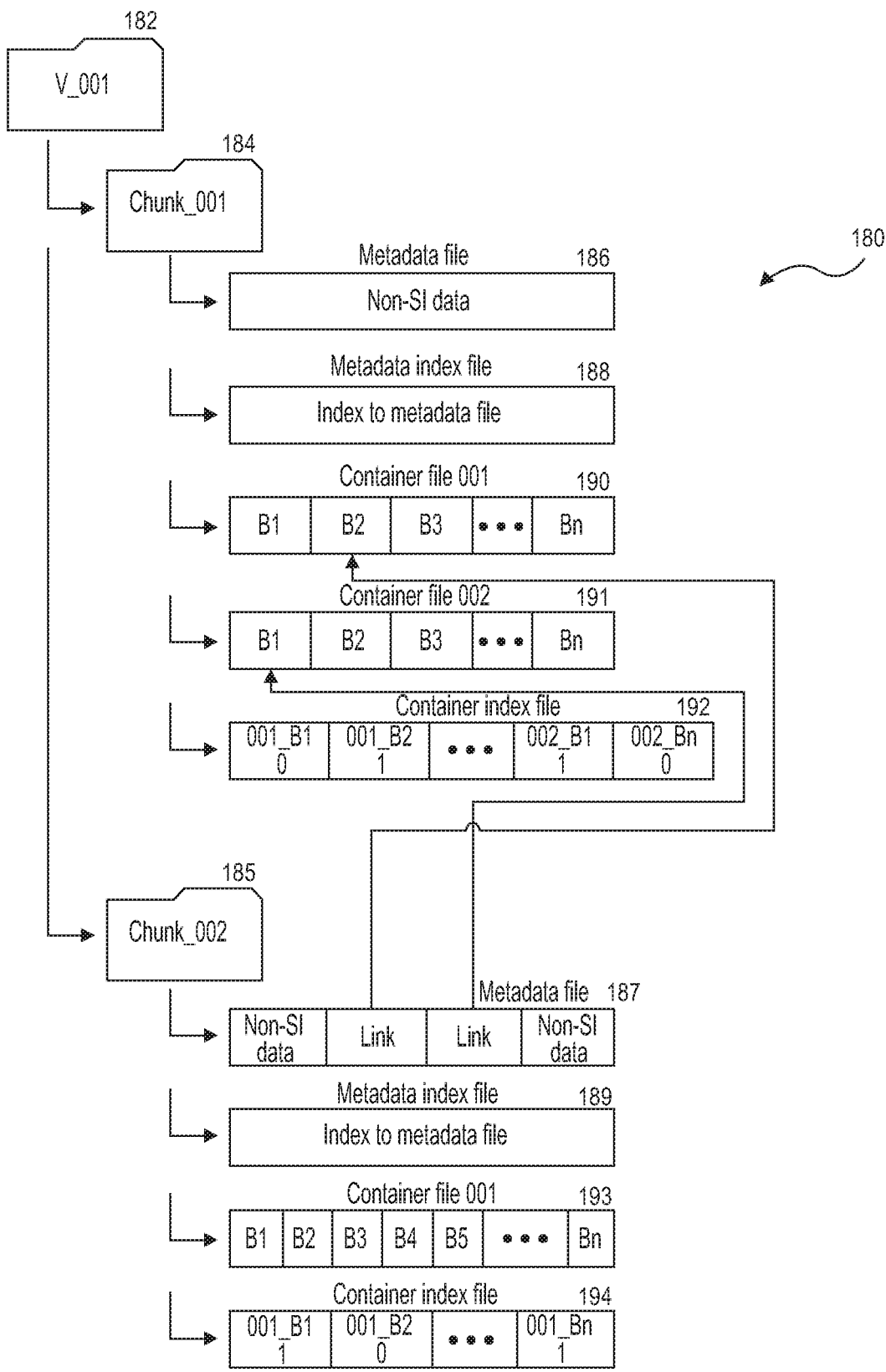

FIG. 1H is a diagram illustrating the data structures 180 that may be used to store blocks of SI data and non-SI data on the storage device (e.g., secondary storage device 108).

According to certain embodiments, the data structures 180 do not form part of a native file system of the storage device. The data structures 180 include one or more volume folders 182, one or more chunk folders 184/185 within the volume folder 182, and multiple files within the chunk folder 184. Each chunk folder 184/185 includes a metadata file 186/187, a metadata index file 188/189, one or more container files 190/191/193, and a container index file 192/194. The metadata file 186/187 stores non-SI data blocks as well as links to SI data blocks stored in container files. The metadata index file 188/189 stores an index to the data in the metadata file 186/187. The container files 190/191/193 store SI data blocks. The container index file 192/194 stores an index to the container files 190/191/193. Among other things, the container index file 192/194 stores an indication of whether a corresponding block in a container file 190/191/193 is referred to by a link in a metadata file 186/187. For example, data block B2 in the container file 190 is referred to by a link in the metadata file 187 in the chunk folder 185. Accordingly, the corresponding index entry in the container index file 192 indicates that the data block B2 in the container file 190 is referred to. As another example, data block B1 in the container file 191 is referred to by a link in the metadata file 187, and so the corresponding index entry in the container index file 192 indicates that this data block is referred to.

As an example, the data structures 180 illustrated in FIG. 1H may have been created as a result of two storage operations involving two client computing devices 102. For example, a first storage operation on a first client computing device 102 could result in the creation of the first chunk folder 184, and a second storage operation on a second client computing device 102 could result in the creation of the second chunk folder 185. The container files 190/191 in the first chunk folder 184 would contain the blocks of SI data of the first client computing device 102. If the two client computing devices 102 have substantially similar data, the second storage operation on the data of the second client computing device 102 would result in the media agent 144 storing primarily links to the data blocks of the first client computing device 102 that are already stored in the container files 190/191. Accordingly, while a first storage operation may result in storing nearly all of the data subject to the storage operation, subsequent storage operations involving similar data may result in substantial data storage space savings, because links to already stored data blocks can be stored instead of additional instances of data blocks.

If the operating system of the secondary storage computing device 106 on which the media agent 144 resides supports sparse files, then when the media agent 144 creates container files 190/191/193, it can create them as sparse files. As previously described, a sparse file is type of file that may include empty space (e.g., a sparse file may have real data within it, such as at the beginning of the file and/or at the end of the file, but may also have empty space in it that is not storing actual data, such as a contiguous range of bytes all having a value of zero). Having the container files 190/191/193 be sparse files allows the media agent 144 to free up space in the container files 190/191/193 when blocks of data in the container files 190/191/193 no longer need to be stored on the storage devices. In some examples, the media agent 144 creates a new container file 190/191/193 when a container file 190/191/193 either includes 100 blocks of data or when the size of the container file 190 exceeds 50 MB. In other examples, the media agent 144 creates a new container file 190/191/193 when a container file 190/191/193 satisfies other criteria (e.g., it contains from approximately 100 to approximately 1000 blocks or when its size exceeds approximately 50 MB to 1 GB).

In some cases, a file on which a storage operation is performed may comprise a large number of data blocks. For example, a 100 MB file may be comprised in 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. As described in detail herein, restoring such files may thus requiring accessing multiple container files, chunk folders, and/or volume folders to obtain the requisite data blocks.

Snapshot Management System

Figure 2:
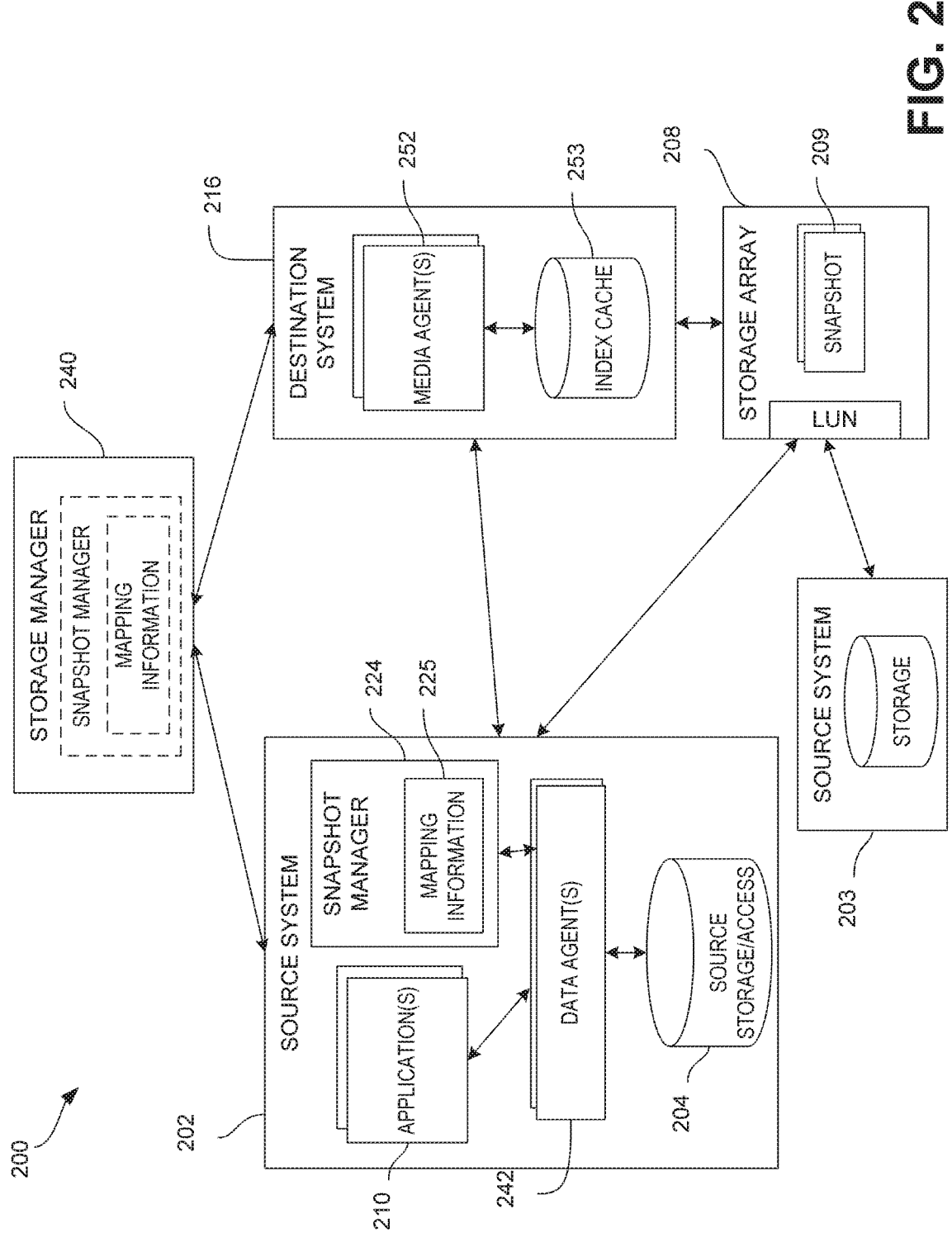
FIG. 2 illustrates an example information management system for snapshot management according to one or more embodiments disclosed herein.

FIG. 2 illustrates an example information management system 200 for snapshot management according to one or more embodiments disclosed herein. Snapshots can be point-in-time images of production data, or of copies of production data, including replicated copies, for example. Snapshots can also include system state data, application state data, file system data, and other types of information. As just one example, application state and/or system data can be used to recover from a crash to an application state that existed prior to a crash. Wherever taking a snapshot of data is described in this disclosure, it should be understood that the data can include production data, system state data, application state data, file system data, or any other relevant data and/or information. Although a variety of snapshot techniques are compatible with the embodiments described herein, in some embodiments, the snapshots can be created by maintaining pointers to unchanged data and copying changed data (e.g., blocks), using a copy-on-write methodology, for example. The system 200 of FIG. 2 includes a storage manager 240, one or more source systems 202, 203 (e.g., client system), and at least one destination storage system or destination system 216 and storage array or one or more storage devices 208. In general, the components shown in FIG. 2 may be similar to corresponding components shown in certain of FIGS. 1A-1H. For instance, one or more of the storage manager 240, source system 202, data agent(s) 242, and destination system 216 may be similar to the storage manager 140, client 102, data agent(s) 142, and primary and/or secondary storage device(s), respectively, of certain of FIGS. 1A-1H.

In certain embodiments, the system 200 includes a storage manager 240, which may include one or more of the following modules or components: a volume replication table, a storage manager index cache, a client, an information store, a data agent, a media agent, a media agent index cache, and a storage device.

The source system 202 may include one or more applications 210, one or more data agents 242, and a snapshot manager 224 executing thereon. The applications 210 can include software applications executing on the source system 202 and may generate and modify production data. As just a few examples, the software applications 210 may include database applications, server software, virtual machine managers, operating systems, file system management software, and other types of applications.

The source system 202 can include a data store or source storage 204 for storing the production data generated by the applications 210. The source storage 204 may include any type of physical media capable of storing electronic data. For example, the source storage 204 may comprise magnetic storage, such as a disk drive, or other type of mass storage.

In certain embodiments, the source storage 204 may be internal and/or external to (e.g., remote to) one or more other components of the source system 202. In yet other embodiments, the source storage 204 can include a network-attached storage (NAS) or the like. In certain embodiments, the source storage 204 includes relatively fast access times as compared to tape or other relatively slower or less expensive media. For instance, the source storage can include hard disk drives (HDD's) including spinning media or solid state drives (SSD's) including solid-state storage, such as flash-based or DRAM-based SSD's.

In certain embodiments, the data agent(s) 242 provide an interface to a source data store 204 to execute copies, snapshots, archiving, migration, recovery and other storage operations on data, for example, in conjunction with one or more media agents. In certain embodiments, a source system 202 runs a number of data agents 242, wherein each data agent is configured to interface with data generated by or from one or more applications 210. For example, a first data agent may be configured to interface with Microsoft Exchange data and a second data agent to interface with Oracle database data. As is explained in greater detail herein, a data agent 242 may be in communication with one or more media agents to effect the distributed storage of snapshots on one or more storage devices that are remote from the information store that is the source of the snapshot.

The storage manager 240 may communicate with data and/or media agents to control and manage snapshot creation, migration, recovery and other storage operations. According to one embodiment, the storage manager 240 maintains data in a storage manager index cache that instructs a given data agent 242 to work in conjunction with a specific media agent to store snapshots on one or more storage devices 208. In certain embodiments, a snapshot is spread over multiple storage devices. In certain embodiments, metadata associated with one or more snapshots is stored in the media agent(s) 252, whereas the storage array 208 provides storage for the snapshots themselves. Storage may be provisioned from the destination storage array 208 to the source system 202. In certain embodiments, application agents of the source system 202 provide requests to the media agent(s) 252, wherein the media agent(s) communicates requests to the storage array 208 for snapshot creation.

The snapshot manager 224 can be a software module that is generally configured to manage interaction with the destination system 216 to carry out snapshot operations. The snapshot operations can include, without limitation, snapshot creation, mounting, unmounting, deletion and reversion. The components of the snapshot manager 224 in some embodiments work together to gather and/or package the appropriate data and metadata related to the requested snapshot operation for transmission to the destination system 216. In certain embodiments, the snapshot management layer or snapshot manager 224 or portions thereof are implemented on a proxy system (not shown) that is separate from the source system 202, instead of, or in addition to being implemented on the source system 202. The proxy system can therefore be configured to perform some or all of the snapshot management processing, thereby alleviating the associated burden from the source system 202 and improving performance of the source system 202.

The snapshot manager 224 may utilize mapping information 225 to track multiple snapshots across multiple storage devices. For example, the system may, as directed by an information management policy or a user, store a first snapshot on a first storage device, such as a tape drive or library, and then store subsequent snapshots containing only the changed cluster(s) on a second storage device, such as an optical drive or library. Alternatively, instructions may be stored within system components, such as the storage manager 240 or media agent 252, directing the storage device(s) 208 used to store snapshots.

The mapping information 225 may provide mapping data for locating and/or identifying data in the snapshot associated with one or more particular applications and/or agents. Furthermore, the mapping information 225 may indicate the number and/or type of applications associated with the snapshot data. In certain embodiments, the mapping information is maintained by one or more of the requesting applications associated with the snapshot. For example, a first application associated with the snapshot may initiate population of the mapping information 225 by providing information related to itself, wherein subsequent applications associated with the snapshot may provide further data. In certain embodiments, the mapping information 225 is used to locate relevant data for restoration of data associated with one or more of the applications.

In certain embodiments, certain storage devices of the system are configured to create and/or store snapshot copies of production data that is generated by applications running on the source system 202, such as the production data stored in the source storage 204. For example, destination storage devices can be capable of performing hardware-based snapshots (e.g., storage array-based hardware snapshots).

The snapshot manager 224 may manage the creation of a snapshot in the corresponding storage array 208. In some embodiments, the snapshot manager 224 is a software module executing on the source system 202, or is implemented in hardware/software on the destination system 216. Furthermore, in certain embodiments, the snapshot manager 224 is a component of the storage manager 240.

The data agents 242 may generally manage the movement of the production data from the applications to the source storage 204 and/or other locations in the storage system 200. In some embodiments, the data agents 242 manage movement of the production data to the storage array 208, either directly, or indirectly (e.g., from the source storage 204), depending on the embodiment. The data agents 242 can also be responsible for backing up, archiving, migrating or otherwise creating copies of production data on secondary storage, either directly, or via one or more media agents.

Each data agent 242 may be application-specific and associated with a corresponding application, such as any of the applications or types of applications discussed herein. For example, without limitation, a data agent 242 may be associated with one or more of the following: DB2, Informix, Microsoft Exchange, Microsoft Hyper-V, Microsoft SharePoint, Microsoft SQL, Oracle, SAP, and Microsoft Windows, Linux and Unix file systems. In certain embodiments, the data agents 242 may be generic, where each data agent is capable of handling two or more data types, such as data generated by more than one applications. The data agents in some embodiments process data to provide application-consistent storage of production data. In some embodiments, the data agents 242 are in communication with the snapshot manager 224 and are responsible for directing data and metadata transfer between the snapshot manager 224 and the source storage 204 during snapshot operations.

The system 200 includes a destination system 216 where snapshots and/or backup copies may be stored. The destination system may include one or more media agents 252, an index cache 253, and a storage array 208 comprising media on which snapshots and/or backup copies may be stored. In certain embodiments, the media agent(s) and/or storage array 208 may be separate from the destination system 216. The destination system 216 may include an index, or index cache 253, which may include data generated during secondary copy operations and other storage or information management operations. The index cache 253 can provide the media agent(s) 252 with a fast and efficient mechanism for locating snapshots located in the storage array 208, or other data stored in the storage array 208. In certain embodiments, the index cache 253 includes metadata or other information relating to data stored in the storage array 208. Such metadata may include, for example, a path to the snapshots 209 stored in the storage array 208, when the snapshots were created or modified, etc. The index cache 253 may, therefore, include metadata associated with the snapshots that is readily available for use in storage operations and other activities without having to be first retrieved from the storage array 208. In certain embodiments, some or all of the data in the index cache 253 may instead or additionally be stored along with the snapshots 209 in the storage array 208.

The media agent 252 may receive snapshots, possibly including the changed data that is tracked by the snapshot, from one or more data agents 242 and determine one or more storage arrays 208 to which the snapshot should be written. According to one embodiment, the media agent 252 applies load-balancing algorithms to select a storage array 208 to which to write the snapshot. Alternatively, the snapshots may be provided directly to the storage array 208 by the source system 202, such as by one or more data agents 242.

In certain embodiments, the storage manager 240 may instruct the media agent 252 as to which storage array 208 the snapshot should be written. In this manner, snapshots from given source storage 204 may be written to one or more storage arrays 208, improving data availability for restoration purposes in the event that the source storage fails. Either the media agent 252 or the storage manager 240 may record the storage device on which the snapshot is written in the mapping information 225, thereby allowing the snapshot to be located when required for restoring the source storage 204.

The index cache 253 may be configured to store index data the system generates during snapshot, migration, and restore operations. For example, storage operations for Microsoft Exchange data generate application specific index data regarding the substantive Exchange data. Similarly, other applications may be capable of generating application specific data during a snapshot. Such data may generally be described as metadata. A media agent index cache may track data that includes, for example, information regarding the location of stored data on a given volume. Index data provides the system with an efficient mechanism for locating user files during storage operations such as copying, performing snapshots and recovery. In certain embodiments, the index data may be stored with the snapshot that is backed up to the destination storage 208, and the media agent that controls the storage operation may also write an additional copy of the index data to its media agent index cache.

The destination storage 208 may include any type of physical media capable of storing electronic data. For example, the destination storage 208 may comprise magnetic storage, such as a disk or a tape drive, or other type of mass storage. In certain embodiments, the destination storage 208 may be internal and/or external to (e.g., remote to) one or more other components of the destination system 216. In yet other embodiments, the destination storage 208 can include a NAS or the like. In certain embodiments, the destination storage 208 includes relatively fast access times as compared to tape or other relatively slower or less expensive media. For instance, the destination storage can include hard disk drives (HDD's) including spinning media or solid state drives (SSD's) including solid-state storage, such as flash-based or DRAM-based SSD's. In certain embodiments, the destination system 216 includes one or more separate computing devices (not shown). For instance, where replication is used (e.g., continuous data replication (CDR)), the destination system 216 may include a separate computing device in communication with the destination system 216 and including a replication module configured to manage replication of the data stored in the source storage 204.

Data Storage Allocation for Snapshots

Figure 3:
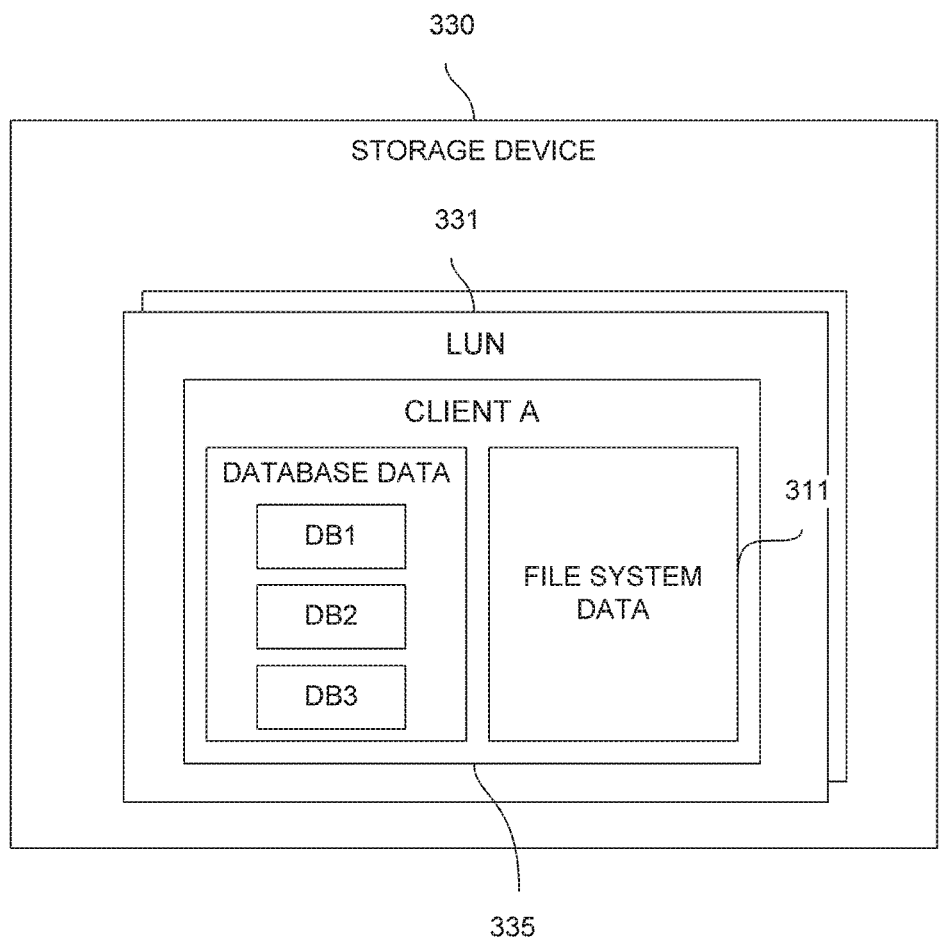
FIG. 3 illustrates an example data storage device comprising one or more volumes of client production data in accordance with one or more embodiments disclosed herein.

Certain embodiments disclosed herein provide a system requiring a reduced number of snapshots, wherein a global snapshot is taken and virtually separated into relevant portions for particular clients and application. An information management system may include one or more destination and/or source storage devices. FIG. 3 illustrates an example data storage device comprising one or more volumes of client production data of which snapshots may be taken in accordance with one or more embodiments disclosed herein. In an information management system, a storage device 330 may be partitioned into one or more logical volumes or other independently accessible portions. In certain embodiments, the storage device 330 may include one or more Logical Unit Numbers (LUNs) 331 (e.g., hardware disks or spindles), each of which stores one or more such volumes (e.g., production data associated with a client, such as Client A). A LUN may comprise an externally addressable entity within a target device that implements an SCSI device model. Each of the client volumes may be a component of a storage stack, which may include file systems, volume managers, device drivers, storage devices, and/or other components that operate together to provide access to the storage. Client volumes and backup images stored therein may be used for backup operations, snapshot operations, and restore operations, in such cases where the storage device 330 also serves as a secondary storage device in addition to being primary storage.

In certain systems, multiple applications and/or clients may share a single LUN for data storage. For example, multiple databases (e.g., DB1, DB2, DB3) may be stored on the LUN 331 in association with one or more client volumes 335. Furthermore, the LUN 331 may include data generated by both database applications and file system data applications 311, as shown. In certain systems or embodiments, when a snapshot is performed for a particular application/database (e.g., for DB1 associated with Client A), a snapshot may be taken of the entire LUN 331 with which the application is associated. The relevant portions of the snapshot may be subsequently identified and stored in association with the requesting application. However, remaining portions of the snapshot may then be discarded, introducing operational inefficiencies into the snapshot system. Certain embodiments disclosed herein provide systems and methods for reusing global snapshots for multiple applications and/or clients, thereby improving operational efficiency.

Figure 4:
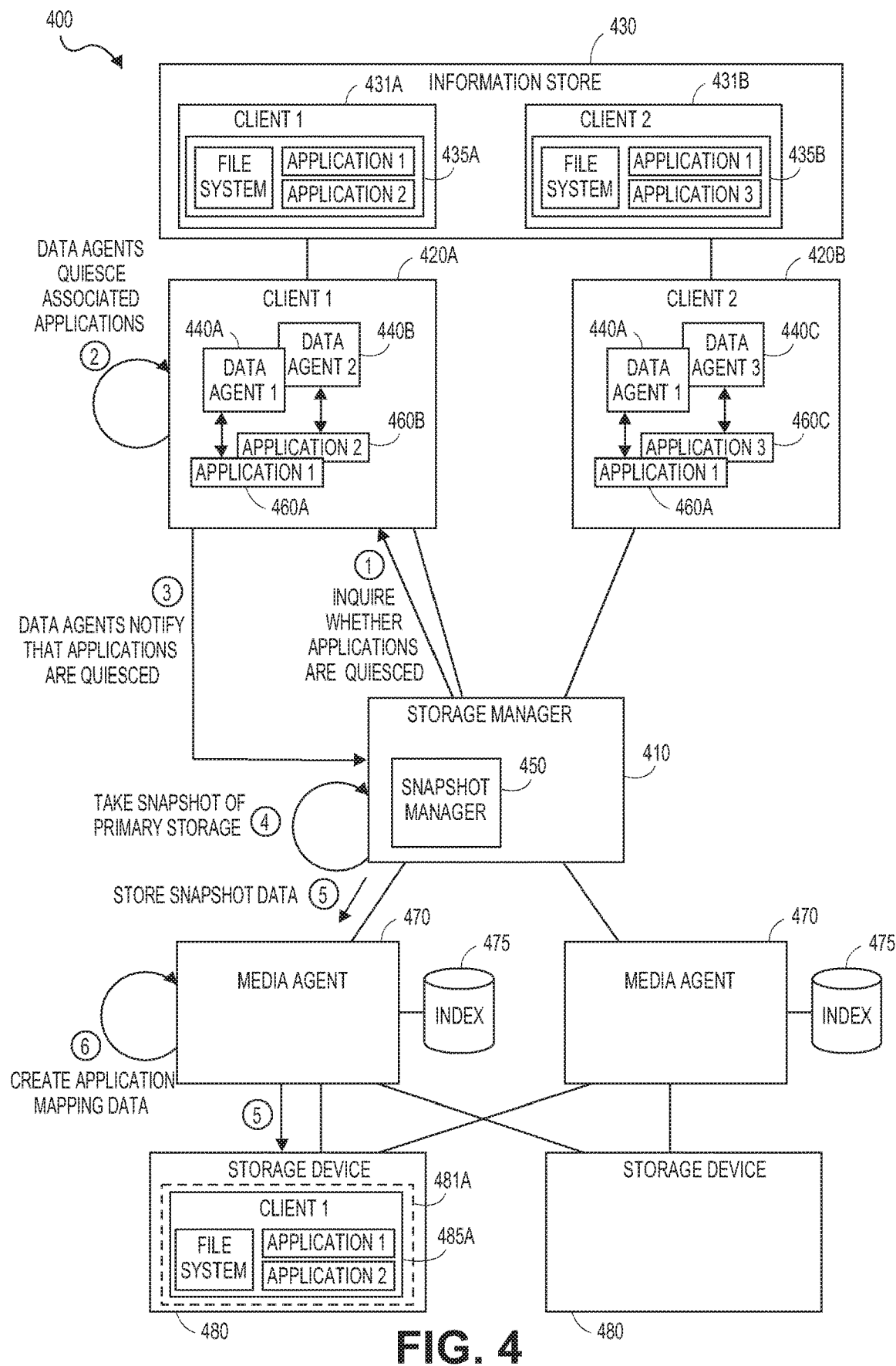
FIG. 4 is a data flow diagram illustrative of the interaction between the various components of an exemplary information management system configured to implement single snapshot for multiple applications, according to certain embodiments.

An Exemplary Information Management System for Implementing Single Snapshot for Multiple Applications FIG. 4 is a data flow diagram illustrative of the interaction between the various components of an exemplary information management system 400 configured to implement and generate a single snapshot for multiple applications, according to certain embodiments. As illustrated, the exemplary information management system 400 includes a storage manager 410, one or more clients 420, one or more information stores or primary storage devices 430, one or more data agents 440, one or more snapshot managers 450, one or more applications 460, one or more media agents 470, and one or more secondary storage devices 480. The system 400 and corresponding components of FIG. 4 may be similar to or the same as the system 100, 200 and similarly named (though not necessarily similarly numbered) components of FIGS. 1D and 2.

The components of FIG. 4 may be similar to the components in FIG. 2. For example, the snapshot manager 450 may be similar to the snapshot manager 224 in FIG. 2. The clients 420 can be similar to the source systems 202 in FIG. 2. The information store or primary storage device(s) 430 or the secondary storage device(s) 480 may be similar to the storage array 208 and/or the destination system 216 in FIG. 2.

Moreover, depending on the embodiment, the system 400 of FIG. 4 may additionally include any of the other components shown in FIGS. 1D and 2 that are not specifically shown in FIG. 4. The system 400 may include one or more of each component. All components of the system 400 can be in direct communication with each other or communicate indirectly via the client 420, the storage manager 410, the media agent 470, or the like. In certain embodiments, some of the components in FIG. 4 shown as separate components can reside on a single computing device, or vice versa. For example, the snapshot manager 450 can be on the storage manager 410, the client 420, or on a separate computing device.

In certain embodiments, for example, described with respect to FIGS. 4-7, the snapshot manager 450 may direct the timing of the single snapshot (e.g., according to a storage policy). In other embodiments, for example, as described with respect to FIGS. 2-3 and 8-10, the snapshot manager 224 may play a more passive role and obtain the single snapshot based on snapshot requests from the applications 210. For example, the snapshot manager 224 can group snapshot requests from multiple applications 210 based on time of receipt (e.g., received within a time window) and obtain a single snapshot.

A snapshot may refer to the state of a system at a particular point in time. A snapshot may be a read-only copy of data frozen at a point in time. The snapshot can be an actual copy of the state of a system or may include a set of pointers to the data. Snapshots can be created efficiently; the time it takes to create a snapshot does not increase with the size of the data. In some cases, after the initial snapshot is taken of a data set, subsequent snapshots use pointers to reference the initial snapshot and copy only changed data. Pointer-based snapshots may require much less disk space than full copy snapshots.

Data associated with multiple applications may be stored on the same logical volume (e.g., LUN). In general, when an application requests a snapshot of data associated with the application, the snapshot of the entire volume is taken, although the data of interest may only be the data for the requesting application. Accordingly, the system 400 can coordinate snapshot operations such that a single snapshot can be taken for multiple applications whose data is residing on the same volume. For example, the system 400 can take a single snapshot for applications that have a similar snapshot frequency. The applications associated with the data stored on a particular volume can each be quiesced or placed in a consistent state, and the system 400 can take a single snapshot of the volume. Then, the system 400 can create metadata relating to which portion of the snapshot is associated with which application.

In this manner, the system 400 can reduce the number of snapshots to be taken. In some embodiments, the organization associated with the system 400 may license the snapshot technology and may be allowed a limited number of snapshots for a certain amount of fees. Being able to reduce the number of snapshots taken can lead to savings in costs as well as resources.

At data flow step 1, the snapshot manager 450 inquires whether applications 460 are quiesced. The snapshot manager 450 can reside on the storage manager 410 or the client 420, depending on the embodiment. The snapshot manager 450 may coordinate and/or manage snapshot operations, including taking a single snapshot for multiple applications. The snapshot manager 450 may be similar to the snapshot manager 224 in FIG. 2.

The system 400 can include one or more clients or client computing devices 420. The clients 420 can be similar to the source systems 202 in FIG. 2. One or more applications 460 may be installed on a client 420. The applications 460 installed can be the same across all clients 420 or vary depending on the client 420 (e.g., based on each client 420, based on the group the client 420 belongs to, etc.). Some examples of applications 460 include database applications, email applications, word processing applications, operating systems, virtual machines, etc.

The data associated with the applications 460 may be stored on the information store or primary storage device 430. The information store 430 can be shared by multiple clients 420. In some embodiments, the information store 430 is organized as one or more LUNs including one or more volumes, as described in FIG. 3. For example, the information store 430 can be similar to the storage device 330 in FIG. 3. The same LUN or volume can include data for multiple applications. In one embodiment, the information store 430 includes both application data and file system data.

An application 460 may be associated with a particular data agent 440. For example, Oracle may have a data agent 440 associated with it, and Exchange may have a data agent 440 associated with it. There can also be a data agent 440 for a file system (e.g., for Windows, Linux, Unix, etc.). A data agent 440 can manage and process a particular type of data, for example, in connection with various storage operations. For example, a data agent 440 may know how the data of an application 460 is structured and what operations are supported by the application 460. The data agent 440 may have knowledge of the format of the data of the application 460 and/or the directory structure or hierarchy of the application 460 and/or the file system. Data agents 440 may be installed on the clients 420 that have the corresponding or associated applications 460 and/or file systems installed.

In an illustrative example of FIG. 4, Data Agent 1 440*a* is associated with Application 1 460*a*; Data Agent 2 440*b* is associated with Application 2 460*b*; and Data Agent 3 440*c* is associated with Application 3 460*c*. Application 1 460*a* is installed on both Client 1 420*a* and Client 2 420*b*, and Application 2 460*b* and 3 460*c* are installed on Client 1 420*a* and Client 2 420*b*, respectively. The correspondence between a data agent 440 and an application 460 may be one-to-one, one-to-many, many-to-one, etc. In the example of FIG. 4, one data agent 440 is associated with one application 460. In some embodiments, one data agent 440 manages more than one type of application 460.

In the example of FIG. 4, Client 1 420*a* and Client 2 420*b* share an information store 430. Client 1 420*a* has Application 1 460*a* and Application 2 460*b* installed. Client 2 420*b* has Application 1 460*a* and Application 3 460*c* installed. Both Client 1 420*a* and Client 2 420*b* use a specific operating system or file system (e.g., Windows). The data generated by Application 1 460*a*, Application 2 460*b*, and Application 3 460*c* are stored in the information store 430. The data relating to the file systems of Client 1 420*a* and Client 2 420*b* is also stored in the information store 430. In certain embodiments, the data for a particular client 420 is stored in a separate volume 435 or LUN 431. For instance, data for Client 1 420*a* is stored in one volume 435*a* (Volume 1) in a LUN 431*a* (LUN 1), and data for Client 2 420*b* is stored in another volume 435*b* (Volume 2) in another LUN 431*b* (LUN 2). In other embodiments, a LUN 431 can include multiple volumes 435, or a volume 435 can include multiple LUNs 431.

The snapshot manager 450 may obtain a snapshot of a specific volume 435 or LUN 431 in the information store 430 that contains data for multiple applications 460. The snapshot manager 450 may not directly take a snapshot, but may coordinate a snapshot operation with various components of the system 400, such as the media agent 470. As explained above, a single snapshot can be taken for multiple applications 460. For instance, with respect to Client 1 420*a*, the snapshot manager 450 can take a snapshot of data associated with Application 1 460*a* and data associated with Application 2 460*b* by coordinating a single snapshot for Volume 1 435*a* or LUN 1 431*a* when both Application 1 460*a* and Application 2 460*b* are quiesced. Similarly, with respect to Client 2 420*b*, the snapshot manager 450 can take a snapshot of data associated with Application 1 460*a* and data associated with Application 3 460*c* by coordinating a single snapshot for Volume 2 435*b* or LUN 2 431*b* when both Application 1 460*a* and Application 3 460*c* are quiesced. The snapshot according to the illustrative embodiment is accompanied by application-specific indexing as explained in further detail below.

In some embodiments, the snapshot manager 450 coordinates taking a single snapshot of a virtual machine (VM) that has multiple applications 460 installed. The snapshot manager 450 instructs various components of the system 400 to obtain a single snapshot of all data for the VM, which includes data for multiple applications.

The snapshot manager 450 can check whether applications 460 whose data is stored on a volume are quiesced or in consistent states. A "consistent state" can refer to a state of an application in which the operations are temporarily stopped and/or suspended to allow a snapshot to be taken of the application. Data of an application 460 can be recovered from a consistent state. A consistent state may also be referred to as a good known state. The snapshot manager 450 may determine which applications 460 should be quiesced. The snapshot manager 450 can detect the applications 460 that are running or installed on a client 420 by determining which types of data agents 440 are running or installed on the client 420. By determining the data agents 440 on the client 420, the snapshot manager 450 may determine what types of application data are stored in the information store 430. The snapshot manager 450 may find out whether the applications 460 are in consistent states by inquiring with the respective data agents 440 associated with the applications 460. Each data agent 440 can communicate with the application 460 to determine whether the application 460 is in a consistent state and ready for a snapshot operation to proceed.

Snapshot operations may run according to a schedule, at user request, based on a storage policy such as any of the storage policies described herein, based on certain events, etc. A schedule may be based on the passage of a predetermined amount of time, such as on a regular basis (e.g., after a particular time interval, such as a certain number of hours or days), or on an intermittent basis. Snapshot operations may also be event-based and may be triggered by certain events (e.g., after a new version of software is installed on a component of the system 400). Snapshot operations can be implemented as one or more storage policies, and the storage manager 410 may manage such storage policies.

The snapshot manager 450 may coordinate snapshots according to one or more storage policies. The frequency for taking snapshots may vary, e.g., depending on the application 460. For example, the snapshot for Exchange may need to be taken every 6 hours, and the snapshot for SQL may need to be taken every 3 hours, as defined by one or more storage policies associated with the applications (e.g., by a single storage policy associated with both applications 460 or by individual storage policies associated with each application 460). The applications 460 that have a similar frequency for snapshots can be scheduled or grouped together in one snapshot storage policy. For instance, the storage manager 410 or the snapshot manager 450 can implement a snapshot storage policy for some applications 460 that have a 3-hour frequency, and implement another snapshot storage policy for other applications 460 that have a 6-hour frequency. In some embodiments, applications 460 having different snapshot frequencies can be implemented within a single storage policy. For instance, a single storage policy can include a sub-plan for a first group of applications 460 having one frequency and another sub-plan for a second group of applications 460 having a different frequency. A snapshot storage policy may also specify a retention period for storing the snapshot data. Each application 460 may have a different retention period for the snapshot data. For example, Exchange snapshot data is stored for 4 years; virtual machine snapshot data is stored for 30 days; and SQL snapshot data is stored for 10+ years. As with snapshot frequency, in such cases, the storage manager 410 or snapshot manager 450 can implement one or more snapshot storage policies for applications 460 having similar retention periods. For instance, the storage manager 410 or snapshot manager 450 can implement a snapshot storage policy for some applications 460 that have a first retention period and another snapshot storage policy for other applications that have a different retention period. Or, a single storage policy can include a sub-plan for a first group of applications 460 having one retention period and another sub-plan for a second group of applications 460 having a different retention period. Further details relating to policies are explained above, for example, in connection with FIG. 1E.

At data flow step 2, the data agents 440 quiesce associated applications 460. When a data agent 440 receives an inquiry from the snapshot manager 450, the data agent 440 can check whether its associated application 460 is in a consistent state. If the application 460 is not in a consistent state, the data agent 440 can engage appropriate writers or scripts to instruct the application 460 to enter a consistent state. The applications 460 can take appropriate steps to come to a state where each is ready for a snapshot operation to proceed.

In some embodiments, the data agent 440 that first receives an inquiry from the snapshot manager 450 acts as a specialized data agent 440 and coordinates tasks relating to taking a single snapshot. For example, the specialized data agent 440 determines what other data agents 440 are running or installed on the client 420. The specialized data agent 440 can determine what application data may be stored in the information store 430 by determining the other data agents 440 on the client 420. The specialized data agent 440 instructs the other data agents 440 to quiesce associated applications 460. The specialized data agent 440 can quiesce its own associated application 460. The other data agents 440 can notify the specialized data agent 440 once their associated applications 460 are quiesced. The specialized data agent 440 can then notify the snapshot manager 450 that the applications 460 are ready for a single snapshot. In certain embodiments, the snapshot manager 450 may perform some or all of the functions of the specialized data agent 440.

In certain embodiments, an application 460 may request a snapshot for its data. The application 460 can send a request to the snapshot manager 450 or the storage manager 410. The request may be in the form of a job, and the snapshot manager 450 may manage the jobs from various applications 460 (e.g., in a queue). The request for snapshot of an application 460 may be generated and sent by the data agent 440 for the application 460. The data agent 440 for the first job received in a given time period may be designated to be the specialized data agent 440 and may instruct the data agents 440 for subsequent jobs to place associated applications 440 in consistent states.

At data flow step 3, the data agents 440 notify that applications 460 are quiesced. After the data agents 440 instruct the applications 460 to enter consistent states, the applications 460 can notify the data agents 440 once they are quiesced. The data agents 440 in turn can notify the snapshot manager 450 or the storage manager 410 that the applications 460 are ready for a snapshot. In some embodiments, the specialized data agent 440 is notified by the other data agents 440, and the specialized data agent 440 lets the snapshot manager 450 or the storage manager 410 know that the applications 460 are ready for a snapshot. In certain embodiments, not all applications 460 notify that they are ready for a snapshot, but if a sufficient number of applications 460 are in consistent states, the snapshot manager 450 may proceed with taking the snapshot. The sufficient number of applications 460 for a snapshot may be defined by a threshold value that is managed by the snapshot manager 450.

At data flow step 4, the snapshot manager 450 takes a snapshot of the information store or primary storage 430. As explained above, the snapshot taken may be of a logical volume. The snapshot manager 450 may not take the snapshot itself, but arrange for appropriate components in the system 400 to obtain the snapshot. In one embodiment, the information store or primary storage device 430 is capable of taking hardware-based snapshots. The snapshot manager 450 instructs the media agent 470 associated with the information store 430 to take a snapshot of a particular volume, and the media agent 470 sends a request to the information store 430 to take a hardware snapshot.

In some embodiments, the information store 430 includes data for a database application 460. For a database application 460, the database data and the database log data may be backed up separately. For example, the database data may be included in the single snapshot for multiple applications. The database transaction logs may be backed up more frequently (e.g., every 15 minutes) and may be backed up separately from, or in addition to, the single snapshot that includes the database data. The transaction logs may be backed up by the data agent 440 associated with the database application 460. For example, one or more log files of the transaction log are copied to secondary storage devices 480. When a database application 460 data is backed up (e.g., in a full backup), the database logs may be truncated. Log truncation may refer to freeing up space in the logical log for reuse by the log file. For example, the transaction log has a certain amount of disk space available, and log records should be deleted periodically to free up space. Logs may be truncated when a backup is performed successfully, for example, in order to prevent the log file from overflowing. In certain embodiments, the backup of the database data is performed through the single snapshot, for example, instead of using the data agent 440 for the corresponding database application 460. In such case, the logs may not be truncated properly. Accordingly, the snapshot manager 450 can coordinate to truncate the database logs at the time the single snapshot is taken. In one embodiment, the snapshot manager 450 instructs the data agent 440 associated with the database application 460 to truncate the logs. The single snapshot, which includes the database data, and the log backup data can be stored in separate storage devices and/or different types of media.

In a full backup of a database, generally the inactive part of the log may not be truncated until all its log records are included or captured in a log backup so that the log chain can be maintained (e.g., for recovery). The log chain may refer to a series of log records having an unbroken sequence of log sequence numbers.

In certain embodiments, the transaction log may be a wrap-around file. The transaction log may include one or more physical files. When the database is created, the logical log file begins at the start of the physical log file, and new log records are added at the end of the logical log and expand toward the end of the physical log. Each physical log file may be divided internally into a number of virtual log files. Log truncation can free space in the logical log by deleting inactive virtual log files from the start of the logical log. Virtual log files may define the unit of space that can be reused. For example, virtual log files that contain only inactive log records are truncated. The active portion of the transaction log may not be truncated because the active portion is used to recover the database. The most recent checkpoint can define the active portion, and the log can be truncated up to the checkpoint.

A checkpoint may refer to an identifier or reference that identifies the state of the database at a point in time. In general, modifications to database pages are performed in memory and are not necessarily written to disk after every update. Therefore, the database system may perform a checkpoint periodically to write these updates that are held in-memory to the storage disk. Writing these updates to storage disk can create a point in time to which the database system can apply changes contained in a transaction log during recovery after an unexpected shut down or crash of the database system. The checkpoint may include information about the log sequence number of the first log record that should be present for a successful database-wide rollback.

Although log truncation is explained above with reference a database application 460, log truncation can apply to other types of applications 460 that have transaction logs. For example, Exchange also has a transaction log, and Exchange logs can be truncated in a similar manner.

In some embodiments, the single snapshot is taken for a virtual machine (VM), and one of the applications 460 executing or installed on the VM is a database application 460. In such case, a single snapshot is taken of the VM data, which includes the database data, and the logs are backed up by the data agent 440 for the database application 460 inside the VM. At the time of restore, the database data can be restored from the VM snapshot, and the log data can be restored from the log backup.

At data flow step 5, the media agents 470 store the snapshot in the storage devices or secondary storage 480. As explained above, the snapshot can be a snapshot of a volume 435 or a LUN 431 in the information store 430. In the example of FIG. 4, the snapshot 485*a* of Volume 1 435*a* is stored in the storage device 480. The snapshot 485*a* includes the data for Client 1 420*a*, which is stored in Volume 1 435*a*. In other embodiments, the snapshot may be of a LUN 431. For example, in FIG. 4, the storage device 480 can store the snapshot 481*a* of LUN 1 431*a*. If Volume 1 435*a* is included in LUN 1 431*a*, the snapshot 481*a* can include the data of Volume 1 435*a*.

In some embodiments, the snapshot is stored in the same storage device as the information store or primary storage device 430. In such case, the information store 430 also serves as the secondary storage device 480, and the primary data for applications 460 and the snapshot data for the applications 460 are stored on the same storage device. The information store 430 may be a storage device that is capable of performing a hardware snapshot. The media agents 470 may store any metadata relating to the snapshot operation or the snapshot in the media agent index 475. For example, the metadata can include any metadata generated during the snapshot operation.

In certain embodiments, the snapshot is partitioned into multiple parts relating to the applications 460 for which the snapshot is taken. For example, the portion of the snapshot relating to one application 460 may be partitioned and stored separately, and the portion of the snapshot relating to another application 460 may be partitioned and stored separately. The portions of the snapshot that do not relate to an application 460 of interest may be pruned or discarded. The portions for multiple applications 460 may be partitioned in turn, and once the portions corresponding to all applications 460 of interest have been stored as a separate backup copy, the snapshot data may be deleted.

At data flow step 6, the media agents 470 create application mapping data. Mapping data may also be referred to as "mapping information" or "mapping metadata." A data agent 440 can have access to information about how the data and/or directories of an associated application 460 are structured, how the files generated by the application 460 are arranged, etc. Accordingly, the data agent 440 can determine which part of the snapshot belongs to or relates to a particular application 460. In one embodiment, the data agent 440 sends such information to the media agent 470 so the media agent 470 can generate mapping metadata regarding the location of the data of an application 460 within a snapshot. For example, the media agent 470 can create mapping metadata that maps data of an application 460 to a particular location(s) in the secondary storage device 480. The mapping metadata can be stored in the media agent index 475. The mapping metadata can be referenced when restoring data for that application 460. In some embodiments, the mapping metadata may be stored as component 225 which is described with respect to FIGS. 2 and 8-10.

The data agents 440 may gather information and/or metadata for creating the mapping data before a snapshot is taken. As explained above, a data agent 440 may be aware of how the data of its associated application 460 is formatted, and the data agent 440 can also have access to information regarding how the directories of the associated application 460 are organized or structured. In an illustrative example, SQL Server data agent 440 knows that SQL Server data is stored under directory "C:\SQL." SQL Server data agent 440 also knows the subdirectories included in the "C:\SQL" directory. For instance, SQL Server data agent 440 knows that the data for Database 1 is stored under "C:\SQL\DB1," and Database 1 logs are stored under "C:\SQL\DB1\logs." SQL Server data agent 440 may also be aware that certain file extensions are associated with SQL Server. Based on this information, SQL Server data agent 440 can determine which part of the volume includes SQL-related data. SQL Server data agent 440 passes on this information to one or more media agents 470 so that they can generate the mapping data regarding which portion of the snapshot pertains to SQL Server data. The media agents 470 can refer to the information from the SQL Server data agent 440. For example, a media agent 470 can determine which part of the snapshot data corresponds to "C:\SQL" in the logical volume in the information store 430.

In one embodiment, the data agents 440 reference a file table of the file system associated with the logical volume for which the snapshot is obtained. Such a file table may be associated with a particular operating system. For example, the file table can be the master file table (MFT) used by Windows operating systems (Windows OS). There could be one table per volume. The file table can include information about the files in a volume. In some embodiments, the snapshot manager 450 or the media agents 470, instead of the data agents 440, may refer to the file table.

Although the data flow step 6 is described after data flow step 5, data flow steps 5 and 6 may be performed concurrently or in a different order (e.g., data flow step 6 is performed before data flow step 5). After the snapshot is obtained, the applications 460 can be unquiesced and resume operations. The snapshot manager 450 may instruct the respective data agent 440 to communicate with the associated applications 460 that they no longer need to be in consistent states. The applications 460 can return to normal state and may inform the data agents 440 after they are unquiesced. In turn, the data agents 440 may notify the snapshot manager 450 that the respective applications 460 are unquiesced.

By utilizing a single snapshot for multiple applications, the system 400 may reduce the number of snapshots taken since a snapshot of a volume can be taken less frequently. This can reduce the amount of resources used for generating and storing snapshots of primary storage devices. For example, a license for a snapshot software may be priced based on the number of allowed snapshots. Accordingly, taking fewer snapshots to back up data in the primary storage can be economical.

Figure 5:
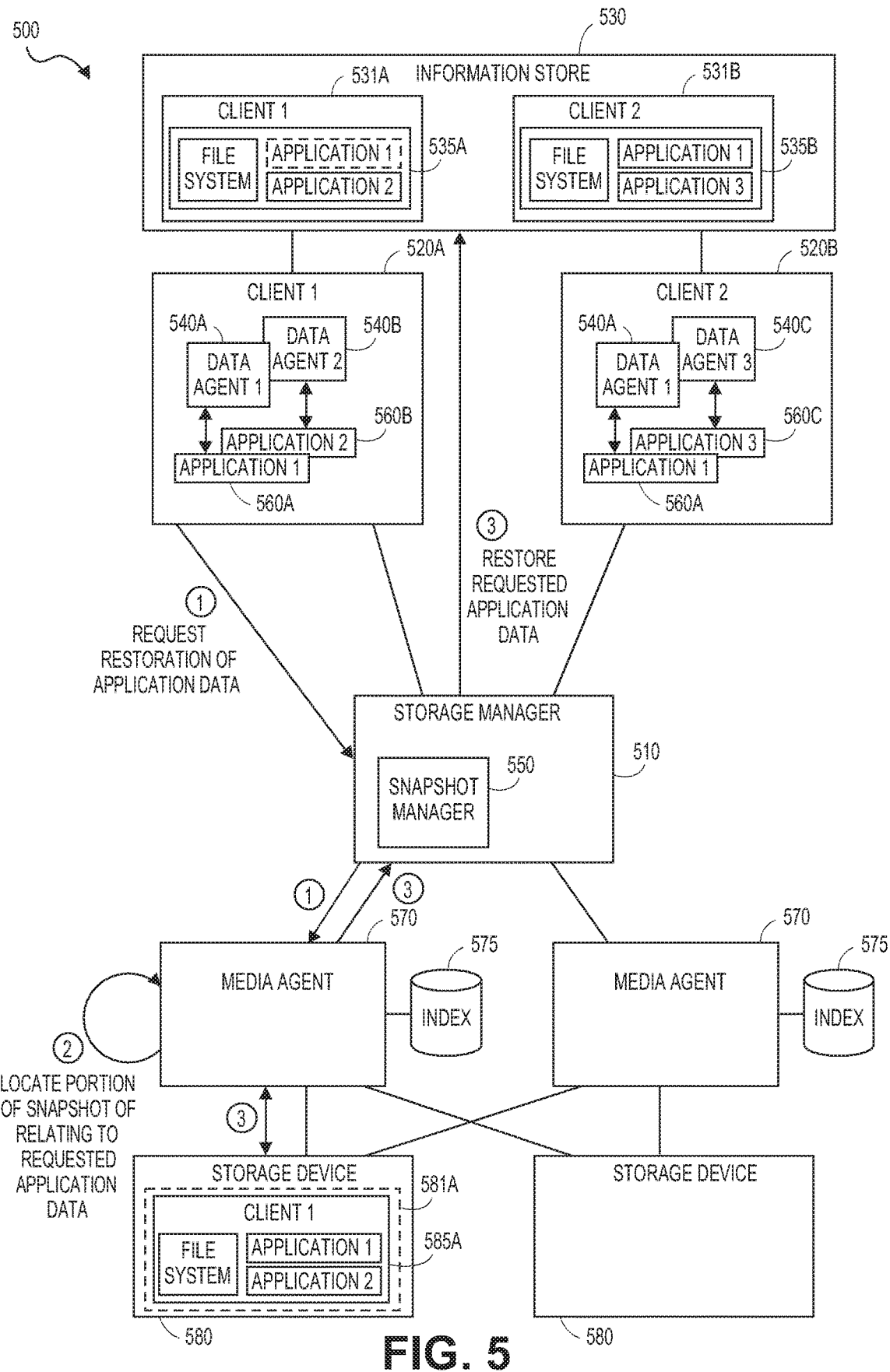
FIG. 5 is a data flow diagram illustrative of the interaction between the various components of another exemplary information management system configured to implement recovery operations from a single snapshot for multiple applications, according to certain embodiments.

FIG. 5 is a data flow diagram illustrative of the interaction between the various components of another exemplary information management system 500 configured to implement recovery operations from a single snapshot for multiple applications, according to certain embodiments. As illustrated, the exemplary information management system 500 includes a storage manager 510, one or more clients 520, one or more information stores or primary storage devices 530, one or more data agents 540, one or more snapshot managers 550, one or more applications 560, one or more media agents 570, and one or more secondary storage devices 580. The system 500 and corresponding components of FIG. 5 may be similar to or the same as the system 100, 200, 400 and similarly named (though not necessarily numbered) components of FIGS. 1D, 2, and 4.

Moreover, depending on the embodiment, the system 500 of FIG. 5 may additionally include any of the other components shown in FIGS. 1D, 2, and 4 that are not specifically shown in FIG. 5. The system 500 may include one or more of each component. All components of the system 500 can be in direct communication with each other or communicate indirectly via the client 520, the storage manager 510, the media agent 570, or the like. In certain embodiments, some of the components in FIG. 5 shown as separate components can reside on a single computing device, or vice versa. For example, the snapshot manager 550 can be on the storage manager 510, the client 520, or on a separate computing device. Further details regarding certain aspects of the system 500 are described in greater detail above with reference to FIG. 4.

At data flow step 1, the client 520 requests restore of data relating to an application 560. For example, the client 520 may send a request to restore data to the storage manager 510. In turn, the storage manager 520 may send a request to an appropriate media agent 570. In some embodiments, the storage manager 510 sends the request to the snapshot manager 550 and the snapshot manager 550 forwards the request to one or more media agents 570. The request may be for a file generated by the application 560. The data of the application 560 can be restored at various levels of granularity. For example, an individual Exchange mail item or a write within SharePoint may be recovered.

At data flow step 2, the media agent 570 locates the snapshot that includes the requested application data. As explained above with reference to FIG. 4, the snapshot can be a single snapshot that includes data of multiple applications. For instance, the snapshot is a snapshot of a logical volume 535 in a primary storage device 530 taken at a particular point in time. A primary storage device 530 can include one or more LUNs 531, and each LUN 531 can include one or more volumes 535. In the example of FIG. 5, data for Client 1 520*a* is stored in one volume 535*a* (Volume 1) in a LUN 531*a* (LUN 1), and data for Client 2 520*b* is stored in another volume 535*b* (Volume 2) in another LUN 531*b* (LUN 2). In the example of FIG. 5, the snapshot 585*a* is a snapshot of Volume 1 535*a* at a specific point in time. The snapshot 585*a* includes the data for Client 1 520*a*, which is stored in Volume 1 535*a*. Or the snapshot may be a snapshot of a LUN 531 that includes the logical volume 535. For instance, in the example of FIG. 5, the snapshot 581*a* is a snapshot of LUN 1 531*a*, and can include the data of Volume 1 535*a*. In some embodiments, a LUN 531 can include multiple volumes 535, or a volume 535 can include multiple LUNs 531. In certain embodiments, a volume 535 may be configured across multiple primary storage devices 530. In some embodiments, more than one media agent 570 is involved in locating the snapshot and restoring the requested application data. For example, the single snapshot may be stored across multiple secondary storage devices 580.

The secondary storage devices 580 can provide multiple snapshots for the same volume or LUN taken at different times. The requested application data may be for a specific time, and one or more media agents 570 can restore from the snapshot for that time (or close to that time). The media agent 570 can refer to information or metadata in the media agent index 575 in order to find the snapshot that includes the requested data. After locating the snapshot including the requested data, the media agent 570 can access the mapping data or information indicating the portion of the snapshot related to the application 560. The media agent 570 can reference the mapping information in order to determine which portion(s) of the snapshot include the data of the application 560. The mapping information may be organized by application 560 and by snapshot. Each application 560 can have its own set of mapping information, and the mapping information can be provided for each snapshot that includes the data of the application 560. The mapping information may be stored in the media agent index 575. In some embodiments, the mapping information may be stored in the system table as described in FIGS. 2 and 8-10. In some embodiments, the snapshot manager 550 determines which snapshot includes the requested data and/or which part of the snapshot pertains to the application 560.

In one embodiment, the mapping information includes a file table (not shown) of the file system associated with the logical volume 535 in the snapshot. Such file table may be associated with a particular operating system (e.g., MFT for Windows OS). The file table can include information about the files in the volume. The media agent 570 can refer to the information about files in the file table to determine what data in the snapshot is related to the requesting application 560. In a certain embodiment, the mapping information may not be generated during the snapshot operation, but may be available or generated based on the information in the file table at the time of restore.

At data flow step 3, the media agent 570 restores the requested application data. Once the media agent 570 locates the snapshot that includes the data of the application 560 and the portion of that snapshot relating to the application 560, the media agent 570 can extract the requested data from the portion of the snapshot relating to the application 560. The mapping information may include details for recovering the data of the application 560 at various levels of granularity. For instance, the mapping information can indicate where a particular file is located within the portion of the snapshot relating to the application 560. The media agent 570 can then restore that file to the primary storage 530. For example, the media agent 570 copies the blocks for the file to the primary storage device 530. The mapping information may also provide information on locating individual writes or items associated with the application 560. The requested data may be recovered to the same volume 535 or LUN 531 for which the snapshot was taken. For example, the restored data overwrites the existing data. Or the requested data may be recovered to a different volume 535, LUN 531, or primary storage device 530.

In some embodiments, the snapshot includes data for a database application 560. As explained above regarding FIG. 4, the data of a database application 560 and the log of the database application 560 may be backed up separately. For example, the log backup and the single snapshot that includes the database data can be stored in separate storage devices and/or different types of media. Accordingly, restoring the data of the database application 560 can involve restoring both the data of the database application 560 from the single snapshot and the log data from the log backup. The data of the database application 560 can be restored in a similar manner to restoring data of other applications 560. The log data may be restored separately and may be processed to form the log chain. The log chain may refer to a series of log records having an unbroken sequence of log sequence numbers. Restored log files may be placed or arranged in a certain sequence to form the log chain. After the data of the database application 460 is restored and the database log is properly restored, the user can access and operate on the requested database data.

Figure 6:
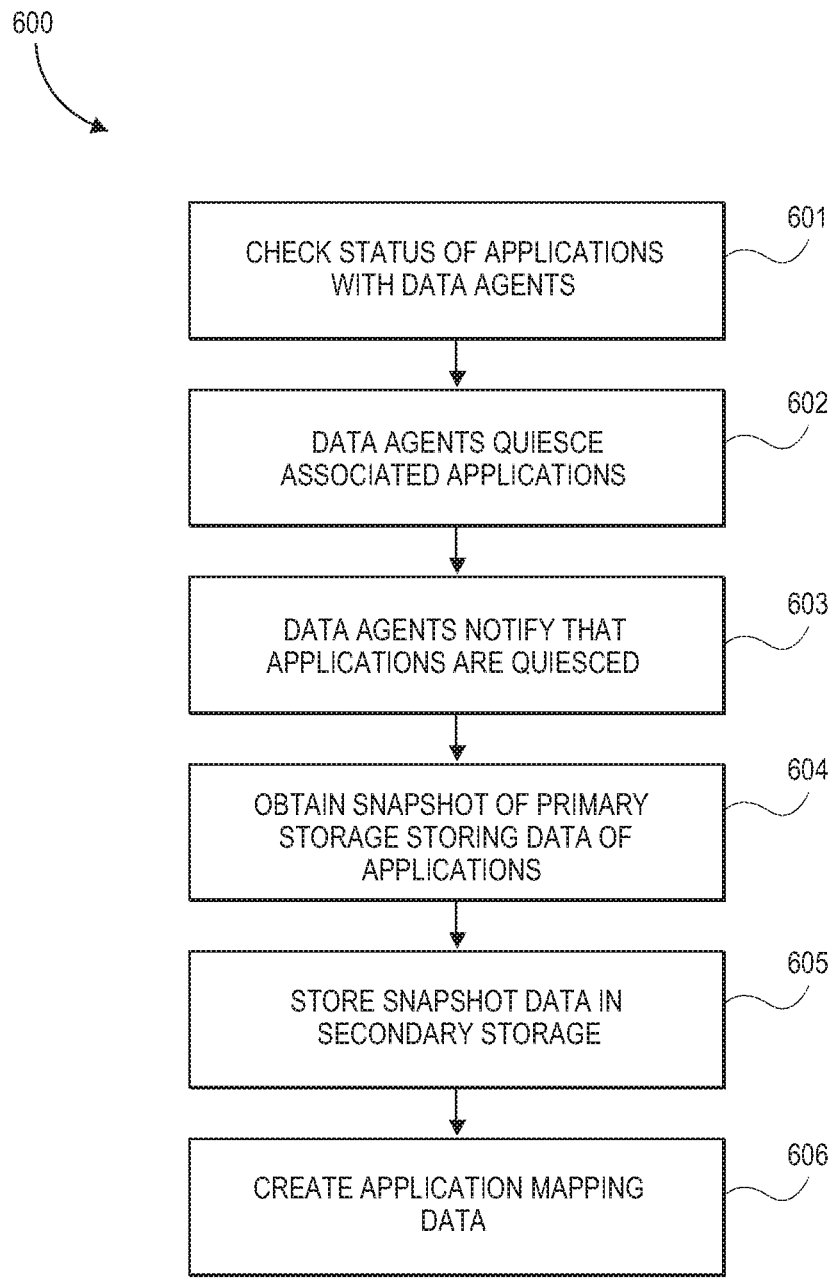
FIG. 6 is a flow diagram illustrative of one embodiment of a routine for creating a single snapshot for multiple applications.

FIG. 6 is a flow diagram illustrative of one embodiment of a routine 600 for creating a single snapshot for multiple applications. The routine 600 is described with respect to system 400 of FIG. 4. However, one or more of the steps of routine 600 may be implemented by other information management systems, such as those described in greater detail above with reference to FIGS. 1D, 2, and 3. The routine 600 can be implemented by any one, or a combination of, a client, a storage manager, a data agent, a snapshot manager, a media agent, and the like. Moreover, further details regarding certain aspects of at least some of steps of the routine 600 are described in greater detail above with reference to FIG. 4. Although described in relation to snapshot operations for the purposes of illustration, the process of FIG. 6 can be compatible with other types of storage operations, such as, for example, migration, backups, replication operations, archiving, and the like.

At block 601, the snapshot manager 450 checks the status of various applications 460 with corresponding data agents 440. The snapshot manager 450 can detect the applications 460 executing on the client 420 by determining which data agents 440 are executing on the client 420.

At block 602, the data agents 440 quiesce the associated applications 460. For example, the data agent 440 may instruct the application 460 to enter a consistent state. The application 460 can notify the data agent 440 subsequent to entering a consistent state. The data agent 440 then can relay that the application 460 is ready for a snapshot to the snapshot manager 450.

At block 603, the data agents 440 notify the snapshot manager 450 that the associated applications 460 are quiesced. Each data agent 440 can send a notification to the snapshot manager 450 that its related application 460 is in a consistent state.

At block 604, the snapshot manager 450 obtains a snapshot of the primary storage 430 storing the data of the applications 460. The snapshot manager 450 may obtain the snapshot after receiving notifications from the data agents 440 that the associated applications 460 are in consistent states. In some embodiments, the snapshot manager 450 obtains the snapshot after receiving notifications from two or more of the data agents 440, but not all of the data agents 440. In some cases, waiting for all applications 460 to enter consistent states may not be efficient, and if most (or a threshold number) of the applications 460 are in consistent states, the snapshot can be taken. The snapshot may be of a particular logical volume in the primary storage 430. The logical volume can include the data generated by the applications 460. The logical volume can also include data associated with a file system of the client 420.

Each applications 460 may have a frequency for obtaining a snapshot of data associated with the application. In some embodiments, the snapshot manager 450 obtains the snapshot for two or more applications 460 that have the same frequency for obtaining a snapshot at the same time. For example, the snapshot operation for applications 460 having the same snapshot frequency may be included in one snapshot storage policy.

At block 605, one or more media agents 470 store the snapshot data in the secondary storage 480. The secondary storage 480 may be the same storage device as the information store of the primary storage 430. For example, the storage device may be a storage array that is capable of performing hardware snapshots, and the snapshot data is stored in the same array as the production or primary data.

At block 606, the snapshot manager 450 creates application mapping data (e.g., mapping metadata). Each data agent 440 may obtain metadata relating to the location of the data generated by its associated application 460 in the logical volume. The data agent 440 can have access to information relating to the structure of the data generated by the application 460 and/or location of the data generated by the application 460 in the logical volume. The metadata could include information relating to data structure or one or more directories of the application 460. The information relating to the structure of the data generated by the application 460 can include the format of the data. The information relating to the location of the data generated by the application 460 in the primary storage comprises directory structure of the application 460. The snapshot manager 450 may generate mapping information that maps a particular application 460 to a portion of the snapshot relating to that application 460. The mapping information may be created based on the metadata obtained by the respective data agent 440.

The routine 600 can include fewer, more, or different blocks than those illustrated in FIG. 6 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile and/or non-transitory storage.

Figure 7:
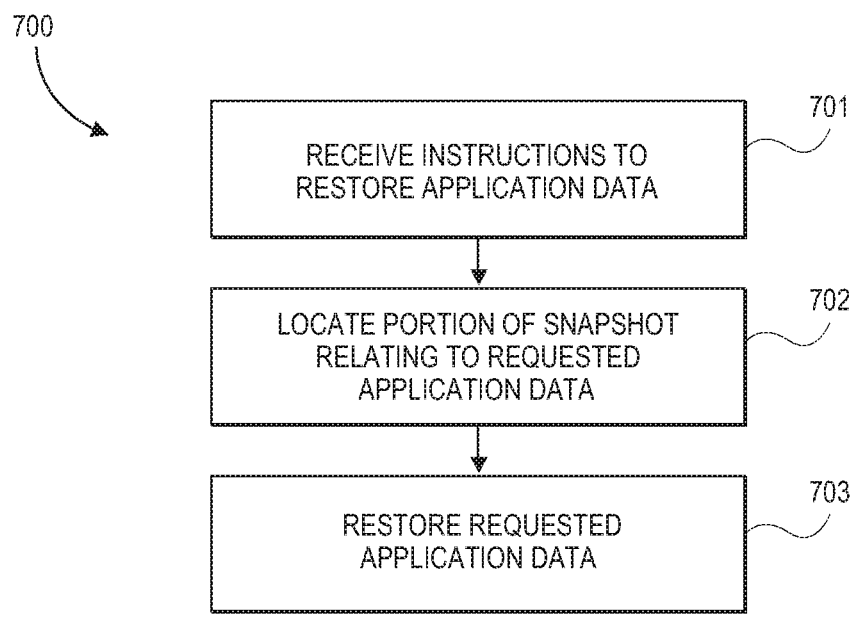
FIG. 7 is a flow diagram illustrative of one embodiment of a routine for restoring data of an application from a single snapshot for multiple applications.

FIG. 7 is a flow diagram illustrative of one embodiment of a routine 700 for restoring data of an application from a single snapshot for multiple applications. The routine 700 is described with respect to the system 500 of FIG. 5. However, one or more of the steps of routine 700 may be implemented by other information management systems, such as those described in greater detail above with reference to FIGS. 1D, 2, 3 and 4. The routine 700 can be implemented by any one, or a combination of, a client, a storage manager, a data agent, a snapshot manager, a media agent, and the like. Moreover, further details regarding certain aspects of at least some of steps of the routine 700 are described in greater detail above with reference to FIG. 5. Although described in relation to snapshot operations for the purposes of illustration, the process of FIG. 7 can be compatible with other types of storage operations, such as, for example, migration, backups, replication operations, archiving, and the like.

At block 701, the storage manager 510 receives instructions to restore application data from a single snapshot 585 containing data of multiple applications 560. The storage manager 510 may instruct the snapshot manager 550 to begin the restore process. In some embodiments, the snapshot manager 550 receives the instructions. The data to be restored may be a file, a write, a mail item, etc.

At block 702, the snapshot manager 550 locates the portion of the snapshot relating to the requested application data. The snapshot manager 550 can locate the snapshot that includes the data to be restored. Since a number of snapshots may exist in the secondary storage 580 for a volume, the snapshot manager 550 may determine from which snapshot the requested data should be restored. The snapshot manager 550 can make the determination by accessing information in the media agent index 575. After locating the snapshot of interest, the snapshot manager 550 can find the portion of the snapshot that relates to the requesting application 560. The snapshot manager 550 may refer to mapping information that maps data of the application 560 in the snapshot to the application 560 in order to find the relevant portion of the snapshot. The mapping information can be generated based on the metadata obtained by the data agents 540 associated with the applications 560. The data agents 540 may obtain metadata relating to the data structure or one or more directories of the associated applications 560. The storage manager 510 or the snapshot manager module 550 can instruct one or more media agents 570 to restore the relevant portion of the snapshot from the secondary storage device(s) 580.

In one embodiment, the mapping information can include a file table of an operating system of the client 520 from the time the snapshot was taken. The snapshot manager module 550 can access the file table to locate the portion of the snapshot corresponding to the data of the application 560.

At block 703, one or more media agents 570 restore the requested application data. The snapshot data may be stored across multiple storage devices 580, and a media agent 570 may be designated to communicate with a specific storage device 580. In such case, more than one media agent 570 can be involved in restoring the requested snapshot data. The requested application 560 data may be restored to the same primary storage device 530 that includes the logical volume the snapshot relates to. For instance, the restored data may overwrite corresponding data in the logical volume. Or the restored data may be written to another part of the logical volume, another volume, another LUN, etc. in the same primary storage device 530. In another example, the restored data is written to a primary storage device 530 that is different from the primary storage device 530 that includes the logical volume the snapshot relates to.

The routine 700 can include fewer, more, or different blocks than those illustrated in FIG. 7 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile and/or non-transitory storage.

Shared Snapshot Generation

Figure 8:
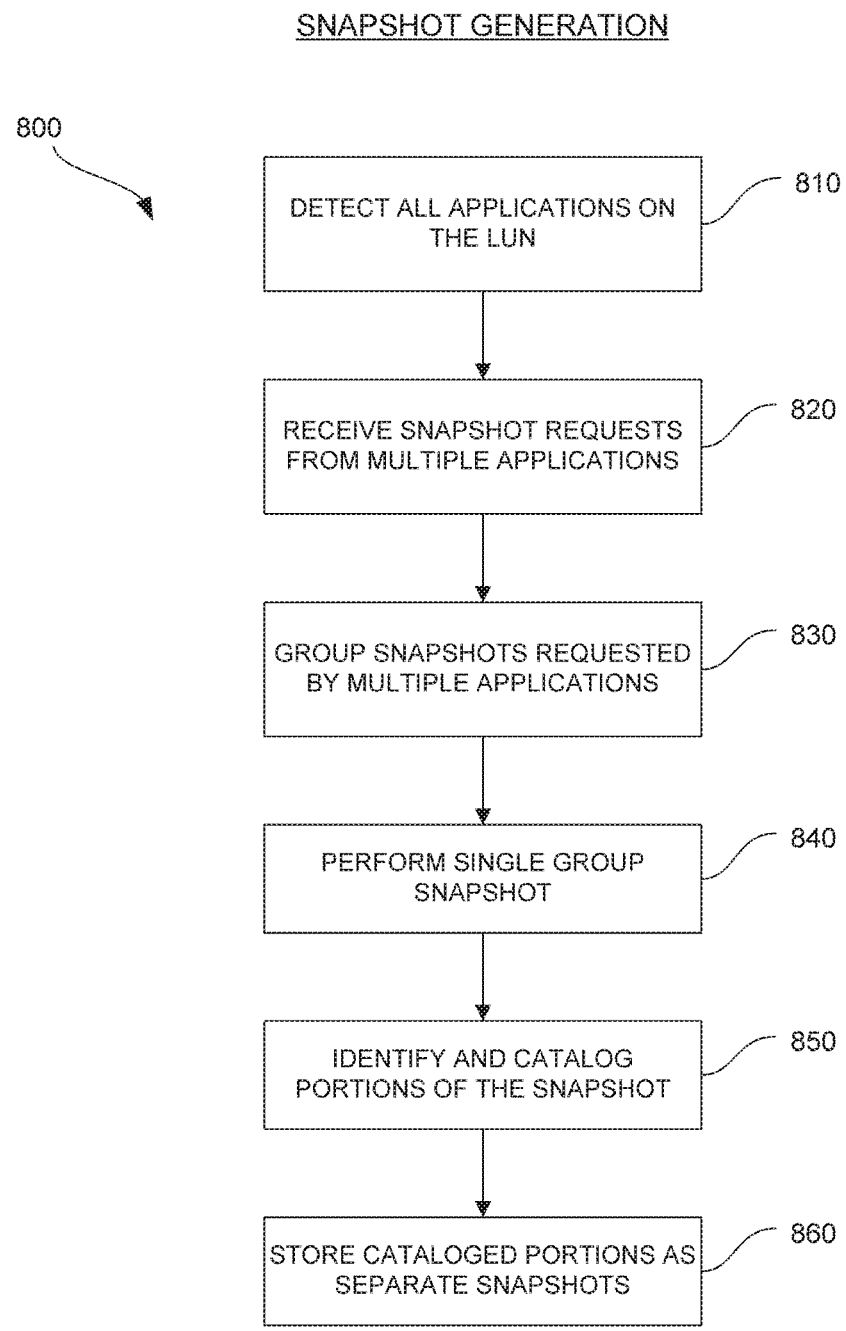
FIG. 8 provides a flowchart illustrating a process for generating shared snapshots in accordance with one or more embodiments disclosed herein.

FIG. 8 provides a flowchart illustrating a process 800 for generating shared snapshots in accordance with one or more embodiments disclosed herein. The process 800 may be implemented by information management systems, such as those described in greater detail above with reference to FIGS. 1D and 2-5. The process 800 can be implemented by any one, or a combination of, a client, a storage manager, a data agent, a snapshot manager, a media agent, and the like. Moreover, further details regarding certain aspects of at least some of steps of the process 800 are described in greater detail above with reference to FIGS. 2-5. Although described in relation to snapshot operations for the purposes of illustration, the process 800 can be compatible with other types of storage operations, such as, for example, migration, backups, replication operations, archiving, and the like.

The process 800 may include accessing a LUN and detecting the number and/or type of applications and/or agents that are running on the LUN (block 810). Such information may be used in determining how to share a snapshot taken of the entire LUN, or a portion thereof. Appropriate software may be directed to quiesce the applications.

The process 800 may further include receiving a request to take a snapshot of the LUN from one or more applications (block 820). For example, such request may be directed by a snapshot manager module as described above. In accordance with the request, a single snapshot may be taken at block 840 of the LUN or a portion thereof, wherein the process 800 further includes grouping snapshot requests from multiple applications in order to partition the single snapshot to be shared among the requesting applications.

In order to track the locations of the various snapshot partitions, the process 800 may include identifying the locations within the snapshot of the data associated with the various applications and cataloging such information in mapping information (block 850). With reference to the mapping information, the snapshot may be stored in the storage system as separate snapshots associated with the separate applications/agents (block 860).

Grouping Applications for Single Snapshot Applicability

Figure 9:
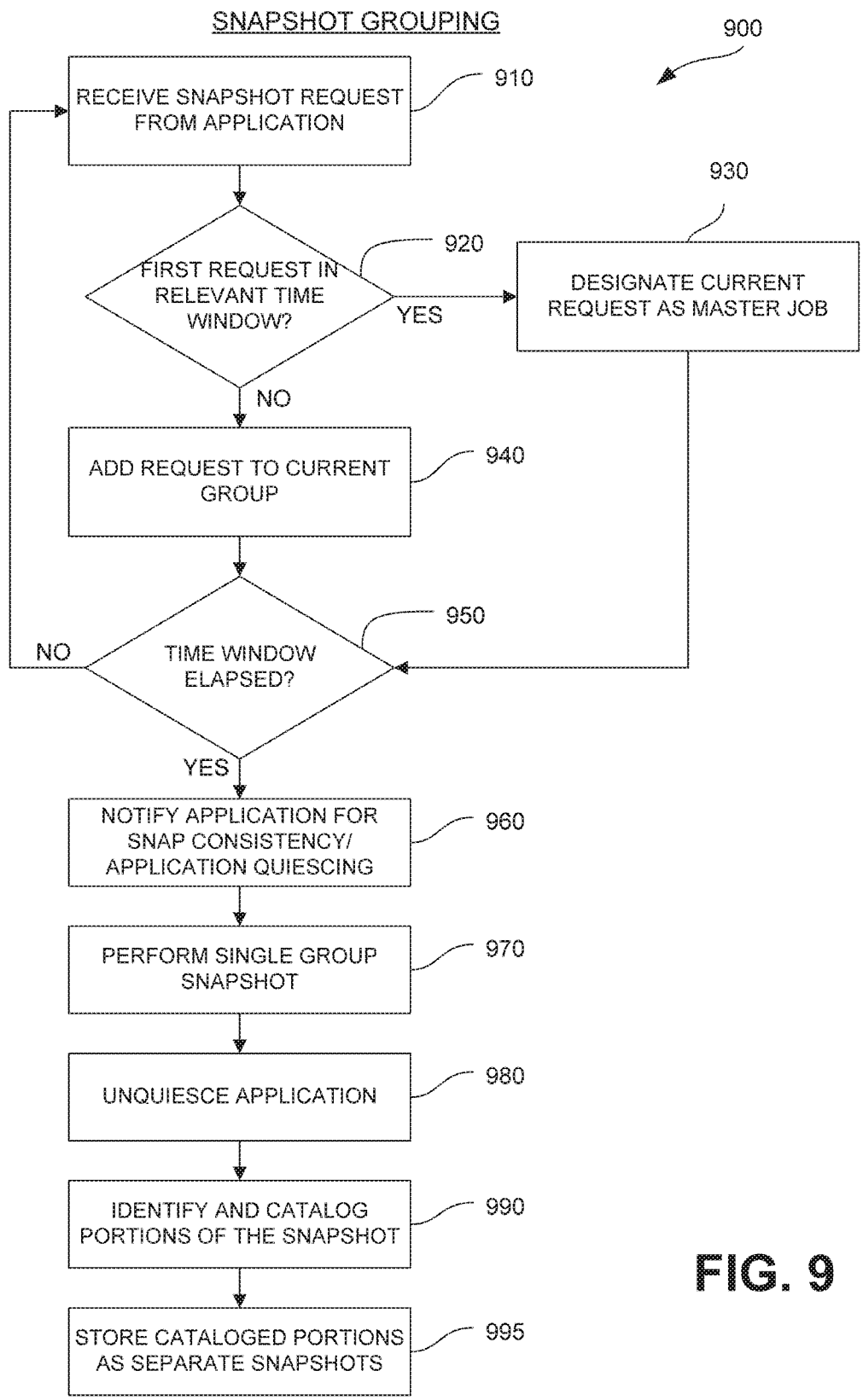
FIG. 9 provides a flowchart illustrating a process for grouping snapshot requests according to one or more embodiments disclosed herein.

As described above, generation of shared snapshots can involve grouping snapshots requested by multiple applications together in a single snapshot of the LUN on which the relevant volumes of data are maintained. FIG. 9 provides a flowchart illustrating a process 900 for grouping snapshot requests according to one or more embodiments disclosed herein. Snapshot requests associated with separate applications/agents that are grouped together may share a global snapshot of an LUN shared by the applications/agents. The process 900 may be implemented by information management systems, such as those described in greater detail above with reference to FIGS. 1D and 2-5. The process 900 can be implemented by any one, or a combination of, a client, a storage manager, a data agent, a snapshot manager, a media agent, and the like. Moreover, further details regarding certain aspects of at least some of steps of the process 900 are described in greater detail above with reference to FIGS. 2-5. Although described in relation to snapshot operations for the purposes of illustration, the process 900 can be compatible with other types of storage operations, such as, for example, migration, backups, replication operations, archiving, and the like.

In certain embodiments, snapshot requests are grouped based on time of receipt. Grouping snapshot requests based on time relative to the time of creation of the global snapshot may increase the likelihood that a particular request with be associated with a state of the source data adequately represented by the global snapshot. For example, if a request is made too far removed in time from the generation of the global snapshot, data changes occurring during the gap in time may be undesirably, or inadequately reflected in the global snapshot. Therefore, blocks 910-950 provide a time-based process for grouping snapshot requests. As illustrated by FIG. 9, the first snapshot job received in a relevant time window may be designated as the master job. In certain embodiments, the master job is responsible for creating or directing the global snapshot. In addition, the master job may determine how many LUNs are associated with each database and/or how many databases are associated with each LUN. As additional job requests are received, such jobs are added to the group until the desired time window has elapsed, at which point the group membership may become static.

As described above, once the related snapshots have been grouped together, a single global snapshot may be performed (block 970). It may be necessary or desirable to provide notification of that the grouped snapshot is to be taken in order to allow for snapshot consistency and/or application quiescing (block 960). Once the global snapshot has been taken, associated application I/O may be resumed and/or unquiesced (block 980). Furthermore, the portions of the global snapshot that relate to each of the grouped snapshots may then be identified and cataloged (block 990). The cataloged portions of the general snapshot may then be stored as separate snapshots for each of the grouped snapshots (block 995).

In certain embodiments, when the system desires to prune data from the backups, the system uses the mapping information to quickly identify data that can be pruned. For example, if the data associated with a particular application is being pruned, the mapping information identifies where the data is located within the snapshot.

At block 970, the snapshot is taken that is associated with each of the group members. For example, a single snapshot may be taken per LUN. In certain embodiments, the master job is responsible to taking the snapshot and storing data in the mapping information identifying the location of the master job within the snapshot. The master job may then pass the mapping information to the next job for further additions to the mapping information. In certain embodiments, each job maintains its own mapping information. For example, a single job may have access to the mapping information entries associated with other jobs, but may have no reason or capability to monitor mapping information data associated with other jobs.

When a snapshot job has been completed, associated applications/agent processes may receive access to the snapshot for the purposes of verifying the consistency of the snapshot data. In certain embodiments, when a job no longer has a use for the snapshot, the snapshot is not discarded, but is maintained until all group members likewise have no need for the snapshot. At such point, the snapshot may be discarded.

Snapshot Restoration

In certain embodiments, when the system desires to restore data from the backups, the system uses the mapping information to identify which data to be restored from the global snapshot. Therefore, it may not be necessary to restore the entire snapshot. When an application requests restoration of a portion of the snapshot, the remainder of the snapshot may be reused by other applications to the extent that the data associated with the applications is valid.

FIG. 10 provides a flowchart illustrating a process 1000 for grouping snapshot requests according to one or more embodiments disclosed herein. The process 1000 may be implemented by information management systems, such as those described in greater detail above with reference to FIGS. 1D and 2-5. The process 1000 can be implemented by any one, or a combination of, a client, a storage manager, a data agent, a snapshot manager, a media agent, and the like. Moreover, further details regarding certain aspects of at least some of steps of the process 1000 are described in greater detail above with reference to FIGS. 2-5. Although described in relation to snapshot operations for the purposes of illustration, the process 1000 can be compatible with other types of storage operations, such as, for example, migration, backups, replication operations, archiving, and the like.

The process 1000 includes receiving a restore request from an application relating to snapshot data stored in a global snapshot (block 1010). The mapping information may be used to identify applications associated with the snapshot (block 1020), as well as locations within the snapshot where various applications are stored (block 1030). The data associated with the requesting application may then be restored according to the mapping information (block 1040).

Snapshot Readiness Report

Systems that perform snapshot operations for taking snapshots of data in primary storage may have different configurations and/or settings. This is not limited to systems that manage a single snapshot for multiple applications. For example, the storage array configuration and/or volume manager configuration can vary significantly from one customer to another customer. Because configurations can vary, there might not be an easy way to check if a snapshot operation will be successful in a particular configuration. Therefore, it would be useful to provide a tool that can verify whether a snapshot operation will succeed in a certain configuration and/or system without actually performing the snapshot operation. In many cases, system administrators may not find out whether a snapshot operation has problems until the snapshot operation fails at runtime.

As mentioned above, snapshot operations may be implemented and/or managed as storage policies. For example, a system administrator can define a storage policy specifying how frequently a snapshot should be taken of certain volumes and/or storage devices. Often, such snapshot storage policies may be run at designated times without determining, prior to the designated times, whether the snapshot storage policies will run successfully or not. Many parameters can be involved in snapshot operations, and if any one of the parameters is not met, a snapshot operation could fail.

Accordingly, an information management system according to certain aspects of the disclosure may check or determine whether snapshot operations will work prior to executing them. This is not limited to systems that manage a single snapshot for multiple applications, and may apply to any snapshot operations that occur in an information management system. The concept of whether the system configuration and/or settings are appropriate or ready for taking a snapshot and/or whether a particular snapshot storage policy will work can generally be referred to as "snapshot readiness." In some cases, the information management system can generate reports relating to the determination. Such reports may be referred to as "snapshot readiness reports."

Figure 11:
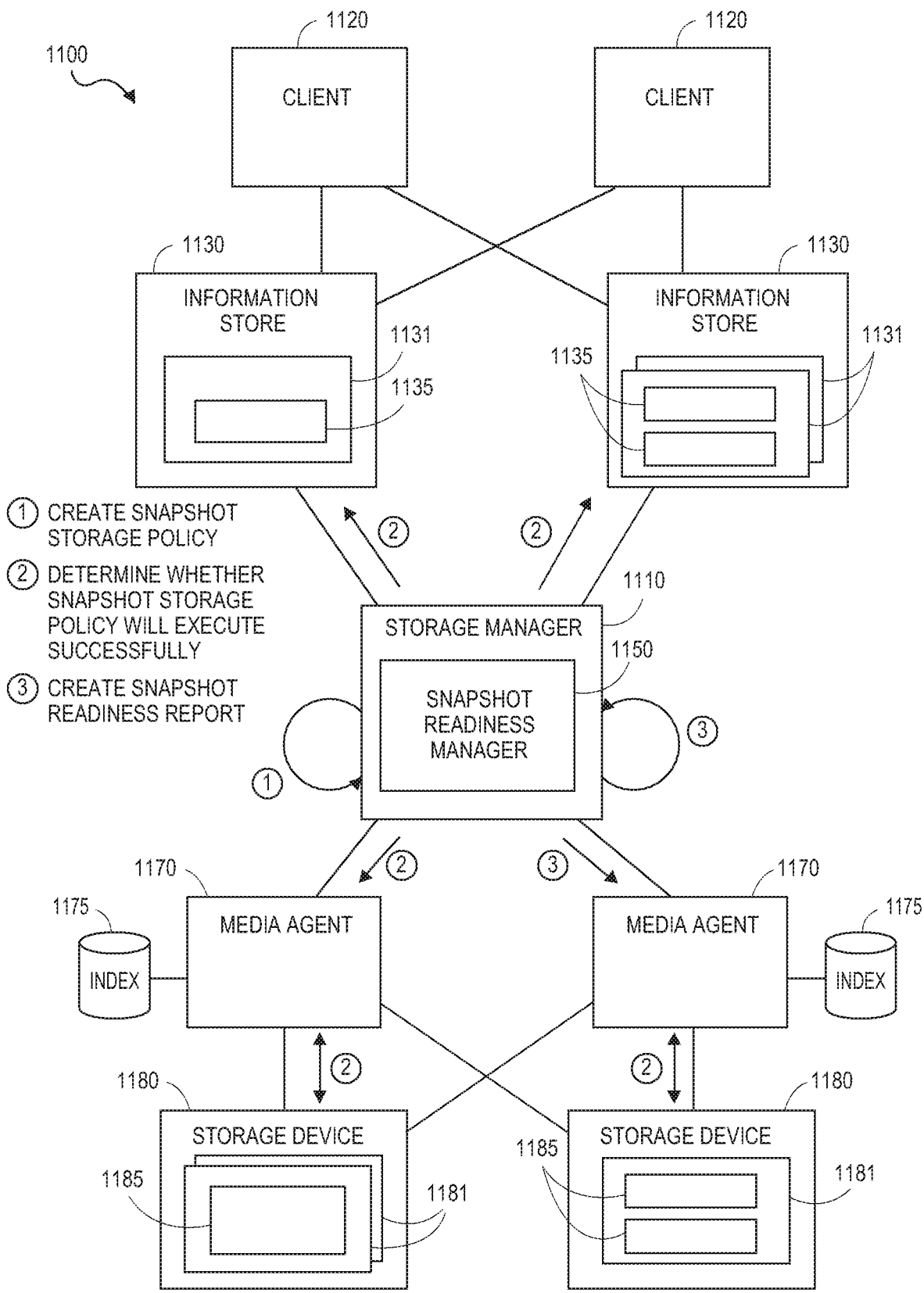
FIG. 11 is a data flow diagram illustrative of the interaction between the various components of an exemplary information management system configured to implement snapshot readiness determination, according to certain embodiments.

FIG. 11 is a data flow diagram illustrative of the interaction between the various components of an exemplary information management system 1100 configured to implement snapshot readiness determination, according to certain embodiments. As illustrated, the exemplary information management system 1100 includes a storage manager 1110, one or more clients 1120, one or more information stores or primary storage devices 1130, a snapshot readiness manager 1150, one or more media agents 1170, and one or more secondary storage devices 1180. The system 1100 and corresponding components of FIG. 11 may be similar to or the same as the system 100, 200, 400, 500 and similarly named (but not necessarily numbered) components of FIGS. 1D, 2, 4, and 5.

Moreover, depending on the embodiment, the system 1100 of FIG. 11 may additionally include any of the other components shown in FIGS. 1D, 2, 4, and 5 that are not specifically shown in FIG. 11 (e.g., data agents, applications, etc.). The system 1100 may include one or more of each component. All components of the system 1100 can be in direct communication with each other or communicate indirectly via the client 1120, the storage manager 1110, the media agent 1170, or the like. In certain embodiments, some of the components in FIG. 11 shown as separate components can reside on a single computing device, or vice versa. For example, the snapshot readiness manager 1150 can be on the storage manager 1110, the media agent 1170, or on a separate computing device.

At data flow step 1, a user (e.g., a system administrator) creates a snapshot storage policy. The snapshot storage policy can define various parameters or criteria for performing a snapshot operation. Examples of parameters and/or criteria can include: frequency of snapshot, primary storage device(s) for which a snapshot should be taken, secondary storage device(s) where the obtained snapshot should be stored, application type, volume, etc. The snapshot storage policies may be stored in and managed by the storage manager 1110.

At data flow step 2, the snapshot readiness manager 1150 determines or checks whether the system 1100 can successfully execute the snapshot storage policy. Such determination may be referred to as "snapshot readiness test." The snapshot readiness manager 1150 can run a snapshot readiness test for a storage policy at user request, prior to execution of the storage policy, at a predetermined interval, etc. In some embodiments, the snapshot readiness test may be run at the time of installation at a location.

Some of the items or factors the snapshot readiness manager 1150 checks can include: availability of primary storage devices 1130 for which snapshots should be taken, availability of secondary storage devices 1180 where snapshots should be stored, connectivity to the primary storage devices 1130 and/or secondary storage devices 1180, any licenses for snapshot software, user credentials for connecting to primary storage devices 1130 and/or secondary storage devices 1180, etc.

The primary storage devices 1130 may be configured as one or more storage arrays that each include one or more LUNs 1131. A LUN 1131 may include one or more logical volumes 1135. The system 1100 may use a volume manager software to manage the storage arrays, LUNs, and/or volumes. A number of volume manager software or applications are available, and the system 1100 may use a particular volume manager. The storage array configurations and/or the volume manager configurations can vary for different customers. In some embodiments, the snapshot storage policy is defined to take a snapshot of a LUN 1131 or a volume 1135 within a LUN 1131.

The storage manager 1110 may manage configurations and/or settings relating to arrays, which may be referred to as "storage array management" or "array management." Some examples of information relating to an array include: IP address of the array, array ID, username and password for connecting to the array, etc. The storage manager 1110 may have information relating to which host bus adapter (HBA) cards should be used to connect to a particular storage array. The storage manager 1110 can also have information relating to which media agents 1170 should be used to connect to a storage array. The storage manager 1110 may also have credentials used for connecting to an array. The storage manager 1110 may have licensing information relating to the snapshot software and/or application used to take snapshots. For instance, the snapshot software provider may grant a license to take a certain number of snapshots for a designated amount. In order to take snapshots, the system 1100 should have a valid license.

The snapshot readiness manager 1150 may refer to any of the information managed by the storage manager 1110 in order to determine whether the snapshot storage policy will work. In certain embodiments, the snapshot readiness manager 1150 is distinguishable from and is responsible for different functionality from the snapshot manager 450 and/or 550 discussed above. However, these entities may be implemented in a unified module in some embodiments; in other embodiments, they may be implemented in distinct modules that reside on the same or different components of an information management system, such as the illustrative system 200 of FIG. 2 or any of the systems described with respect to FIGS. 1-12. For example, the snapshot readiness manager 1150 can access information regarding which media agent 1170 should be used to connect to the array for storing the snapshot as specified in the storage policy. The snapshot readiness manager 1150 can also access array IP address, array ID, and credentials to the designated media agent 1170. If the media agent's 1170 connection to the array is successful, the snapshot readiness manager 1150 can know that the information provided to the media agent 1170 is valid.

One of the factors the snapshot readiness manager 1150 may check is whether the one or more HBAs that can be used to connect to an array are working. An HBA may connect a host computer to network and storage devices. An information management system may have multiple HBA interfaces, but only some of them might be used in connection with secondary storage operations, such as snapshot operations. The snapshot readiness manager 1150 can obtain the HBA-related information and check whether the relevant HBAs are online.

The snapshot readiness manager 1150 can also check whether the one or more media agents 1170 for connecting to an array are online. When a snapshot operation is to be executed, the storage manager 1110 may instruct one or more media agents 1170 in communication with the array to obtain a snapshot. If primary storage devices 1130 are capable of taking hardware snapshots, the media agents 1170 can request the devices 1130 to take a snapshot. The media agents 1170 may also create metadata regarding the snapshot and store it in, e.g., the index 1175.

Another factor the snapshot readiness manager 1150 can check is availability of the primary storage device(s) 1130 for which a snapshot should be taken. The snapshot readiness manager 1150 can test connectivity to a particular storage device(s) 1130. If the primary storage device 1130 is an array, the snapshot readiness manager 1150 can check whether the array is online. However, even if an array is generally available, a particular volume for which a snapshot should be taken might not be available. The snapshot readiness manager 1150 can check with the array whether the specific volume is online.

The snapshot readiness manager 1150 may check similar factors for secondary storage device(s) 1180. The snapshot readiness manager 1150 can check availability of the secondary storage device(s) 1180 where snapshot data should be stored. The snapshot readiness manager 1150 can test connectivity to a particular storage device(s) 1180. Similar to the primary storage devices 1130, the secondary storage device(s) 1180 may be configured as one or more storage arrays that each include one or more LUNs 1181. A LUN 1181 may include one or more logical volumes 1185. If the secondary storage device 1180 is an array, the snapshot readiness manager 1150 can check whether the array is online. However, even if an array is generally available, a particular volume on which snapshot data should be stored might not be available. The snapshot readiness manager 1150 can check with the array whether the specific volume is online. The array can inform the snapshot readiness manager 1150 of the online status of volumes within the array. The snapshot readiness manager 1150 may check whether there is enough space to store the snapshot data in a particular array and/or volume within the array.

In some embodiments, the same storage devices may be used to store both primary data and secondary data as in FIG. 2. For example, in some embodiments a hardware storage array can store both primary and secondary data. The secondary storage device 1180 may be a storage array that is capable of performing hardware-based snapshots. In such cases, the primary data for which the snapshot should be taken resides in the storage array, and the snapshot of the primary data can also be stored in the storage array. Where the same storage devices are used as both primary storage 1130 and secondary storage 1180, the snapshot readiness manager 1150 may only check once regarding whether the array and/or the volume is available. The snapshot readiness manager 1150 may check as many times as appropriate, depending on the number and status of array components and/or volumes, whether they are available for a snapshot operation.

The snapshot readiness manager 1150 may also check whether the user credentials provided for connecting to a certain storage array are valid. The snapshot readiness manager 1150 may attempt to establish a connection to the storage array using the credentials. The credentials may be included in the array management information. The array management information may include information regarding various storage arrays and properties.

The snapshot readiness manager 1150 can also check whether the license for a particular snapshot application is valid. For example, the snapshot readiness manager 1150 can determine if a specific media agent 1170 for obtaining the snapshot has a license to perform a snapshot operation. In one embodiment, the media agent 1170 that does not have a license for a snapshot application is unable to connect to an array that includes the volume for which a snapshot should be taken. For example, the array is capable of performing hardware snapshots, and only the media agents 1170 with the license for the array can connect to the array and request snapshots. In this embodiment, the snapshot readiness manager 1170 can determine whether the license for the snapshot application is valid or not by establishing a connection to the array. The license information may be included in the array management information.

Some of the factors are listed above as examples of what the snapshot readiness manager 1150 may check. The snapshot readiness manager 1150 can check any other factors as appropriate. By testing various parameters for a snapshot operation, the snapshot readiness manager 1150 can determine whether a certain snapshot storage policy will execute successfully without actually running the storage policy. The parameters or factors tested may include some or all of the examples above, and can also include other items that are not mentioned.

In certain embodiments, the snapshot readiness manager 1150 also checks whether a certain system configuration is supported by the information management system 1100. The snapshot readiness manager 1150 may refer to array management information in the storage manager 1110 to make such determination. The system configuration can include volume manager configuration, storage array configuration, etc. As explained above, a number of volume manager solutions are available, and customers may use any one of the available volume manager solutions. Depending on the volume manager solution used, the configuration of an information management system can differ significantly. For instance, three customers that have systems that can generate snapshots all have very different volume manager configurations. The snapshot readiness manager 1150 may determine whether a volume manager configuration used by an information management system is compatible with snapshot operations and/or snapshot storage policies.

In one example, a customer may set up two LUNs to mirror each other using the volume manager, but the snapshot operations may not be compatible with such setup. The snapshot readiness manager 1150 can inform that the information management system 1100 does not support the two mirroring LUN setup. In order to the make the snapshot operations work, the mirroring may be temporarily stopped or broken. The snapshot readiness manager 1150 can provide such suggestion or recommendation if the information management system 1100 does not support a particular configuration.

The storage array configuration may also differ from one customer to another customer, and the snapshot readiness manager 1150 may check if a particular array configuration is compatible with snapshot operations. The snapshot readiness manager 1150 can also determine whether the storage manager 1110 and/or the media agents 1170 support such configuration.

The snapshot readiness test can be run according to user requirements. For example, the snapshot readiness test is run at the time of installation of the system 1100 at a site. It can also be run at the time of setting up a snapshot storage policy. In another example, the readiness test may be run prior to execution of any snapshot storage policy. The space available on the secondary storage devices 1180 may vary from day to day, and determining if the policy will succeed on a particular day can be important. The snapshot readiness test can also be performed on demand, for example, at the request of a user or a system administrator.

At data flow step 3, the snapshot readiness manager 1150 creates a snapshot readiness report. The snapshot readiness report can specify whether the snapshot storage policy will succeed if run. In addition, the report may also identify the issues that should be corrected for the storage policy to work properly. For example, a LUN 1181 or a volume 1185 in a secondary storage device 1180 may not be available to store the obtained snapshot. Or there might not be connection to the secondary storage device 1180.

Verifying whether a snapshot storage policy will operate properly prior to actual execution can be beneficial. For example, an organization uses snapshots for backing up its data, and if snapshot operations fail, the entire backup can fail. Snapshot readiness test and/or reports can help with spotting issues beforehand and without actually executing the policy, and the customer does not have to wait until the policy runs to find out that there are problems. The snapshot readiness report can provide information regarding any problems associated with performing the snapshot storage policy, and proposed solutions and/or recommendations. Although the snapshot readiness test and/or report have been explained in terms of snapshot operations, they may also be applied to other types of information management operations, such as backup, archiving, migration, etc.

Figure 12:
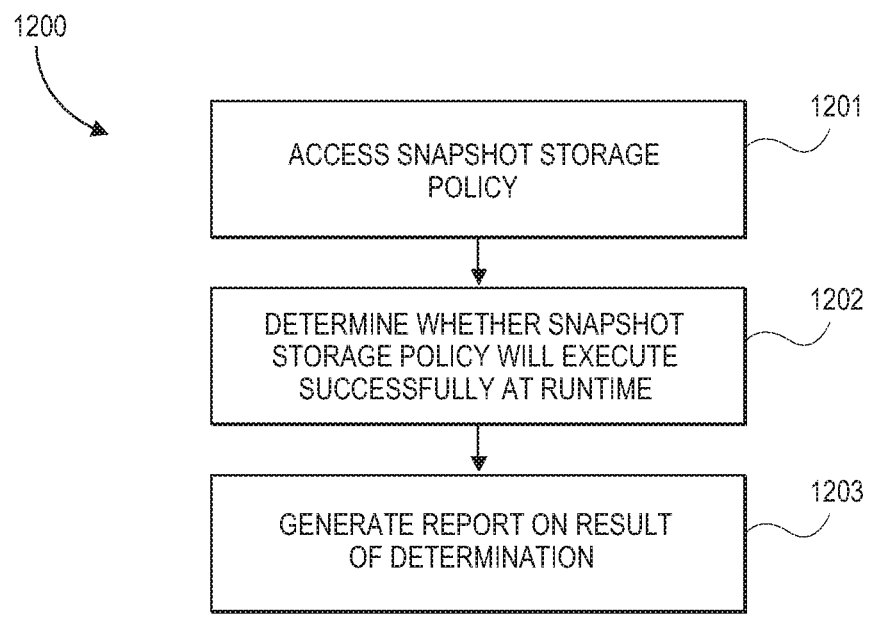
FIG. 12 is a flow diagram illustrative of one embodiment of a routine for determining snapshot readiness.

FIG. 12 is a flow diagram illustrative of one embodiment of a routine 1200 for determining snapshot readiness. The routine 1200 is described with respect to the system 1100 of FIG. 11. However, one or more of the steps of routine 1200 may be implemented by other information management systems, such as those described in greater detail above with reference to FIGS. 1D-5. The routine 1200 can be implemented by any one, or a combination of, a client, a storage manager, a data agent, a snapshot readiness manager, a media agent, and the like. Moreover, further details regarding certain aspects of at least some of steps of the routine 1200 are described in greater detail above with reference to FIG. 11. Although described in relation to snapshot operations for the purposes of illustration, the process of FIG. 12 can be compatible with other types of storage operations, such as, for example, migration, backups, replication operations, archiving, and the like. The snapshot readiness determination may apply to any system that performs snapshot operations, including systems configured to implement a single snapshot for multiple applications as described in FIGS. 2-5.

At block 1201, the snapshot readiness manager 1150 accesses a snapshot storage policy. The snapshot storage policy may be defined by a user, a system administrator, etc. The storage policy can define criteria associated with a snapshot operation to obtain a snapshot of data in the primary storage 1130. The storage policy can be configured to instruct the storage manager 1110 to initiate the snapshot operation (e.g., when executed).

At block 1202, the snapshot readiness manager 1150 determines whether the snapshot storage policy will execute successfully at runtime. The snapshot readiness manager 1150 can check various factors. For example, the snapshot readiness manager 1150 checks whether the license associated with the snapshot application used to obtain a snapshot of the data in the primary storage 1130 is valid. The snapshot readiness manager 1150 may also determine whether the secondary storage device(s) 1180 are available to store the snapshot. A secondary storage device 1180 may include multiple logical volumes 1185, and the snapshot data may be stored in a specific volume; the snapshot readiness manager 1150 can check whether the specific volume is available. The snapshot readiness manager 1150 can also check if the secondary storage device(s) 1180 have sufficient space to store the snapshot. The snapshot readiness manager 1150 may also determine whether the primary storage device(s) 1130 are available to obtain the snapshot. A primary storage device 1130 may include multiple logical volumes 1135, and the snapshot may be obtained for a specific volume; the snapshot readiness manager 1150 can check whether the specific volume is available for taking a snapshot.

The snapshot readiness manager 1150 may also determine whether connectivity exists to the primary storage device(s) 1130 or the secondary storage device(s) 1180. The snapshot readiness manager 1150 could instruct one or more media agents 1170 to establish a connection to the primary storage 1130 or the secondary storage 1180. The media agents 1170 may connect to the designated device by using credentials (e.g., user ID, password, etc.) provided by the snapshot readiness manager 1150. The device in the primary storage 1130 or the secondary storage 1180 to connect to can be a storage array. The volumes in the storage array may be managed by a volume manager software. The snapshot readiness manager 1150 can also check if a particular configuration of the volume manager setup is compatible with the snapshot storage policy or is supported by the system 1100. In one embodiment, the primary storage devices 1130 and the secondary storage devices may be the same devices 1180. For example, the system 1100 can use storage arrays that have hardware snapshot functionality. The snapshot storage policy may be configured to obtain hardware-based snapshots. The above factors are provided as examples, and the snapshot readiness manager 1150 can check any other relevant factors as appropriate.

At block 1203, the snapshot readiness manager 1150 generates a report on the result of the determination. The report can identify issues that have been spotted and may also include solutions or recommendations for resolving these issues. For example, if there is insufficient space in the volume of the secondary storage device 1180 where the snapshot should be stored, the system administrator can make sure enough space is provided prior to the time the storage policy is scheduled to run.

The routine 1200 can include fewer, more, or different blocks than those illustrated in FIG. 12 without departing from the spirit and scope of the description. Moreover, it will be appreciated by those skilled in the art and others that some or all of the functions described in this disclosure may be embodied in software executed by one or more processors of the disclosed components and mobile communication devices. The software may be persistently stored in any type of non-volatile and/or non-transitory storage.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other suitable interfaces.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention is recited as a means-plus-function claim under 35 U.S.C. sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. An information management system, the system comprising:
   one or more computing devices comprising computer hardware in networked communication with one or more media agents, the one or more computing devices configured to:
      determine that a storage operation is scheduled to be executed based on a storage policy associated with the storage operation;
      prior to the execution of the storage operation, determine whether one or more primary storage devices or one or more secondary storage devices are available to establish a connection to the one or more media agents; and
      in response to a verification determination that the one or more primary storage devices or the one or more secondary storage devices are not available to establish a connection to the one or more media agents to complete the storage operation, report results of the verification determination prior to the execution of the storage operation, the results specifying unavailability of the one or more primary storage devices or secondary storage devices.

2. The information management system of claim 1, wherein the verification determination is based on a determination that a logical volume or a physical volume within the one or more primary storage devices or secondary storage devices is not available.

3. An information management system, the system comprising:
   one or more computing devices comprising computer hardware in networked communication with one or more media agents, the one or more computing devices configured to:
      identify a storage operation for verification, wherein the storage operation is to be executed based on a storage policy associated with the storage operation;
      prior to the execution of the storage operation, determine whether one or more volumes within one or more primary storage devices or one or more volumes within one or more secondary storage devices are available to establish a connection to complete the storage operation; and in response to a verification determination that the one or more volumes within the one or more primary storage devices or the one or more volumes within the one or more secondary storage devices are not available to establish a connection to complete the storage operation, report results of the verification determination prior to the execution of the storage operation, the results specifying unavailability of the one or more volumes within the one or more primary storage devices or secondary storage devices.

4. The information management system of claim 3, wherein the one or more computing devices is further configured to incorporate at least part of the results of the verification determination in a report.

5. The information management system of claim 3, wherein the connection to complete the storage operation includes a connection to the one or more media agents.

6. The information management system of claim 3, wherein the results further specify one or more reasons for the verification determination.

7. The information management system of claim 3, wherein the one or more computing devices are further configured to: instruct the one or more volumes within the one or more primary storage devices or the one or more volumes within the one or more secondary storage devices to become available.

8. The information management system of claim 3, wherein the one or more computing devices are further configured to determine whether a license associated with an application is valid, wherein the application is configured to perform the storage operation, and the license authorizes the application to perform the storage operation.

9. The information management system of claim 3, wherein the storage policy comprises one or more parameters associated with the storage operation, the one or more parameters specifying one or both of:
   (i) one or more primary storage devices residing in a primary storage subsystem of the information management system where production data associated with the storage operation is located, and
   (ii) one or more secondary storage devices residing in a secondary storage subsystem of the information management system where data resulting from the storage operation is to be stored at.

10. The information management system of claim 3, wherein:
   the one or more primary storage devices or the one or more secondary storage devices comprise a storage array comprising one or more volumes, the one or more volumes in the storage array being managed by volume manager software; and
   the one or more computing devices are further configured to determine whether a configuration of the one or more volumes managed by the volume manager software is compatible with the storage policy.

11. The information management system of claim 3, wherein the storage policy comprises one or more parameters associated with the storage operation, the one or more parameters specifying at least one of:
   (i) frequency of the execution of the storage operation;
   (ii) one or more applications associated with the storage operation;
   (iii) an event triggering a scheduling of the storage operation; and
   (iv) a logical volume in the one or more primary storage devices.

12. The information management system of claim 3, wherein the one or more computing devices are further configured to: determine whether the one or more secondary storage devices have space sufficient to store data resulting from the storage operation.

13. The information management system of claim 3, wherein the one or more media agents is configured to: establish a connection to the one or more primary storage devices or to the one or more secondary storage devices using credentials associated with the storage operation.

14. The information management system of claim 3, wherein the one or more primary storage devices and the one or more secondary storage devices comprise same storage device or devices.

15. A method of verifying readiness of storage operations in an information management system, the method comprising:
   identifying a storage operation for verification, wherein the storage operation is to be executed based on a storage policy associated with the storage operation;
   prior to the execution of the storage operation, determining whether one or more volumes within one or more primary storage devices or one or more volumes within one or more secondary storage devices are available to establish a connection to complete the storage operation; and
   in response to a verification determination that the one or more volumes within the one or more primary storage devices or the one or more volumes within the one or more secondary storage devices are not available to establish a connection to complete the storage operation, reporting results of the verification determination prior to the execution of the storage operation, the results specifying unavailability of the one or more volumes within the one or more primary storage devices or secondary storage devices.

16. The method of claim 15, wherein the results further specify one or more reasons for the verification determination.

17. The method of claim 15, wherein:
   the one or more primary storage devices or the one or more secondary storage devices comprise a storage array comprising one or more volumes, the one or more volumes in the storage array being managed by a volume manager module; and
   the method further comprising determining whether a configuration of the one or more volumes managed by the volume manager module is compatible with the storage policy.

18. The method of claim 17, the method further comprising determining whether a configuration of the one or more volumes managed by the volume manager module is compatible with the storage policy.

19. The method of claim 15, wherein the storage policy comprises one or more parameters associated with the storage operation, the one or more parameters specifying one or both of:
   (i) one or more primary storage devices residing in a primary storage subsystem of the information management system where production data associated with the storage operation is located, and
   (ii) one or more secondary storage devices residing in a secondary storage subsystem of the information management system where data resulting from the storage operation is to be stored at.

20. The method of claim 15, the method further comprising: determining whether the one or more secondary storage devices have space sufficient to store data resulting from the storage operation.

21. The method of claim 15, the method further comprising: establishing a connection to the one or more primary storage devices or to the one or more secondary storage devices using credentials associated with the storage operation.

* * * * *